(12) United States Patent
Marks et al.

(10) Patent No.: US 11,468,466 B2
(45) Date of Patent: *Oct. 11, 2022

(54) SOCIAL-FINANCIAL NETWORK SYSTEMS AND METHODS

(71) Applicant: PayForward, LLC, Valencia, CA (US)

(72) Inventors: Steve Marks, Valencia, CA (US);
Armando Rand, Valencia, CA (US);
James Saltmar, Valencia, CA (US);
Armen Santourian, Valencia, CA (US);
Ronnie Silos, Valencia, CA (US)

(73) Assignee: PayForward, LLC, Valencia, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/895,936

(22) Filed: Jun. 8, 2020

(65) Prior Publication Data

US 2021/0027330 A1 Jan. 28, 2021

Related U.S. Application Data

(63) Continuation of application No. 14/713,924, filed on May 15, 2015, now Pat. No. 10,679,237.

(Continued)

(51) Int. Cl.
*G06Q 30/00* (2012.01)
*G06Q 30/02* (2012.01)
(Continued)

(52) U.S. Cl.
CPC ......... *G06Q 30/0234* (2013.01); *G06Q 20/10* (2013.01); *G06Q 30/00* (2013.01); *G06Q 50/01* (2013.01)

(58) Field of Classification Search
None
See application file for complete search history.

(56) References Cited

U.S. PATENT DOCUMENTS

| 7,494,058 B2 * | 2/2009 | Bonalle .............. G06K 19/0717 |
| | | 235/382 |
| 7,793,845 B2 * | 9/2010 | Bonalle ................ G06Q 20/105 |
| | | 235/487 |

(Continued)

FOREIGN PATENT DOCUMENTS

| EP | 1675080 | 6/2006 |
| EP | 1675080 A1 * | 6/2006 ............. G06Q 30/02 |

(Continued)

OTHER PUBLICATIONS

Federal Reserve Bank of Kansas City. Consumer Payment Innovation in the Connected Age. (Mar. 29-30, 2012). Retrieved online Jan. 16, 2019. https://www.kansascityfed.org/publicat/pscp/2012/complete-proceedings.pdf (Year: 2012).*

(Continued)

*Primary Examiner* — James A Reagan
(74) *Attorney, Agent, or Firm* — Sheppard, Mullin, Richter & Hampton LLP

(57) ABSTRACT

The present disclosure provides systems and methods directed to a social-financial platform. In certain embodiments, sponsor-members, consumer-members, and beneficiary members are part of a social-financial platform in which purchases made by consumer-members at merchant sponsor-members result in automatic rebates being paid to and allocated between the consumer member and one or more beneficiary-members. Also disclosed is a monolithic financial structure for carrying out rebate allocation automatically and instantaneously, and for transferring funds between users.

20 Claims, 44 Drawing Sheets

Related U.S. Application Data

(60) Provisional application No. 62/158,350, filed on May 7, 2015, provisional application No. 62/083,026, filed on Nov. 21, 2014, provisional application No. 62/055,541, filed on Sep. 25, 2014, provisional application No. 61/993,926, filed on May 15, 2014.

(51) Int. Cl.
*G06Q 20/10* (2012.01)
*G06Q 50/00* (2012.01)

(56) References Cited

U.S. PATENT DOCUMENTS

| | | | | |
|---|---|---|---|---|
| 7,953,663 | B1* | 5/2011 | LeKachman | G06Q 40/025 |
| | | | | 705/42 |
| 8,016,191 | B2* | 9/2011 | Bonalle | G06Q 20/341 |
| | | | | 235/487 |
| 8,249,983 | B2* | 8/2012 | Dilip | G06Q 40/02 |
| | | | | 705/42 |
| 8,301,493 | B2* | 10/2012 | Sanders | G06Q 30/0213 |
| | | | | 705/14.1 |
| 8,630,898 | B1* | 1/2014 | Knackstedt | G06Q 30/0207 |
| | | | | 705/14.17 |
| 8,682,784 | B2 | 3/2014 | Schleicher | |
| 8,751,380 | B2 | 6/2014 | Harvey | |
| 8,849,716 | B1* | 9/2014 | Everhart | H04N 7/173 |
| | | | | 707/821 |
| 8,892,474 | B1 | 11/2014 | Inskeep | |
| 10,380,374 | B2* | 8/2019 | Everhart | G06F 21/6245 |
| 2005/0021455 | A1 | 1/2005 | Webster | |
| 2005/0240477 | A1 | 10/2005 | Friday | |
| 2005/0269396 | A1 | 12/2005 | Schofield | |
| 2006/0036541 | A1 | 2/2006 | Schleicher | |
| 2007/0061206 | A1* | 3/2007 | LeFebvre | G06Q 30/02 |
| | | | | 705/14.15 |
| 2007/0118475 | A1 | 5/2007 | Picciallo | |
| 2007/0214080 | A1 | 9/2007 | Babi | |
| 2008/0070690 | A1* | 3/2008 | Van Luchene | A63F 13/12 |
| | | | | 463/42 |
| 2009/0287563 | A1 | 11/2009 | Mone | |
| 2009/0299857 | A1* | 12/2009 | Brubaker | G06Q 30/0269 |
| | | | | 455/99 |
| 2010/0185871 | A1* | 7/2010 | Scherrer | G06F 21/6218 |
| | | | | 726/4 |
| 2012/0185318 | A1 | 7/2012 | Shipley | |
| 2013/0325604 | A1 | 12/2013 | Yeri | |
| 2014/0032294 | A1 | 1/2014 | Donlan | |
| 2014/0040001 | A1 | 2/2014 | Harvey | |
| 2014/0195436 | A1 | 7/2014 | Schleicher | |
| 2014/0289126 | A1 | 9/2014 | Harvey | |
| 2014/0379562 | A1 | 12/2014 | Olson | |
| 2016/0140614 | A1* | 5/2016 | Brubaker | G06Q 30/0269 |
| | | | | 705/14.62 |
| 2018/0018645 | A1* | 1/2018 | Rand | G06Q 20/34 |
| 2018/0089717 | A1* | 3/2018 | Morin | G06Q 30/0269 |
| 2019/0156056 | A1* | 5/2019 | Chavez | G06F 21/64 |
| 2020/0334727 | A1* | 10/2020 | Ketchel, III | G06Q 30/0621 |
| 2020/0394709 | A1* | 12/2020 | Celia | G06Q 10/0639 |
| 2021/0342836 | A1* | 11/2021 | Celia | G06Q 20/401 |
| 2022/0035342 | A1* | 2/2022 | Cella | G05B 19/4155 |

FOREIGN PATENT DOCUMENTS

| | | | | | |
|---|---|---|---|---|---|
| JP | | 2000148875 | A | * | 5/2000 |
| JP | | 2014053897 | A | * | 3/2014 ......... H04L 41/0806 |
| JP | | 2014115796 | A | * | 6/2014 ......... G06Q 30/0261 |
| WO | WO-2006133140 | A2 | * | 12/2006 ......... G06Q 20/02 |
| WO | WO-2008048692 | A2 | * | 4/2008 ......... G06F 3/147 |
| WO | | 2010135642 | | | 11/2010 |
| WO | WO-2010135642 | A2 | * | 11/2010 ......... G06Q 20/20 |

OTHER PUBLICATIONS

Reserve Bank of India. Report of the Group on Enabling PKI in Payment System Applications. (Apr. 22, 2014). Retrieved online Jan. 16, 2019. https://m.rbi.org.in/scripts/PublicationReportDetails.aspx?UrlPage=&ID=765 (Year: 2014).*

Social Finance Ltd. (https://en.wikipedia.org/wiki/Social_Finance_Ltd.), (Year: 2018).

Social Finance: A Primer (https://www.americanprogress.org/issues/economy/reports/2013/11/05/78792/social-inance-a-primer/). (Year: 2013).

* cited by examiner

Events & Tasks

| | |
|---|---|
| Show Events: ☑  Show Tasks: ☑  Beneficiary: | All ▼ |
| Event Type: All ▼ | Event Status: All ▼ |
| | Task Status: All ▼ |

Ducks vs. Kings Game
  <u>Anaheim Ducks Hockey Team</u>
  Sunday, August 25, 2013, Anaheim Arena, 2:00 p.m.

Ducks Practice
  <u>Anaheim Ducks Hockey Team</u>
  Tuesday, August 27, 2013, El Segundo Rink, 6:00 p.m.

St. Andrews Annual Dinner Dance          *Accepted- Paid*
  <u>St. Andrews Presbyterian Church</u>
  Saturday, September 18, 2013, Church Hall, 5:00 p.m.

Screen Attendees at Door     Status: Active     *Task Accepted*
      <u>St. Andrews Presbyterian Church</u>     St. Andrews Annual Dinner Dance
      September 18, 2013                                                      *Internal*

Bring 12 bottles of Red Wine     Status: Active     [ Accept Task ]
    <u>St. Andrews Presbyterian Church</u>     St. Andrews Annual Dinner Dance
    September 18, 2013

Ducks Uniforms - Fundraising Drive          *No Response*
  <u>Anaheim Ducks Hockey Team</u>
  Tuesday, September 27, 2013
                                                                                     *Internal*
                                                                                     <u>More...</u>

FIG. 7

▼ Latest News    Beneficiary: [All ▼]

✏️ ⭐ Ducks hit $10K fundraising milestone    12 Minutes Ago
Anaheim Ducks Hockey Team
Thanks to the hard work of parents and kids alike, our team has surpassed all expectations in our annual drive...
Bookmarks: 23    👍(4) 👎(1)    Comment ⭐ Volunteers deliver 200 meals to seniors    3 Days Ago
St. Andrews Presbyterian Church
Organized by Steve Brown, Sunday school kids and parents spent last weekend delivering hot dinners to....
Bookmarks: 37    👍(4) 👎(1)    Comments (11)

⭐ AAA Hockey a prime source of NHL talent    2 Weeks Ago
Anaheim Ducks Hockey Team
According to a study by the professional hockey scouting association, more than 49% of players drafted into the...
Bookmarks: 37    👍(4) 👎(1)    Comments (11)

⭐ Lorem Ipsum dolor Sit Amet consectetur    2 Weeks Ago
Phasellus quis nisi ornare
Ut Aliquet Ipsum Purus. Sed Dapibus Ultrices Felis, Eu Sollicitudin Lorem Dignissim Eget. Donec Vestibulum...
Bookmarks: 37    👍(4) 👎(1)    Comments (11)

⭐ Lorem Ipsum dolor Sit Amet consectetur    2 Weeks Ago
Phasellus quis nisi ornare
Ut Aliquet Ipsum Purus. Sed Dapibus Ultrices Felis, Eu Sollicitudin Lorem Dignissim Eget. Donec Vestibulum...
Bookmarks: 37    👍(4) 👎(1) *Internal* Comments (11)

⭐ Lorem Ipsum dolor Sit Amet consectetur    2 Weeks Ago
Phasellus quis nisi ornare
Ut Aliquet Ipsum Purus. Sed Dapibus Ultrices Felis, Eu Sollicitudin Lorem Dignissim Eget. Donec Vestibulum...
Bookmarks: 37    👍(4) 👎(1)    Comments (11)

Less...

FIG. 8

Corporate Partners

Category: [All ▼]

| Near Me | New (16) | Today's Specials (21) |

City: [____] State: [▼] Distance: [5 Miles ▼]   List  Map

Or Zip: [____]

Costco  
18292 Kelly Johnson Parkway, Valencia, CA, 90123 .2 miles Directions

Chipotle  
38454 Newhall Ranch Road, Valencia, CA, 90123 .3 miles Directions

Panda Restaurant  
34254 Newhall Ranch Road, Valencia, CA, 90123 .4 miles Directions

Dick's Sporting Goods  
47245 McBean Parkway, Valencia, CA, 90123 .6 miles Directions More...

Rebate Allocations

| Beneficiary / Event | Rebate Percent | Target Date | Target Amt. | Your Rebates To-Date | Priority | Rebate Status | Ben/Event Status | | | |
|---|---|---|---|---|---|---|---|---|---|---|
| + Beneficiary 1 By Walter White | 30 | — | — | — | Y | | | Edit | Remove | Send Money |
| Beneficiary 2 By Walter White | 30 | — | — | — | ☐ | | | Edit | Remove | Send Money |
| − Beneficiary 3 By James Deer | 40 | | | | | Suspended | | Edit | Remove | Send Money |
| Event Number 1 | 15 | — | — | — | ☐ | | | Edit | Remove | Send Money |
| Event Number 2 | 15 | — | — | — | ☐ | | | Edit | Remove | Send Money |
| Event Number 3 | 10 | — | — | — | ☐ | | | Edit | Remove | Send Money |
| Add Event | | | | | | | | | | |
| Totals | 100% | | | | | | | | | |
| Add Beneficiary | | | | | | | | | | |

[Save]

Donations and Transfers

| | Event Date | Due Date | Total Amt. Due | Frequency | Transfers or Donations To-Date | Status | | | |
|---|---|---|---|---|---|---|---|---|---|
| − Beneficiary 3 By James Deer | | | | | $0.00 | N/A | | | |
| Team Annual Dues | N/A | 9/30/13 | $150.00 | | $150.00 | Paid | Edit | Remove | Send Money |
| Holiday Party | 12/1/13 | 10/30/13 | $120.00 | | $0.00 | Unpaid | Pay Externally | Transfer Funds | |
| Event Number 3 | N/A | 6/1/14 | 35.00 | Monthly | $105.00 | N/A | Pay Externally | | |
| Add Event | | | | | | | | | |
| Totals | | | | | | | | | |
| Add Beneficiary | | | | | | | | | |

Send Money to Another Beneficiary

Auto-Transfer is On

[Save]

Welcome! Walter White Invites You to Attend or Support the Following:

| | | |
|---|---|---|
| *Your Current Allocation to St. Andrews Roman Catholic Church: 0%* | *Total Rebates To-date You have Donated to St. Andrews Roman Catholic Church: $0.00* | |

St. Andrews Roman Catholic Church — We Welcome You to Join our Family-oriented Community Even If You Choose not to Offer Financial Support at this Time. You will be Notified of all News, Events and Discussions with no Obligation to Participate in Our Philanthropic Endeavors. Location: 25682 Valencia Blvd., Valencia, CA 91355 — <u>Learn More</u> <u>Directions</u> Join: Yes ☐ No ☐

Annual Church Dinner Dance — [Short Description] <u>Learn More</u> <u>Directions</u>
Event Date/Time: 11/15/2013 6:00 pm
25682 Valencia Blvd., Valencia, CA 91355
Amount Due: $150   Due Date: 10/15/2013
Pay Now: Yes ☐ No ☐

St. Andrew's Building Fund — [Short Description] <u>Learn More</u>
Event Date: 9/1/2013 Through 12/31/2014
Amount Due: At Your Discretion
Allocate or Donate: Yes ☐ No ☐

Annual Membership Dues — [Short Description] <u>Learn More</u>
Event Date: 9/1/2013 Through 12/31/2013
Amount Due: $200   Due Date: 12/31/2013
Pay Now: Yes ☐ No ☐

Autumn Pot-Luck Dinner — [Short Description] <u>Learn More</u>
Event Date/Time: 11/1/2013 6:00 pm
25682 Valencia Blvd., Valencia, CA 91355
Accept: Yes ☐ No ☐

506 Home | 508 Allocations | 510 Beneficiaries | 512 Accounts | 514 Corporate Partners

Beneficiary/Event

| Beneficiary/Event | Type | Goal Amount | Total Allocators | Total Participants | Current Balance | Private | Invitations (Accepted/Sent) | | |
|---|---|---|---|---|---|---|---|---|---|
| + Beneficiary 1 | 501(c)(3) | $1M | 5k | 100k | $940,000 | N | 1500/2000 | Invite | Edit |
| + Beneficiary 2 | Person | $50,000 | 3 | 5 | $1,050 | Y | 5/9 | Invite | Edit |
| − Beneficiary 3 | | | | | | | | | |
| Event 1 | | | | | | | | | |
| Event 2 | | | | | | | | | |
| Event 3 | Dues | $15,000 | 300 | 500 | $10,250 | N | 41/52 | Invite | Edit |

Add Beneficiary

FIG. 13

Participants
Anaheim Ducks Hockey Team

| Summary | Partici-pants ▽ | Microsite Features | Invita-tions | Sett-ings |
|---|---|---|---|---|

Created: 01/05/2013   Last Updated: 01/05/2013

Participant Status Filter: [All Participants ▸]

Event Filter: [All Participants ▸]

Participants

| Social Member | # of Times Flagged | Allocation Percent | Goal Date | Goal Amount | Allocations To-Date | Contributions To-Date | Roster Contact | Invited / Not Accepted | Registered / Not Registered | Anonymous / Unconfirmed | Submitted Externally | Refund Requested | Tasks | Select |
|---|---|---|---|---|---|---|---|---|---|---|---|---|---|---|
| John Doe | 15 | — | — | — | — | — | — | — | — | Y | — | — | 1 | ☐ |
| Walter White | 0 | — | — | — | — | — | — | Y | — | Y | — | — | — | ☐ |
| James Deer | 22 | 10 | — | — | — | — | Y | — | — | — | — | — | — | ☐ |
| Jen Madrid | 0 | — | — | — | — | — | Y | — | — | Y | — | — | 2 | ☑ |
| Totals | 8 | | | | | | | | | | | | | |

| Print Participants List (35) | Review/Process Refund Requests (3) | Record External Payment by Selected Participants | Create Personal Message to Selected Participants |
|---|---|---|---|
| | | | Remove Selected Participants |

FIG. 14

Participants
Annaheim Ducks Hockey Team

| | Summary | Participants ▽ | Microsite features | Invitations | Settings |
|---|---|---|---|---|---|
| | | Participant Type | Allocation % | Role | Member Since | Select |

| | Participant Name, Description, City/State | Participant Type | Allocation % | Role | Member Since | Select |
|---|---|---|---|---|---|---|
| | Jen Madrid<br>Number 1 ranked PeeWee AAA Team in western U.S.A. Anaheim, CA | $ | 90 | Roster Contact | 7/14/13 | ☐ |
| | Lori Marks<br>Short Description ullamcorper tultricies aliquet ipsumus Sollicitudin, AW | $ | 50 | Roster Member | 7/14/13 | ☐ |
| | Tom Greene<br>Short Description ullamcorper tultricies aliquet ipsumus Sollicitudin, AW | $ | 10 | Roster Member | 7/14/13 | ☐ |
| | James Deer<br>Short Description ullamcorper tultricies aliquet ipsumus Sollicitudin, AW | 👥 | 0 | Participant | 7/14/13 | ☐ |
| | John Doe<br>Short Description ullamcorper tultricies aliquet ipsumus Sollicitudin, AW | $ | Private | Co-Manager | 7/14/13 | ☐ |
| | Walter White<br>Short Description ullamcorper tultricies aliquet ipsumus Sollicitudin, AW | $ | Private | Participant | 7/14/13 | ☐ |
| | Steve Brown<br>Short Description ullamcorper tultricies aliquet ipsumus Sollicitudin, AW | $ | 100 | Primary Mgr. | 7/14/13 | ☑ |
| | Matt Rand<br>Short Description ullamcorper tultricies aliquet ipsumus Sollicitudin, AW | 👥 | 60 | Participant | 7/14/13 | ☑ |

[Print Participants List (35)] [Create Message]

FIG. 15 the magic of ✩macy's

Merchant ID 67596

Store Locator

Macy's, Inc.

Latest News

Latest Offers

Notifications  610

Flags (1)
Invitations
Activities (7)
Messages (19)
Tasks (2)
Approvals

Balances  620
Spending Account         $201.44
Dodgers Little League    $175.62
Susan G. Komen           $167.87
Credit Card            $9201.33
Pending Cash Back         $42.99
YTD Cash Back            $615.74

My Priorities  630
Funds collected
WCC                      $250.31
Dodgers Little League    $175.00
Children of the Night    $155.96
Calder's College Fund    $123.05

FIG. 16

| CHANDLER LITTLE LEAGUE ASTROS | MERCHANT PARTNERSHIPS | BETH MILLER |
|---|---|---|

CONSUMER-MERCHANT PARTNERSHIP

AS A CAUSE MERCHANT, YOU HAVE THE TOOLS TO GET THE MOST OUT OF YOUR RELATIONSHIP WITH MERCHANTS WHO CONTRIBUTE SUBSTANTIALLY TO YOUR CAUSE. THROUGH THE PARTNERSHIPS HIGHLIGHTED BELOW, YOU WILL ENGAGE THROUGH THE PLATFORM WITH SELECTED MERCHANTS IN MUTUALLY BENEFICIAL COOPERATION:

1. YOU AGREE TO PROMOTE THE MERCHANT AMONG YOUR CAUSE PARTICIPANTS
2. THE MERCHANT GIVES YOU TOOLS AND MATERIALS TO ASSIST YOU
3. YOUR CAUSE REAPS THE REWARDS IN INCREASED REBATES COMING IN FROM THE MERCHANT
4. NEGOTIATE SPECIAL REBATES FOR LARGE GROUP ACTIVITIES FOR YOUR CAUSE

MERCHANT PARTNERSHIPS

DAY   WEEK   MONTH   YEAR
————————●————————

| | | REBATES PAID | PARTNERSHIP STATUS | MARKETING MATERIALS | SPECIALS | | |
|---|---|---|---|---|---|---|---|
| ▽ | HAPPY DAWG HOT DOGS<br>MAIN STREET<br>DAWSON<br>HILLCREST<br>HIGHWAY 66<br>--MORE-- | $15,322.37<br>$2,355.26<br>$2,101.78<br>$1,699.01<br>$1,515.47 | ACTIVE | YES | YES | | |
| △ | BESTCRUST PIZZA | $10,589.51 | ACTIVE | YES | YES | | |
| △ | PIE FACTORY | $9,683.21 | REQUESTED BY CAUSE | ☐ | ☐ | INITIATE PARTNERSHIP | ⊗ |
| △ | HILL*MART | $8,213.95 | OFFERED BY MERCHANT | ☐ | ☐ | RESPOND | ⊗ |
| △ | MOREBEV | $7,419.43 | SUGGESTED | ☐ | ☐ | INITIATE PARTNERSHIP | ⊗ |
| △ | MEDITERRANEAN MAGIC<br>--MORE-- | $6,339.89 | SUGGESTED | ☐ | ☐ | INITIATE PARTNERSHIP | ⊗ |

[FIND/ADD CAUSE]

FIG. 18

HAPPY DAWG HOT DOGS                                           JOE DOGS

CONSUMER PARTNERSHIPS

CONSUMER-MERCHANT PARTNERSHIP

AS A MERCHANT, YOU HAVE THE TOOLS TO GET THE MOST OUT OF YOUR RELATIONSHIP WITH CONSUMER GROUPS WHO CONTRIBUTE SUBSTANTIALLY TO YOUR BOTTOM LINE. THROUGH THE PARTNERSHIPS HIGHLIGHTED BELOW, YOU WILL ENGAGE THROUGH WITH SELECTED CAUSE GROUPS IN MUTUALLY BENEFICIAL COOPERATION:

1. THE CAUSE AGREES TO PROMOTE YOUR BRAND AMONG ITS PARTICIPANTS
2. YOU PROVIDE PROMOTIONAL TOOLS AND MATERIALS
3. TRACK INCREASES IN BUSINESS AND LOYALTY THROUGH ANALYTIC TOOLS
4. GAIN DIRECT INSIGHT THROUGH ANALYTICS AND SOCIAL MEDIA INTO THE NEEDS AND PREFERENCES OF YOUR CUSTOMERS
5. CONSIDER REQUESTS FOR SPECIAL REBATES FOR LARGE GROUP ACTIVITIES FOR YOUR PARTNER CAUSE

CONSUMER PARTNERSHIPS

DAY   WEEK   MONTH   YEAR

| | TOTAL SALES | PARTNERSHIP STATUS | MARKETING MATERIALS | SPECIALS | ACTION |
|---|---|---|---|---|---|
| CAUSE 1 | $315,322.37 | ACTIVE | YES | YES | |
| CAUSE 2 | $222,355.26 | ACTIVE | YES | YES | |
| CAUSE 3 | $192,101.78 | ACTIVE | YES | YES | |
| CAUSE 4 | $181,699.01 | REQUESTED BY CAUSE | YES | YES | RESPOND |
| CAUSE 5 | $171,515.47 | OFFERED BY MERCHANT | YES | YES | |
| CAUSE 6 | $160,589.51 | ACTIVE | YES | YES | |
| CAUSE 7 | $148,683.21 | REQUESTED BY CAUSE | YES | YES | |
| CAUSE 8 | $145,213.95 | SUGGESTED | ☐ | ☐ | OFFER PARTNERSHIP |
| CAUSE 9 | $138,419.43 | SUGGESTED | ☐ | ☐ | OFFER PARTNERSHIP |
| CAUSE 10 | $126,339.89 | SUGGESTED | ☐ | ☐ | OFFER PARTNERSHIP |

--MORE--

FIND/ADD CAUSE

FIG. 19

Initiate Merchant Partnership

Chandler Little League Astros

Beth Miller

| Day Week Month Year | Rebates Paid | Partnership Status | Request Marketing Materials | Request Specials | |
|---|---|---|---|---|---|
| ▷ MoreBev | $7,419.43 | Suggested | ☐ | ☐ | ⊗ |

Accept: ○   Decline: ○

Note to Merchant: [                    ]

[Send]

Respond to Merchant Partnership Offer

Chandler Little League Astros

Beth Miller

| Day Week Month Year | Rebates Paid | Partnership Status | Request Marketing Materials | Request Specials | |
|---|---|---|---|---|---|
| ▷ MoreBev | $7,419.43 | Suggested | ☐ | ☐ | ⊗ |

Accept: ○   Decline: ○

Note to Merchant: [                    ]

Note from Merchant: Dear Astros,
Congratulations on your amazing streak this season! Here at MoreBev we were wondering if you would like to partner with us to create a beverage-filled summer your team will never forget. Please let us know when you would like the fun to start!

Jonathan Freehoffer
Marketing Director

[Send]

FIG. 21

Offer Consumer Partnership

MoreBev     Jane Deer

Day  Week  Month  Year    Total Sales    Partnership Status    Offer Marketing Materials    Offer Specials ▷ Chandler Little League Astros    $77,419.43    Suggested    ☐    ☐    ⊗

Accept: ○   Decline: ○

Note to Consumer: [                                                    ]

[Send]

Respond to Consumer Partnership Request

MoreBev     Jane Deer

Day  Week  Month  Year    Rebates Paid    Partnership Status    Offer Marketing Materials    Offer Specials ▷ Chandler Little League Astros    $77,419.43    Suggested    ☐    ☐    ⊗

Accept: ○   Decline: ○

Note to Merchant: [                                                    ]

Note from Merchant:  Dear MoreBev,
All the parents of our players love your store for the convenience and extensive selection of quality beverages. Players and parents alike have an insatiable thirst. I wonder if we could collaborate on a "hydration" project as summer approaches.

Beth Miller
Team Manager    [Send]

FIG. 23

SOCIAL-FINANCIAL NETWORK SYSTEMS AND METHODS

CROSS-REFERENCE TO RELATED APPLICATIONS

This application is a continuation of U.S. patent application Ser. No. 14/713,924, filed May 15, 2015, which claims priority to U.S. Patent Application No. 61/993,926, filed May 15, 2014, U.S. Patent Application No. 62/055,541, filed Sep. 25, 2014, U.S. Patent Application No. 62/083,026 filed Nov. 21, 2014, and U.S. Patent Application No. 62/158,350 filed May 7, 2015, the entire contents of which are incorporated by reference in their entirety for all purposes.

TECHNICAL FIELD

The present disclosure relates generally to systems and methods for providing social and financial networks.

SUMMARY OF THE INVENTION

In a first embodiment, the present invention may be embodied in social-financial platform system comprising: a first user account associated with a first user; a first merchant account associated with a first merchant; and a rebate processor configured to process rebates. The rebate processor is further configured to: receive transaction information relating to a purchase made by the first user at the first merchant, calculate a rebate based on the transaction information, and instantaneously transfer the calculated rebate to the first user.

In a further aspect of this embodiment, the system may further comprise: a monolithic financial account; a first user financial account associated with the first user account, wherein the first user financial account is part of the monolithic financial account; and a first merchant financial account that is associated with the first merchant account, wherein the first merchant financial account is part of the monolithic financial account. The rebate processor is further configured to instantaneously transfer the calculated rebate from the first merchant financial account to the first user financial account.

In another aspect of this embodiment, the system may further comprise: a monolithic financial account; a first user financial account associated with the first user account, wherein the first user financial account is part of the monolithic financial account; and a platform financial account that is part of the monolithic financial account. The rebate processor is further configured to instantaneously transfer the calculated rebate from the platform financial account to the first user financial account on the first merchant's behalf, and keep record of rebates paid out of the platform financial account on the first merchant's behalf for settlement at a later time.

The rebate processor may be configured to calculate a rebate based on the transaction information and a rebate offer specified by the first merchant.

The transaction information may comprise SKU-level information. The system may further comprise a first manufacturer account associated with a first manufacturer, wherein the rebate comprises a merchant rebate and a manufacturer rebate, and the rebate processor is further configured to: calculate the merchant rebate based on the transaction information, calculate the manufacturer rebate based on transaction information, and instantaneously transfer the merchant rebate and the manufacturer rebate to the first user.

In preferred embodiments, the rebate may be transferred to the first user financial account without an ACH transaction.

In a second embodiment, the present disclosure may be embodied in a method comprising: establishing a first user account associated with a first user; establishing a first sponsor account associated with a first sponsor; receiving transaction information from a purchase made by the first user involving the first sponsor; calculating a rebate based on the transaction information; and instantaneously transmitting the rebate to the first user account.

In one aspect of this embodiment, the method may further comprise: establishing a monolithic financial account structure; establishing a first user virtual financial account that is associated with the first user account and part of the monolithic financial account structure; establishing a first sponsor virtual financial account that is associated with the first sponsor account and part of the monolithic financial account structure, wherein instantaneously transmitting the rebate to the first user account further comprises instantaneously transmitting the rebate from the first sponsor virtual financial account to the first user virtual financial account.

In another aspect of this embodiment, the method may further comprise: establishing a monolithic financial account structure; establishing a first user virtual financial account that is associated with the first user account and part of the monolithic financial account structure; establishing a platform financial account that is part of the monolithic financial account structure, wherein instantaneously transmitting the rebate to the first user account further comprises instantaneously transmitting the rebate from the platform financial account to the first user virtual financial account on the first sponsor's behalf. In this aspect, the method may further comprise keeping a record of the rebate paid out on the first sponsor's behalf for settlement at a later time.

The step of calculating a rebate based on the transaction information may comprise calculating a rebate based on the transaction information and a rebate offered by the first sponsor. This step may even further comprise calculating a second rebate based on a second rebate offered by a second sponsor.

The transaction information may comprise SKU-level information.

In certain embodiments, the rebate may be transmitted to the first user without an ACH transaction.

In a third embodiment, the present disclosure may be embodied in a method comprising: receiving transaction information from a point of sale indicating a transaction by a first user at a first merchant; determining that the first merchant has a merchant rebate offer; determining that the transaction qualifies for a merchant rebate based on the merchant rebate offer; calculating the merchant rebate based on the transaction information and the merchant rebate offer; and automatically transmitting the merchant rebate to the first user.

The method may further comprise: establishing a monolithic financial account structure; establishing a first user virtual financial account that is associated with the first user and part of the monolithic financial account structure; establishing a first merchant virtual financial account that is associated with the first merchant and part of the monolithic financial account structure, wherein automatically transmitting the merchant rebate to the first user further comprises instantaneously transmitting the merchant rebate from the first merchant virtual financial account to the first user virtual financial account.

The method may further comprise: establishing a monolithic financial account structure; establishing a first user virtual financial account that is associated with the first user and part of the monolithic financial account structure; establishing a platform financial account that is part of the monolithic financial account structure, wherein automatically transmitting the merchant rebate to the first user further comprises instantaneously transmitting the merchant rebate from the platform financial account to the first user virtual financial account on the first merchant's behalf. A record may be kept of the merchant rebate paid out on the first merchant's behalf for settlement at a later time.

In another aspect, the method may further comprise: determining that the transaction qualifies for a manufacturer rebate based on a manufacturer rebate offer offered by a first manufacturer; calculating the manufacturer rebate based on the transaction information and the manufacturer rebate offer; and automatically transmitting the manufacturer rebate to the first user.

The method may even further comprise: establishing a monolithic financial account structure; establishing a first user virtual financial account that is associated with the first user and part of the monolithic financial account structure; establishing a first manufacturer virtual financial account that is associated with the first manufacturer and part of the monolithic financial account structure, wherein automatically transmitting the manufacturer rebate to the first user further comprises automatically transmitting the manufacturer rebate from the first manufacturer virtual financial account to the first user virtual financial account.

Rather than (or in addition to) a first manufacturer virtual financial account, a platform financial account may be established, and the rebate automatically transferred from the platform financial account to the first user virtual financial account on the first manufacturer's behalf. A record may be kept of the manufacturer rebate paid out on the first manufacturer's behalf for settlement at a later time.

In certain aspects, both the merchant rebate and the manufacturer rebate may be transmitted to the first user without an ACH transaction.

In a fourth embodiment, the present disclosure may be embodied in a social-financial platform system comprising: a monolithic financial account; a first virtual user financial account within the monolithic financial account; and a rebate processor. The rebate processor may be configured to: determine a rebate offered by a first sponsor-member, and automatically distribute the rebate to the first virtual user financial account.

In a fifth embodiment, the present disclosure may be embodied in a social-financial platform system comprising: a social-financial platform for interaction of one or more members of the social-financial platform; a first consumer-member of the social-financial platform; a first virtual consumer financial account associated with the first consumer-member; a monolithic financial account comprising the first virtual user financial account; and a rebate processor configured to: determine a rebate offered by a first sponsor-member of the social-financial platform, and automatically distribute the rebate to the first virtual consumer financial account.

The social-financial platform may be configured to display a notification of the rebate for viewing by one or more members of the social-financial platform.

The monolithic financial account may further comprise a first virtual sponsor financial account associated with the first sponsor-member, and the rebate processor further configured to automatically distribute the rebate to the first virtual consumer financial account from the first virtual sponsor financial account.

The monolithic financial account may also comprise (alternatively to or in addition to the first virtual sponsor financial account) a platform reserve financial account, and the rebate processor further configured to automatically distribute the rebate to the first virtual consumer financial account from the platform reserve financial account.

In a sixth embodiment, the present disclosure may be embodied in a method comprising: receiving transaction information indicating a purchase made by a first user at a first merchant; determining that the first user is a member of a social financial platform; and transmitting the transaction information to the social financial platform for processing of a rebate.

In a seventh embodiment, the present disclosure may be embodied in a social financial platform system comprising: a first user account associated with a first user; a first sponsor account associated with a first sponsor; a first beneficiary account associated with a first beneficiary; a payment processor; and a rebate processor. The rebate processor may be configured to: receive a set of rebate preferences from the first user, receive transaction information from the payment processor, calculate a rebate based on the transaction information and the set of rebate preferences, and instantaneously transfer a first portion of the rebate to the first user account and a second portion of the rebate to the first beneficiary account according to the set of rebate preferences.

The set of rebate preferences may comprise a rebate allocation preference. The rebate allocation preference may comprise a first beneficiary percentage defining a percentage of the rebate to be allocated to the first beneficiary. The rebate allocation preference may comprise a first beneficiary amount defining a set amount of the rebate to be allocated to the first beneficiary before allocation of any remainder.

In an eight embodiment, the present disclosure may be embodied in a method comprising: creating a first user account associated with a first user on a social-financial platform; creating a first beneficiary account associated with a first beneficiary on the social-financial platform; receiving a rebate preference from the first user; receiving transaction information from a purchase made by the first user at a first merchant; determining that the first merchant is offering a merchant rebate offer; calculating a rebate based on the transaction information and the merchant rebate offer; and automatically transmitting a first portion of the rebate to the first beneficiary account according to the rebate preference.

The method may further comprise automatically transmitting a second portion of the rebate to the first user virtual financial account according to the rebate preference.

The rebate preference may comprise a first beneficiary percentage defining a percentage of the rebate to be allocated to as the first portion of the rebate to the first beneficiary. The rebate preference may comprise a first beneficiary contribution amount defining a set amount of the rebate to be allocated as the first portion of the rebate to the first beneficiary before allocation of any remainder.

The method may further comprise creating a second beneficiary account associated with a second beneficiary on the social-financial platform, and automatically transmitting a second portion of the rebate to the second beneficiary account according to the rebate preference.

The method may further comprise creating a first merchant account associated with a first merchant on the social-financial platform, wherein automatically transmitting a first portion of the rebate to the first beneficiary account further comprises transferring the first portion of the rebate from the first merchant account to the first beneficiary account.

In another aspect of this embodiment, the method may further comprise creating a first merchant account associated with a first merchant on the social-financial platform, and the social financial platform may comprise a virtual platform account such that automatically transmitting a first portion of the rebate to the first beneficiary account further comprises transferring the first portion of the rebate from the virtual platform account to the first beneficiary account on behalf of the first merchant. A record may be kept of the first portion of the rebate transferred on behalf of the first merchant for settlement at a later date.

In another aspect of this embodiment, the method may further comprise establishing a donation record associated with the first user, and recording the first portion of the rebate transferred to the first beneficiary account in the donation record.

In another aspect of this embodiment, the method may further comprise posting a notification to the social financial platform identifying the first portion of the rebate transmitted to the first beneficiary account. The notification may identify at least one of: the first user, the amount of the first portion of the rebate, the first beneficiary, and the first merchant.

In a ninth embodiment, the present disclosure may be embodied in a social-financial platform system comprising: a social-financial platform; a plurality of user accounts on the social-financial platform; a plurality of sponsor accounts on the social-financial platform; a plurality of beneficiary accounts on the social-financial platform; and a rebate processor. The rebate processor may be configured to: automatically calculate one or more rebates offered by the plurality of sponsors, and automatically distribute the one or more rebates to the plurality of user accounts and the plurality of beneficiary accounts.

In certain aspects of this embodiment, each of the plurality of virtual user financial accounts is associated with a user, and each user has a rebate disbursement preference. The rebate processor may be further configured to automatically distribute the rebates according to each user's rebate disbursement preference.

In a tenth embodiment, the present disclosure may be embodied in a method comprising: creating a first user account associated with a first user within a rebate platform; receiving first payment token information associated with a first payment token belonging to the first user; creating a first virtual GPR account associated with the first payment token; receiving a rebate offer from a first merchant; receiving transaction information from the first merchant indicating a purchase by the first user using the first payment token; calculating a rebate based on the transaction information the rebate offer; and automatically transferring the rebate to the first virtual GPR account.

The payment token may be a credit card. If the credit card has a spending limit, the method may further comprise establishing a virtual GPR account spending allowance based on the card spending allowance. The credit card may have an acquiring bank, and the method may further comprise communicating with the acquiring bank to associate the credit card with the rebate platform.

In an eleventh embodiment, the present disclosure may be embodied in a method comprising: creating a first user account associated with a first user within a rebate platform; receiving first payment token information associated with a first payment token belonging to the first user; creating a first virtual GPR account associated with the first payment token; receiving a first set of rebate preferences associated with the first user account; creating a first beneficiary account associated with a first beneficiary within the rebate platform; receiving a rebate offer from a first merchant; receiving transaction information from the first merchant indicating a purchase by the first user using the first payment token; calculating a rebate based on the transaction information the rebate offer; and automatically transferring the rebate to the first beneficiary account and the first virtual GPR account according to the first set of rebate preferences.

A first portion of the rebate may be transferred to the first beneficiary account and a second portion of the rebate transferred to the first virtual GPR account.

In a twelfth embodiment, the present disclosure may be embodied in a system comprising: a payment token registered on a rebate platform; a rebate processor for processing rebates on the rebate platform; and a payment processor having a database storing payment token information related to the payment token, wherein the payment token information stored in the database associates the payment token with the rebate platform such that transactions performed by the payment token cause the payment processor to transmit transaction information to the rebate processor.

The payment token may be a credit card, and the payment processor an acquiring bank. The database may associate a BIN number associated with the credit card with the rebate platform.

The rebate platform may comprise: a first user account, and a first beneficiary account, and the rebate processor may be configured to automatically transmit rebates to the first user account and the first beneficiary account.

In a thirteenth embodiment, the present disclosure may be embodied in a method comprising: establishing a monolithic financial account; creating a first user account within the monolithic financial account, the first user account associated with a first user residing in a first country; creating a second user account within the monolithic account structure, the second user account associated with a second user residing in a second country; transferring funds from the second user account to the first user account within the monolithic financial account, wherein the funds transferred from the second user account to the first user account may be used to make purchases in the first country.

The method may be performed without charging any fees for the transfer of funds from the second user account to the first user account. The funds may be transferred instantaneously from the second user account to the first user account.

In certain aspects of this embodiment, the first user account may be associated with a first payment token that has been issued by a first bank that is permitted to issue payment tokens within the first country, and the funds transferred from the second user account to the first user account may be used to make purchases in the first country by using the first payment token. The second user account may be associated with a second payment token that has been issued by a second bank that is permitted to issue payment tokens within the second country. The first payment token may be a GPR (debit) card.

In a fourteenth embodiment, the present disclosure may be embodied in a system comprising: a monolithic financial account comprising a plurality of user accounts; a first user account in the monolithic financial account associated with a first user residing in a first country; and a second user account in the monolithic financial account associated with a second user residing in a second country, wherein funds may be instantaneously transferred between the first and second user accounts, and further wherein funds transferred from the second user account to the first user account may be used to make purchases in the first country.

The system may further comprise a first payment token associated with the first user account, wherein funds transferred from the second user account to the first user account may be used to make purchases in the first country using the first payment token.

The first payment token may be issued by a first bank authorized to issue payment tokens in the first country.

The system may further comprise a second payment token associated with the second user account, wherein the second payment token is issued by a second bank authorized to issue payment tokens in the second country.

Funds associated with the monolithic account structure may be stored in both the first bank and the second bank.

The payment tokens may be GPR cards.

In a fifteenth embodiment, the present disclosure may be embodied in a method comprising: establishing a monolithic financial account; creating a first set of user accounts within the monolithic financial account, the first set of user accounts associated with a first set of users residing in a first country, the first set of user accounts having a first set of funds kept in a first bank in the first country; creating a second set of user accounts within the monolithic account structure, the second set of user accounts associated with a second set of users residing in a second country, the second set of user accounts having a second set of funds kept in a second bank in the second country; transferring funds between the first set of user accounts and the second set of user accounts within the monolithic financial account; aggregating the transfer of funds between the first set of user accounts and the second set of user accounts to calculate a net funds transfer between the first set of user accounts and the second set of user accounts; and initiating a transfer of funds between the first bank and the second bank based on the net funds transfer.

In a sixteenth embodiment, the present disclosure may be embodied in a system comprising: a monolithic financial account comprising a plurality of user accounts and funds associated with the plurality of user accounts; a first user account in the monolithic financial account associated with a first user residing in a first country and a second user account in the monolithic financial account associated with a second user residing in a second country; a first bank authorized to issue payment tokens in the first country and housing a first portion of the funds associated with the plurality of user accounts; a second bank authorized to issue payment tokens in the second country and housing a second portion of the funds associated with the plurality of user accounts; and a first payment token issued to the first user by the first bank. Funds may be instantaneously transferred between the first and second user accounts, and funds transferred from the second user account to the first user account may be used to make purchases in the first country via the first payment token.

The present disclosure may also be embodied in non-transitory computer readable medium comprising an instruction set configured to cause a computing device to carry out any of the methods described herein.

Although various combinations of limitations have been disclosed with respect to each of the systems and methods described above, it should be appreciated that these do not constitute every limitation disclosed herein nor do they constitute every possible combination of limitations. As such, it should be appreciated that additional limitations and different combinations of limitations presented within this disclosure remain within the scope of the disclosed invention.

These and other features and advantages of the invention should become more readily apparent from the detailed description of the preferred embodiments set forth below taken in conjunction with the accompanying drawings, which illustrate, by way of example, the principles of the invention.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

FIG. 7 provides an exemplary scheduling and calendar function page of a social-financial platform, in accordance with an embodiment of the present disclosure.

FIG. 8 provides an exemplary news function page of a social-financial platform, in accordance with an embodiment of the present disclosure.

FIG. 9 provides an exemplary corporate partners information page of a social-financial platform, in accordance with an embodiment of the present disclosure.

FIG. 10 provides an exemplary rebate allocation form of a social-financial platform, in accordance with an embodiment of the present disclosure.

FIG. 11 provides an exemplary event invitation page of a social-financial platform, in accordance with an embodiment of the present disclosure.

FIG. 13 provides an exemplary beneficiary management page of a social-financial platform, in accordance with an embodiment of the present disclosure.

FIG. 14 provides an exemplary participant listing page of a social-financial platform, in accordance with an embodiment of the present disclosure.

FIG. 15 provides an exemplary beneficiary participant listing page of a social-financial platform, in accordance with an embodiment of the present disclosure.

FIG. 16 provides an exemplary sponsor-member microsite that is part of a social-financial platform, in accordance with an embodiment of the present disclosure.

FIG. 18 provides an exemplary consumer-member view of a consumer-merchant partnership page, in accordance with an embodiment of the present disclosure.

FIG. 19 provides an exemplary merchant-member view of a consumer-merchant partnership page, in accordance with an embodiment of the present disclosure.

FIG. 20 provides an exemplary consumer-member view of a merchant partnership request, in accordance with an embodiment of the present disclosure.

FIG. 21 provides an exemplary consumer-member view of a merchant partnership request response page, in accordance with an embodiment of the present disclosure.

FIG. 22 provides an exemplary merchant-member view of a consumer partnership request, in accordance with an embodiment of the present disclosure.

FIG. 23 provides an exemplary merchant-member view of a consumer partnership request response page, in accordance with an embodiment of the present disclosure.

DETAILED DESCRIPTION OF VARIOUS EMBODIMENTS

Figure 1:
FIG. 1 provides a flow chart representation of a social-financial platform registration process, in accordance with an embodiment of the present disclosure.

The technology disclosed herein in various embodiments is directed toward a system and method for providing combined social and financial networks to facilitate individuals, businesses and corporations, groups and organizations, and other persons or entities (individually or collectively, "entity" or "entities") to achieve or work toward desired financial goals as well as to connect socially. In accordance with various embodiments, systems and methods can be provided to allow a system user, such as an individual user, to set up a network and infrastructure to allow financial contributions from purchases the user makes, as well as contributions resulting from purchases that members of the user's network may make, to be allocated toward one or more beneficiaries as may be designated by the user.

For example, in one exemplary embodiment the user can be given the ability to create a presence within the social-financial network, identify or create one or more beneficiaries (sometimes referred to as "priorities" or "causes") to which the user would like financial contributions to be directed, and invite family, friends, colleagues and coworkers, or other members of the user's social network to also direct contributions to their designated beneficiaries or causes.

The system can be configured such that financial contributions to a user's causes can come from the user himself or herself, or from a variety of third-party sources. For example, in some embodiments, merchants or other businesses also enroll as users of the social-financial platform in a sponsor capacity. These enrolled sponsors (sometimes referred to herein as sponsor-members) can designate that a determined percentage of user purchases, for example, be directed to the benefit of the corresponding users' accounts—in many cases a charitable organization—with the users' consent. For example, a sponsor (e.g., a retailer or other merchant or organization) may agree to rebate a given percentage of all purchases made by users (e.g., or made by a given category or type of users) back to the users' accounts in the social-financial platform. The users, as described in greater detail below, can designate how to allocate some or all of the received rebates within their social-financial network amongst a plurality of beneficiaries or causes.

Before proceeding further with description, it is useful at this point to offer a simple example to provide context for this discussion. From time to time, various embodiments of the technology are described with reference to this or other simple examples. However, as will be apparent to one of ordinary skill in the art after reading this description, the technology described herein is not limited to application in these examples but can be applied in a number of different scenarios or applications. In this simple example, a user of the social-financial platform is a parent whose child is a player on a local Little League team. The Little League team desires to raise funds for things like player uniforms, balls, practice equipment, and transportation for away games. The parent-user enrolls with the social-financial platform and creates a user identity. The parent-user designates his or her child's Little League team as a cause (i.e. beneficiary) for financial contributions. The parent-user may also identify other causes or charities as additional beneficiaries among which to allocate received funds. The parent-user may also identify his or her own account as the recipient of received funds.

In some embodiments, the parent-user may be given the ability to create the designated little league team as a new charity or cause in the system, or the Little League team may have already been set up by another user. The parent-user is given the opportunity to designate how funds he or she receives should be allocated amongst his or her causes. For example, in various embodiments, the user can designate incoming funds on a percentage basis across his or her various causes. As another example, the system may be configured to allow the user to designate predetermined dollar amounts to one or more causes, with any leftovers being allocated by defined percentages. Once the allocations are established, received funds can be automatically distributed in accordance with the user's designations without further input by the user. The user can also be given the ability to change those allocations at any time, or to add or remove causes as desired by the user.

The parent-user in this example can also be given the opportunity to invite other entities to participate in one or more of his or her causes. For example, the parent-user can designate the e-mail addresses or other contact information of other parents or supporters of the Little League team and ask them to direct contributions to the Little League team as a cause. Team parents or other supporters may also choose to invite friends or family to direct contributions to the team.

In various embodiments, the system can be configured to allow the parent-user to enter contact information manually, or to import the contact information from that user's contacts, social-network friends, or other sources of such information. Recipients of this invitation, if not already members of the social-financial platform, will be given the opportunity (e.g. by way of an embedded link) to access the social-financial platform, create an account on the platform, and direct funds to the Little League team cause. In some embodiments, the Little League team cause that was the subject of the e-mail invitation can be automatically designated on the invited user's platform. Where recipients are already members of the social-financial platform, the e-mail invitation or in-platform invitation can include a link or other code which, when actuated, automatically designates the Little League team cause as a cause on that other user's network. The invited user can choose how much of his or her funds to allocate to the Little League team cause.

The social-financial platform provides a user interface that allows users to view their causes and allocations as desired. Further detailed examples of such a user interfaces are provided below. However, for purposes of this simple example, each user can log into his or her member space of the social-financial platform and see how much money the Little League team cause has raised. This can be displayed as a cumulative to-date total or as an amount received in a given time window. The further ability can be provided to allow the user to drill down into that information to see who has contributed funds to the cause and what amounts they have contributed. The user can also see which sponsors (e.g., participating businesses and organizations and other sponsors as described in more detail below) were the source of the financial contributions coming from the various participating members. In some embodiments, only designated individual users (e.g. the user who created the causes and other designees) can drill down for detailed information on the source of funds, while in other embodiments all contributors to a beneficiary can be given the ability to obtain additional information on the source of funds. In further embodiments, the sponsor can be given the opportunity to see what charities or other causes to which rebates from that sponsor were directed. In some cases, this can only be done with the customer's permission and/or with the cause's permission.

Important in all of this is the ultimate source of funds that are provided by the various user allocations to the various causes. In some embodiments, the source of funds can be provided by sponsors (e.g., merchants or other like businesses) that conduct business with the various users of the social-financial platform. For example, a big-box retailer can become a sponsor-member of the social-financial platform and offer to its customers, who are also users, cash incentives or other rewards based on user purchases or other activity. For example, a big-box retailer may choose to contribute financial rewards to its customers who are users of the platform for purchases or other activity conducted by those customers with the big-box retailer (these customers are sometimes referred to as consumer-users). Such financial contributions can be, for example, in the form of a rebate of a percentage of the dollar value of a consumer-user purchase, rewards of predetermined dollar amounts for various items purchased, or other like financial rewards. Such rewards are sometimes generally referred to herein as rebates.

Accordingly, when a user makes qualifying purchases at a participating retailer (or other sponsor), that retailer provides the appropriate financial rebate to the social-financial platform and designates the recipient of that rebate (e.g., identifies the consumer-user who made the qualifying purchase). The social-financial platform distributes the funds from that rebate to that user and his or her beneficiaries according to that user's designated allocations. Accordingly, when a user makes qualifying purchases at a participating retailer, the rebate resulting from such purchases will be displayed in that user's space on the social-financial platform, and the rebate will be allocated according to the designated allocations set forth by that user. As noted above, a user can drill down into the sources of funds for various causes (such as the Little League team), and see which users allocated portions of their rebate to the cause and which participating sponsors were the ultimate source of rebates funding that cause.

Participating sponsors can also provide other rewards in the form of coupons, discounts, or other deals or incentives to the users. For example, in some embodiments the Little League team may be provided the ability to load their game or practice schedule into the social-financial platform. This schedule can be provided to local participating sponsors such as restaurants, sporting goods stores, or other businesses of interest. In response, participating sponsors can post offers to the team or team members such as discounts on sporting goods, food coupons for team dinners, and so on.

Having thus described some aspects of the social-financial platform in the context of a straightforward example cause, more detailed exemplary embodiments of the social-financial platform are now described. This description is made with reference to the accompanying figures.

Member Registration Process

FIG. 1 provides a flow diagram illustrating an example process by which new users can be registered to the social-financial platform. As noted above, in some embodiments a new user can search the web and locate the registration screen to register to become a new member. As another example, a prospective user of the system can be invited by a cause or another user to join the system. In various embodiments the social financial platform offers users financial incentives for joining the platform and becoming financial members, and inviting others to join as financial members, up to and including the payment of incentive awards to nonprofit organizations with which the joining member is affiliated. As shown by the example flow diagram in FIG. 1, a user may be given the option to join the social-financial platform as a strictly social member, in which the user partakes only in the social aspect of the platform, or as a financial member, in which the user may partake in both the social and financial aspects of the platform (block 100). The next part of the registration process may include collecting basic registration information such as, for example, a user ID and password, as well as contact information such as address, e-mail and cell phone information from the user (block 105). The user may also be able to upload a profile photo or avatar they can be used to provide additional identification for the user on the network. The system can prompt the user as to whether he or she would like an explanation of the benefits offered by the system or whether he or she wishes to proceed with registration immediately.

Once the user's registration information is confirmed (block 110) (e.g., by sending a confirmation email, text message, or phone call), financial members may provide financial information to the platform (block 115). The user can be offered the opportunity to opt for a platform-branded payment card such as a prepaid debit card, bank debit card, or credit card, for example. If so, the system can collect the appropriate personal and financial information necessary to issue such a card. The system can also take the steps necessary to fund the prepaid debit card, and allow the user to add funds from his or her bank account to his or her new social-financial network account to begin participation. The new user can also be given the opportunity to register his or her own personal payment card with the system. Therefore, purchases made with a registered card can be identified by participating merchants as purchases eligible for a rebate or other special promotion, so that the user can obtain the appropriate credits for his or her purchases. In various embodiments, the user can be permitted to add or register multiple cards such that user can earn rewards and other rebates from the use of multiple cards. The user's financial information is verified at block 120. This may include contacting a user's bank or card issuer to verify the user's personal information against the bank or card issuer's records.

Next, the platform may receive a user's rebate and beneficiary preferences (block 125). In certain embodiments, users may be given the opportunity to decide how to allocate future rebates, and which beneficiaries to allocate portions of their rebates to. The user, as part of the process, can be given the opportunity to create new causes (i.e. beneficiaries), and-or identify existing causes from among a list of available causes. Additional information about processes that can be used to create causes is discussed below, as are example interfaces that can be used to browse or search for existing causes. Once causes have been determined, the registration process allows the user to allocate percentages of the funds he or she receives into the network among the various causes. The user can also designate himself or herself as a cause to receive all or a percentage of the incoming funds to the user's account. In various embodiments, the system can be configured to allow the user to designate one or more of the causes as an instant allocation cause such that funds received can go automatically or immediately to the designated cause in the amount allocated without further intervention or approval being required by the user. In other embodiments, the user can designate that pre-approval is required before releasing funds. In various embodiments, causes designated can be updated or changed (e.g., new causes added and various causes deleted, as desired) by the user outside of the registration process using one or more user interface screens provided by the social-financial platform. Likewise, the system can also be configured to allow the user the ability to change his or her allocation of funds among the various designated causes. Accordingly, in some embodiments, the system can be implemented to provide the user with complete control over allocations.

Users may have the option to invite an existing platform user who is not a participant with a particular beneficiary to participate with that beneficiary. In various embodiments, such an invitation can be delivered through various forms including, for example, e-mail and intra-system e-mail. This process contemplates that the user may or may not be a financial participant in the social-financial platform and that the user might only be a social participant. If the user is currently only a social participant, that user has the ability at this time to become a financial user, register his or her payment card information, and identify causes and allocations. The user can then be invited to allocate a portion of his or her received financial flow to the beneficiary that is the subject of the invitation. Accordingly, the system can be configured to bring the user to his or her allocations page so that the beneficiary can be added and the allocations specified.

Figure 2:
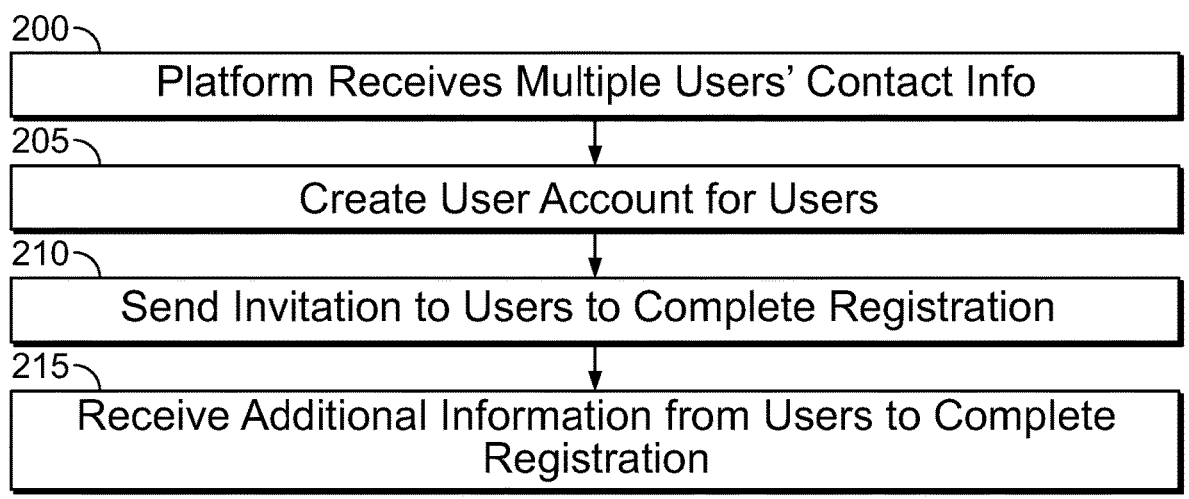
FIG. 2 provides a flow chart representation of a social-financial platform mass-registration process, in accordance with an embodiment of the present disclosure.

In various embodiments, the system can also be configured to facilitate a mass registration process. An example of such a process is described in FIG. 2. At block 200, the platform receives contact information for a plurality of users. These may be collected by a platform salesperson or representative, or gathered from multiple users who have submitted their contact information to the platform. Using this contact information, the platform creates user accounts for the plurality of users (block 205). The platform may not have sufficient information to create an active, and fully operational user account, but the platform can create an account with the information it has, and require a user to take additional steps to complete the registration/account creation process. At block 210, the platform sends an invitation to the plurality of users to complete the registration process and join the platform. In certain embodiments, this may take the form of an email with a temporary password and log-in information, or a unique URL link that the user can click to take them their account to complete registration. At block 215, users can log-in using their temporary password or using the URL and complete the registration process.

Sponsor Registration Process

Figure 3:
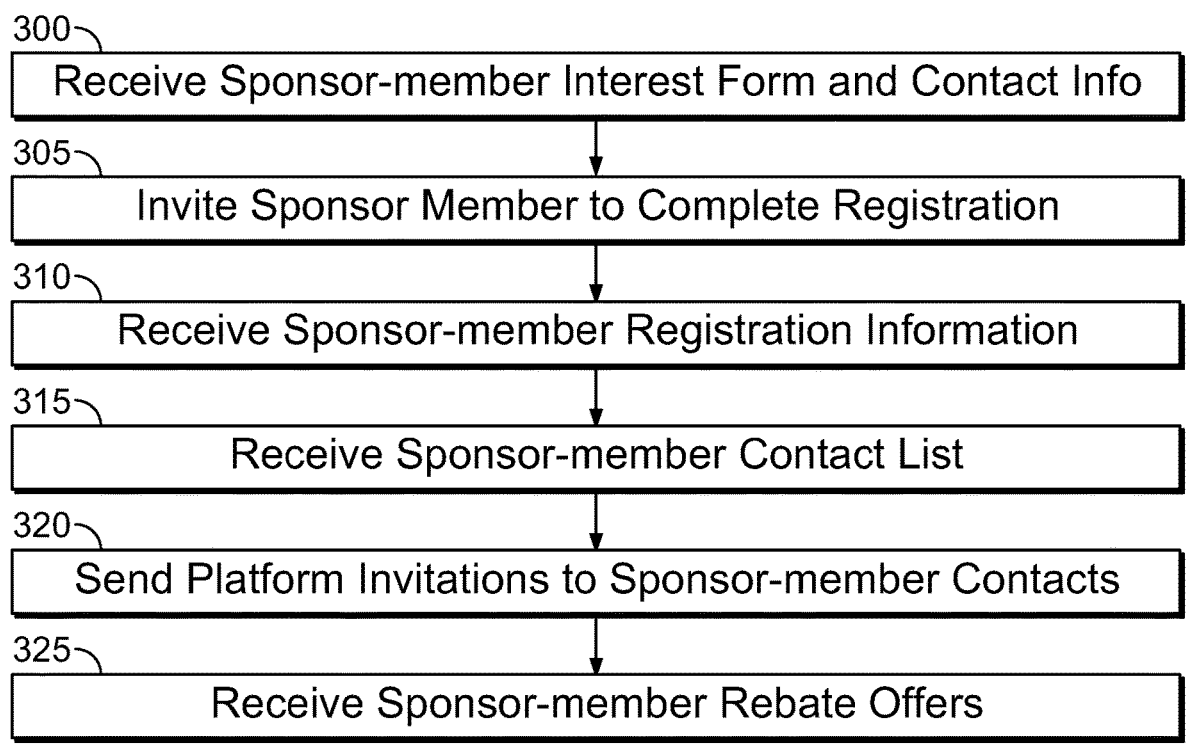
FIG. 3 provides a flow chart representation of a sponsor-member social-financial platform registration process, in accordance with an embodiment of the present disclosure.

Depending on their intended participation, merchants and other corporate members or businesses or sponsors/donors, may be asked to follow a similar, but slightly revised registration process to enable them to be configured as participants to give rebates to consumer members. FIG. 3 provides a flow chart of an example sponsor registration process according to various embodiments. The merchant, corporate partner or other sponsor-member may be provided information about the process and how it works and is asked for contact and other registration information. In certain embodiments, a sponsor-member may submit an application or other sign of interest in joining the platform, along with some basic contact information (block 300). Once the platform has reviewed the contact information, the platform may then invite the sponsor member to join by providing additional registration information to complete the registration process (block 305). Registration information may include: contact person first and last name; contact person title/position; business name; business phone; contact person direct phone; contact person and/or business email; business website; business category; business location information; business financial information (e.g., bank name, routing number, account number); and the like. More than one contact person may be listed for each sponsor-member account.

The sponsor-member can be given the opportunity to provide a group of contacts to which that sponsor would like invitations sent (block 315). Accordingly, a corporate partner or other sponsor-member looking to participate in the social-financial platform can, as part of the registration process, identify its own contacts (e.g., customers already on the sponsor-member mailing list), and have the system send invitations to those contacts (block 320). The invitations can be made to look as if they are coming from the sponsor-member or as if they are coming from the social-financial platform itself. The social-financial platform can be configured to check its existing membership to determine whether contacts identified by the sponsor-member are already members of the network. Accordingly, the system can be further configured to send the appropriate invitation to those contacts depending on their membership status. For example, new members would receive an invitation to join the system along with information about the system. Existing members, on the other hand, might be sent information specifically about the sponsor-member and its decision to join the social-financial network.

As part of the registration process, the sponsor-member can designate the amount of rebates it wishes to provide and other specials and offers it may wish to make available to its consumer-members (block 325). For example, the sponsor-member may decide to provide a percentage of the sale price of all purchases in the form of a rebate. As another example, the sponsor-number may decide to have different rebate levels for different purchase thresholds. Similarly, fixed dollar amounts can be refunded for particular purchases or for purchase thresholds. As these examples serve to illustrate, there are a number of different formulae or criteria that a sponsor-member can use to designate the amount of rebate to provide to consumer-members based on the amount or type of their purchases, products purchased, and so on.

Rebate Process

Figure 4:
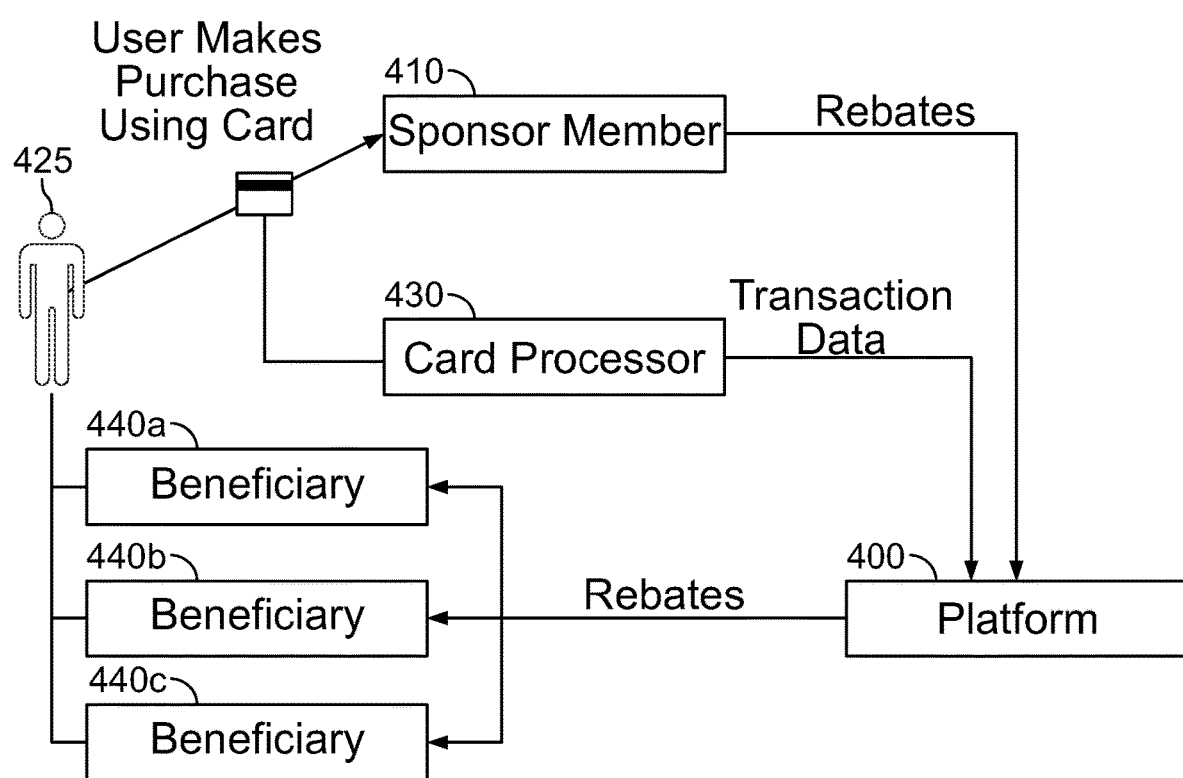
FIG. 4 provides a rebate financial flow diagram in accordance with an embodiment of the present disclosure.

As described in this document, one aspect of the social-financial network that can be included is the opportunity for users to earn financial rewards or rebates through their purchases or other activity with participating sponsor-members, and to allocate distribution of those rebates to the user's own account or to beneficiaries designated by the user in accordance with his or her allocations. FIG. 4 is a diagram illustrating an example process for a financial flow for rebates. In various embodiments, sponsor-members 410 or other like business members agree to provide some form of financial remuneration (i.e., rebates) to users or consumers members 425 in exchange for consumer members participating in activities designated by the sponsor-member 410 (e.g., making purchases from that sponsor's establishment(s), etc.).

As part of the registration process, the consumer-member 425 identifies one or more tokens (e.g., credit, debit or other payment cards) that he or she will use in making purchases with sponsor-members. Accordingly, when the consumer-member 425 makes a purchase with one of these identified cards, the consumer-member is identified as a member of the social-financial platform 400. The sponsor-member 410 from which purchases are made (e.g. a merchant) can be informed of or determine the user's participation and identity. With this information, the sponsor-member 410 identifies the consumer-member 425 as potentially eligible for a rebate and the amount and form of rebate, if any.

Accordingly, rebate information can be sent from the sponsor-member 410 to the social-financial platform 400 with an identification of the rebate amount and the user/consumer-member 425 on whose behalf the rebate should be credited. The rebate from the sponsor-member 410 to the platform 400 need not be a real-time financial transfer, but can be an indication of funds to be transferred which is then settled up daily or at some periodic interval, as will be discussed in greater detail below. In various embodiments, the sponsor-member 410 can be provided the opportunity to create a pre-funded debit account from which rebates to consumer-members are drawn.

When a rebate is received and designated for a consumer-member 425, the rebate can then be distributed by the platform 400 according to the consumer-member's designated allocations. As shown in the example of FIG. 4, this particular consumer-member 425 has chosen beneficiaries 440a, 440b, and 440c. As discussed previously, these beneficiaries may be charitable organizations, the consumer member 425's own account, other consumer member accounts, local organizations, or any other member of the platform 400 that is capable of receiving funds. The allocation can also be reported by the platform 400 in various ways including by displaying information about the distributions on the various members' websites (examples of which are described below) or by providing real-time and near real-time messages to the various members informing them of the allocations and distributions.

Rebates can be offered by any of a variety of members of the social-financial platform 400. For example, retailers or other like merchants can participate in providing rebates to eligible consumer-members as the above example illustrates. Likewise, other sponsor members can also give rebates (in any of a number of forms) to other members of the social-financial platform. For example, although a manufacturer (e.g. a supplier of a retailer or a supplier to an OEM that supplies a retailer, etc.) might not have direct commercial interactions with consumer members, that manufacturer may still wish to participate in the social-financial platform, provide rebates to consumers, and enjoy the benefits of the system. Accordingly, in some embodiments, the social-financial platform 400 can be configured to obtain information about consumer purchases, determine participating manufacturer-members who are suppliers or manufacturers (even if only in part) of the purchased goods upstream from the retailer, and collect rebates from such participating manufacturers for distribution to the consumer-member.

For example, in some embodiments, the system can be configured to collect SKU or other like information for consumer-member purchases. The SKUs, for example, can be provided as part of the point-of-sale transaction across the POS network, or the information can be provided through independent communication channel outside of the POS network. In this manner, a consumer-member might collect, and therefore have the ability to allocate, rebates from multiple points along the supply chain for a given purchased product.

By way of a further example, a computer-processor company may want to provide rebates to incentivize sales of laptops, desktops or other computers that use that company's processors. Accordingly, the processor company may offer consumer-members a rebate if they purchase a computer that includes that company's processor. Accordingly, without requiring retailer participation (other than perhaps having the retailer communicate SKU information to the system), the supplier can offer and manage rebates for its products through the social-financial platform. Of course, the system can be configured to also allow the supplier and retailer to partner together in enabling or providing the rebate. In such scenarios, the consumer may in essence receive a double rebate: one rebate for shopping at a sponsor-member retail location, and another rebate for purchasing a product including a supplier component (i.e. the processor) that is subject to the supplier's rebate.

As noted above, in some embodiments, the SKU information can be collected at the time of point-of-sale either through, or outside of, the POS network. This information can be collected in real-time at the time of sale, or provided on a periodic basis from the retailer to the system (e.g., such as nightly or weekly). Consumer-sponsor partnerships can be established such that sponsor-members (retailers, suppliers, manufacturers, merchants, other corporate members and so on) can communicate to the consumers the availability of such rebates, including normal ongoing rebates as well a special limited-time rebates.

Because, in some embodiments, the above-described processes may require that the retailer or other merchant with whom the consumer-member interacts provide details of the consumer-member purchases, the system can be configured to allow the consumer-member to opt into or out of this particular service. Thus, if a consumer wishes to keep his or her purchase details (other than perhaps the amount of purchase and the merchant ID) confidential, the user can opt to maintain privacy in such matters. Indeed, because the rebate is paid by the merchant itself, embodiments can be implemented in which even the amount of the sale is maintained as confidential and the merchant simply reports the rebate for the consumer-member to the social-financial network platform.

Consumer-Member Dashboard

Figure 5:
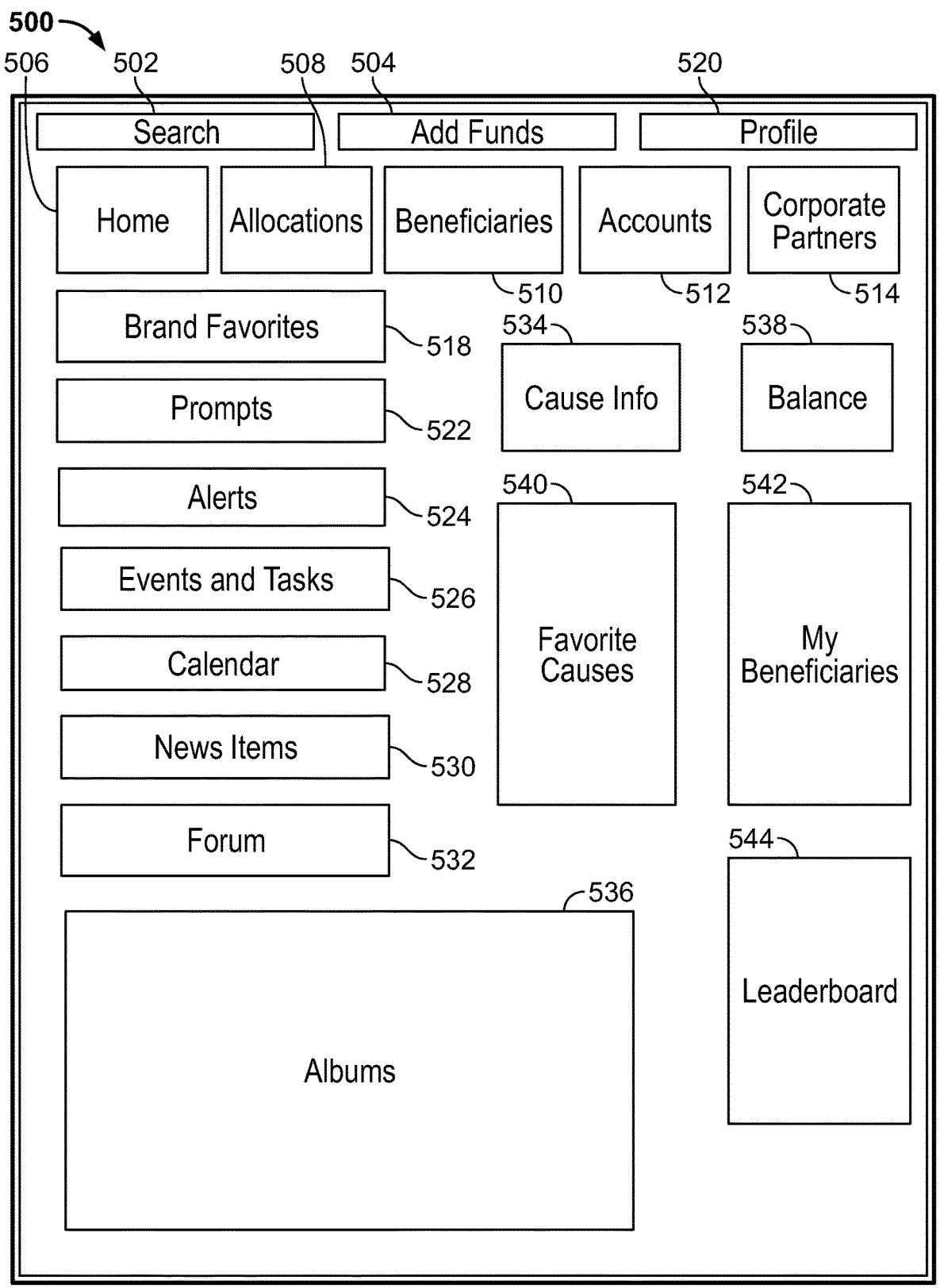
FIG. 5 provides a social-financial platform consumer-member dashboard, in accordance with an embodiment of the present disclosure.

Once a consumer-member logs into the social-financial platform, a consumer-member dashboard 500 can be provided. An example of this is shown in FIG. 5. In this example dashboard 500, the user can be provided with a search bar 502 and the ability to add funds 504. Various tabs or links can be provided, which, in this example include links for a home screen 506, allocations 508, beneficiaries 510, accounts 512, corporate or other sponsor-member partners 514, shopping 516, brand favorites 518, and profile 520. Additional or alternative tabs can be provided. The consumer-member's personal or identity information can also be displayed including a name, photograph, funds balance, and other information.

As shown in this example, other portions of the consumer-member dashboard can be allocated for various features such as prompts 522, alerts 524, events and tasks 526, calendar items 528, news items 530, forum or discussion items 532, cause information 534 (e.g. information on the Little League team) and access to various albums 536. In addition to showing the consumer-member's available balance 538, the dashboard can provide the consumer-member with the ability to add funds (e.g., 504) or send funds to various destinations. The example at FIG. 5 also shows a window area to display the consumer-member's favorite causes 540 or priorities, and a window to show beneficiaries 542 managed by the user. A Leaderboard 544 can also be provided to show top donors who have contributed funds. Additional links can also be provided, which in this example, include flags, messages, invitations, tasks and approvals.

Figure 6:
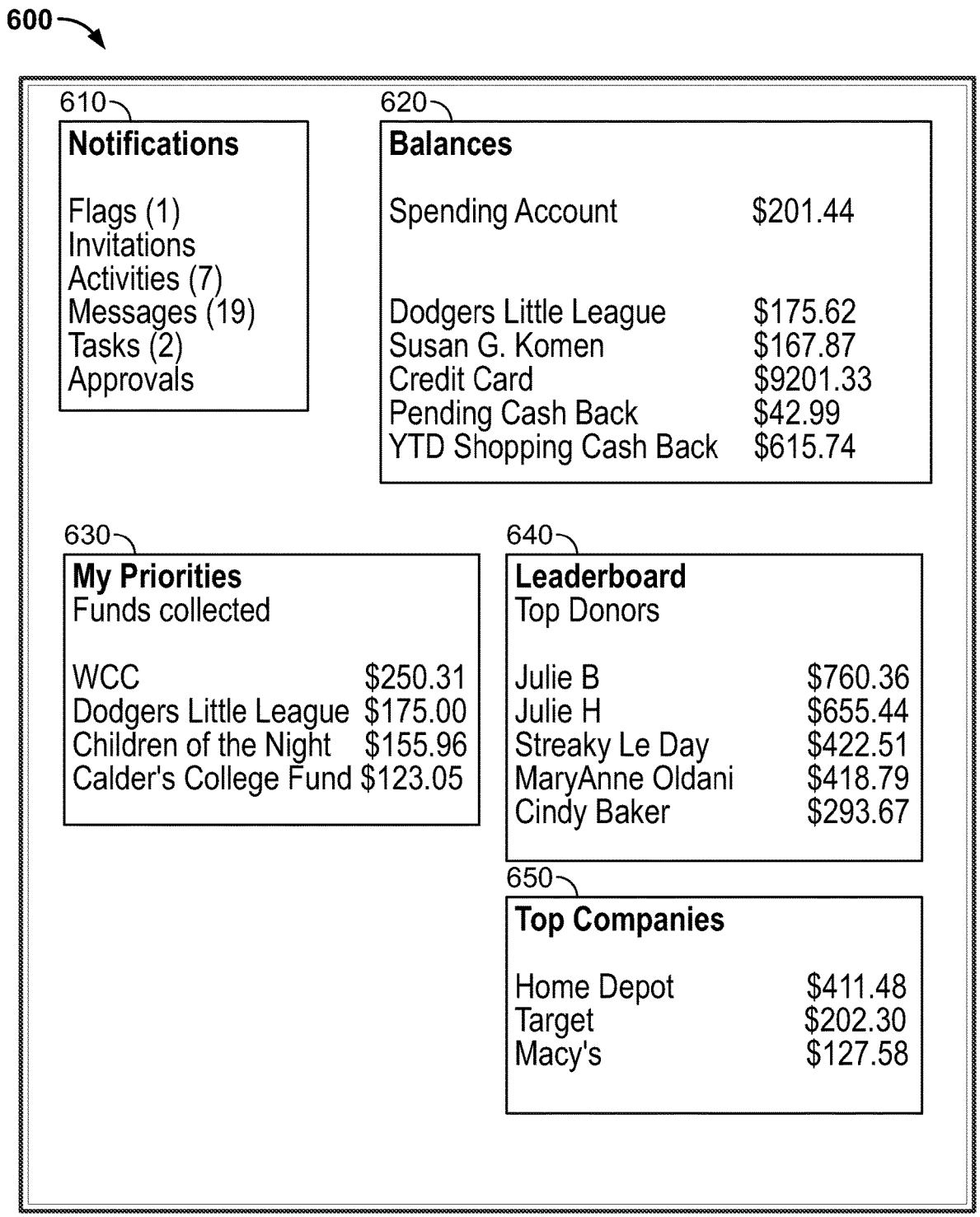
FIG. 6 provides a close-up look at various aspect of the consumer-member dashboard of FIG. 5.

FIG. 6 provides additional information about the items of information that can be included on the consumer-member dashboard 500. In FIG. 6, an active environment portion 600 of the consumer-member dashboard 500 is shown as an example. In this example, notifications 610 are shown at the top and include flags, invitations, activities, and approvals. Each of these items can be implemented as links to take the consumer-member to additional screens to provide additional information about each of these notification topics.

Next to notifications 610 in this example is an area for balances 620. In this example, the balances window 620 shows the priorities listed in the consumer-member's causes page. This example also shows balances for this particular consumer-member's credit card. In various embodiments, the social-financial platform can also be a card issuer or can work in conjunction with an issuer to issue a branded credit card that can be used in conjunction with the services provided by the platform. Likewise, the platform can also issue, or work with an issuer to issue, a debit card, a pre-loaded debit card, or other form of payment card.

The My Priorities portion 630 of the dashboard shows top priorities that the consumer-member designated to be displayed on his or her homepage. This also shows the amount of donations received for each priority and, in certain embodiments, can be selectable by day week month or year. The Leaderboard 640 section can be included to display the top sponsor-members affiliated with the consumer-member's causes. Again, the leaderboard 640 can be updated based on top donors for the past day, week, month, year, etc. Finally, the Top Companies portion 650 of the dashboard 600 shows the top merchants (e.g., sponsor-members) contributing to the consumer-member's causes based on amount of contributions.

In various embodiments, consumer-member causes can be included and can be allowed to make urgent appeals or send urgent messages to various members of the social-financial platform. Such appeals or messages can be sent to all members, or they can be restricted to particular consumer-members of a particular class, subscribing members who identified the desire to receive such appeals or messages from a particular cause or causes, or other designated set of one or more sponsor-members. For example, beneficiaries or charitable organizations such as the Red Cross of America can transmit urgent messages that can be used to solicit donations from members. These messages may include a "donate now" link to take members to each cause's respective platform site.

As noted above in the Little League team example, relevant team schedules can be established as may be deemed appropriate by the cause manager or delegate. FIG. 7 shows an example of this. At FIG. 7, example schedules are provided for causes followed by this user. Events schedules can be created by cause managers or their delegates, and can be distributed amongst those members contributing to the causes so that those members can follow along and keep up with activities of the cause. In some cases, users may opt into receiving event information or receiving certain classes of event information, while in other embodiments, a member who designates a cause for contributions automatically receives event information. Likewise, the cause manager or its delegate can designate which members or classes of members are to receive which types of event information.

FIG. 8 provides an example of a news page that can be accessed by the consumer-member dashboard. Various embodiments can be established in which various members or classes of members can be designated as having the ability to contribute news items related to the cause. For example, in some embodiments, the manager or its delegate is provided the ability to assign permission to one or more cause members to post news articles relevant to the cause. Alternatively, the manager or its delegate may simply allow all contributing members to post relevant news articles at their discretion.

For example, in the context of the example Little League team cause, each of the consumer-members who designate the team as a cause may be given permission to post news articles, photographs, and other information about the team, its players, and its events. As another example, there may be open sections in which all participants are permitted to post (e.g., photographs and social postings) and other restricted sections in which only managers can post.

In some embodiments, automatically generated news items may be provided such as, for example, motivational or congratulatory news items relating to the financial goals established for the cause. More particularly, in some embodiments, the system can be configured to announce the achievement of milestones along the way toward achieving the designated financial goal, announce significant recent contributions toward the goal, announce amounts required to achieve the goal or milestones toward the goal, and so on. Examples of various news items might include: when a member joins the platform (socially or financially); a member switches from a social member to a financial member; a member begins allocating rebates; a member changes their rebate allocation; a beneficiary attained a fundraising goal (or updates as the beneficiary attains percentage increments towards the fundraising goal); announcing the start or the last day for an event; announcing that a new event has been created; announcing that an event has been suspended or ended; game results; new forum topics; new albums/photos added; new news items added; new sponsor-members joining the platform or new rebates offered by sponsor-members; special rebates being offered; etc.

As shown in the example at FIG. 5, the member dashboard 500 can also include a link to a Corporate Partners (or sponsor-members) section 514 of the social-financial platform. FIG. 9 provides an example screen that can be linked through the Corporate Partners button 514. FIG. 9 illustrates a listing of sponsor-members within the vicinity of the consumer-member. This can be useful in allowing the member to make choices regarding where to shop based on proximity to the member location. Accordingly, the member can find sponsor-members offering rebates and make shopping decisions accordingly. Another tab ("New"), shows the member's new sponsor-member partners that have recently been added to the list as well as sponsor-member partners that are coming soon.

In various embodiments, the system can also be configured to allow the user to access pages for recommended beneficiaries. For example, the system can be configured to recommend causes or beneficiaries to the consumer-member that the consumer-member can consider for inclusion in his or her funding allocations. The beneficiaries can be listed with a name, a photograph, and a manager or sponsor. The information on the screen can be linked to additional information that the user can access by clicking the appropriate links. Information linked to the recommended beneficiaries can include a further statement of the cause other information about the organization, other members contributing, and so on.

A set of rules may be implemented to determine whether to make a recommendation to a member. For example, the system can look to similar causes, connections between the member and cause managers or other members, and so on. A beneficiary may be recommended to a user if the user participates in the beneficiary without allocating rebates financially. If a first member manages a beneficiary in which a second member participates, the platform may recommend that the first member "reciprocate" by joining another beneficiary that second member is a part of or manages. If the platform is unable to recommend beneficiaries based on other rules, the platform may opt to recommend beneficiaries randomly or based on a pre-defined or default set of beneficiaries. Cause recommendations in some embodiments can be made automatically based on the system rules, and in some embodiments opt in or opt out selections can be made by the member indicating whether or not he or she wishes to receive recommendations for various causes. In some embodiments, the system can be configured to allow the member to create a profile indicating causes, types of causes, classes of causes and so on for which the member may wish to receive recommendations. For example, a member may wish to see recommendations for all causes relating to muscular dystrophy. As another example, a member may ask to see causes to which his or her circle of friends or family contribute. As these examples serve to illustrate, there are number of ways that a member may designate causes, types of causes or classes of causes on which to receive recommendations.

Note that in various embodiments a sponsor-member can also be a consumer-member and enjoy the benefits of both. For example, a merchant may sign on as a sponsor-member and provide rebates to its consumer-member customers. Similarly, that merchant may purchase supplies, capital equipment, inventory or other materials from others suppliers who are sponsor-members. In this scenario, the merchant may be a consumer-member receiving rebates from its sponsor-member partners.

FIG. 10 provides an example of an Allocations screen 508 that can be accessed from the consumer-member homepage

500. This allows the consumer-member to allocate percentages of her rebate that she wishes to distribute amongst her various identified causes. From this screen, the consumer-member can also see invitations to contribute to other causes as well as a link to add additional beneficiaries. The lower portion of the screen in this example shows donations and transfers to the causes or beneficiaries identified by the consumer-member. It also indicates whether auto transfer is turned on to automatically transfer funds on a periodic basis to various causes or a transfer funds button to allow user triggering of funds transfers and one-time funds transfers.

FIG. 11 is an example screen that can be used to add events for causes or beneficiaries. In this example, the event list came as an invitation from another user asking the first user to consider supporting one or more of the listed causes. As seen, the screen can include an identification of the cause, a description of the event including place, date and time, links for additional information regarding the event, links to directions, buttons allowing the user to join, allocate to the cause or accept the invitation.

Figure 12:
FIG. 12 provides an exemplary transfer funds screen of a social-financial platform, in accordance with an embodiment of the present disclosure.

FIG. 12 illustrates an example of a transfer funds screen that can be used by the sponsor-member to make a funds transfer. This example includes information about the cause for an event, and also includes participation levels. The form provides the ability for the member to determine whether and to what extent he or she wishes to contribute to the cause. Also shown is an available balance so the sponsor can determine how much is in his or her "account" before making a participation determination. Sponsor-members may be able to change the participant status, print a receipt, or request a refund. If the user requests a refund, a window can be provided to allow the user to complete such a request and present a reason for the request.

The system can also be configured to provide a refunds management screen to a cause manager or delegate. The screen can include information regarding the participants who requested a refund, the amount of refund requested, the reason for a refund, and any other relevant information.

Beneficiary/Cause Related Spaces

An example of a beneficiary manager's screen is shown in FIG. 13. This example screen allows a member to see beneficiaries managed by that member. The screen can be accessed from the consumer-member dashboard 500 (e.g., by accessing the "Beneficiaries" button 510). This example shows the beneficiaries or causes designated by the consumer-member and provides detailed information about his or her contributions. For example, in FIG. 13, the member may be the manager for a first beneficiary (Beneficiary 1) that is a major 501(*c*)(3) charitable organization, that has a goal to raise $1,000,000, and currently has 5,000 people allocating rebates to the beneficiary, and has had 100,000 total participants to donate, and has raised $940,000. The user has sent out 2000 invitations to participate in the beneficiary, and 1500 of them have been accepted. To the right, the user has options to invite additional people, or to edit the beneficiary information. The user is also the manager of a personal beneficiary (Beneficiary 2) (e.g., a college fund), that has a goal of raising $50,000. Three people are currently allocating rebates to the beneficiary, and five people total have participated, and the current balance is $1,050. This beneficiary is marked as private, such that only those members that have been invited can participate, and five out of nine people that have been invited to participate have accepted.

The various entries on the screen can be clickable or drillable to provide additional underlying details to the consumer-member. If the user selects a beneficiary link, in one embodiment, the system provides a Beneficiary Administration screen to the user. This example screen allows the consumer-member to describe the cause, add tasks, add events, and so on to maximize the benefits received for the cause.

From the beneficiary administration screen, the consumer-member can link to a screen for beneficiary participants, an example of which is illustrated at FIG. 14. As this example illustrates, the various participants to the cause and information about their participation or contributions can be included on the screen. In this example, the screen also provides a link allowing the manager to remove one or more participants from the cause.

Beneficiary sites (e.g. a micro-site) may be provided that can be used for beneficiary information. Such a beneficiary site can be created by the system and populated with information entered by the beneficiary manager when the manager creates the beneficiary. This information can also be updated by the manager as well as updated by participant participation in the system. Such updates can be manually driven or they can be automatically driven based on real-time events and occurrences. The micro-site can be presented to include information about the beneficiary (e.g. a photo and a description) as well as other sections and windows for additional information and links to further relevant screens and information.

FIG. 15 is an example screen that can be linked to from the beneficiary micro-site. In the example of FIG. 15, participants contributing to the cause are listed with a short description, participant type, allocation percent, and further information. This way, relevant information about cause participants can be accessed through the beneficiary micro-site.

In some embodiments, a landing page can be provided as an overlay to the beneficiary micro-site. The landing page can be used to direct members or potential members to the platform based on their user type: consumer, sponsor, or beneficiary.

As with the consumer-member dashboard, the beneficiary micro-site can include sections for topics such as forum discussion, team record, news, albums, and so on. A cause manager can also be given the ability to add specific information for each cause that he or she is managing. For example, in the case of an athletic team, the manager can be given the ability to add for a given cause game results, game plans, and a team roster. Additional information can include information such as, for example, further contact information, team physician, jersey number, a point of contact for the team member, the relationship of the point of contact to the team member, and so on. As with other screens in the system, team logos, team member photos, staff photos, and so on can be included.

The system can also be used in various embodiments to assist with game and practice scheduling and other event planning. Team information, such as that described here, in some embodiments, can be pushed to local business participants so that businesses can be aware of causes and events surrounding those causes occurring in the community. In this manner, businesses can determine to make additional offers to causes of their choice based on this information. For example, a local pizza parlor or restaurant may provide offers to the team members for a discount on dinner if the team chooses to dine there after the game. Beneficiary managers in some embodiments can be given the opportunity to opt into such a system allowing their event information to be automatically shared with merchants or merchants of their choosing. In another embodiment, the beneficiary manager may be given the opportunity to push one or more events out to local merchants to solicit offers from those merchants. For example, the manager may know that his team is interested in having dinner at a local restaurant after an away game before returning home. In that case, the manager may decide to push information about that away game to participating restaurants in the area of the game so that the restaurants can respond with their best offers. The manager or the team can then decide which offer to choose. This can be in a sense a double benefit because the team would get the benefit of the offer made by the restaurant as well as the rebate for the expense of the meal based on that restaurant's participation in the social-financial network. Of course, the offers made by the restaurant can be in the form of additional discounts, free drinks, free appetizers, etc., or it can be in the form of an enhanced rebate, or a combination thereof.

As described above, various screens can include the opportunity to add new events for one or more beneficiaries or causes. The system can be configured to query the user for various information they can be useful to building the event for the cause. For example, this information might include: event time/date; event location; type of event (e.g., community service, sports game, practice, meal, movie/show, party, auction, etc.); whether users must pay to attend; attendance requirements; etc.) Managers can also create tasks for different events and beneficiaries/causes such that participants can sign up for those tasks and check them off as they are completed.

Messaging and Invitations

As described above, the social-financial platform can be configured to allow messaging to occur within as well as outside of the system. As also indicated, the system can be configured to provide invitations to others to participate in the social-financial network and to direct allocations of their funds to a particular beneficiary. In various embodiments, invitations can be sent by a beneficiary manager, by users participating with a beneficiary, or by corporate or other sponsor-members. For example, a user may create a priority or cause and opt to send invitations to her friends and other contacts, inviting them to join the social-financial platform and designate her cause to receive contributions. As another example, a given cause may join the social-financial platform, create itself as a beneficiary, and invite its supporters to also join the social-financial network and allocate contributions through that platform. For example, the San Diego Zoo may opt to create a priority or cause on the social-financial platform and send invitations to existing zoo members offering that they also join the social-financial network and allocate all or a portion of their rebates toward the zoo.

As also described herein, when rebates are generated and credited to a consumer-member's account or his or her beneficiaries, the consumer-member can be alerted of this event through messaging. Accordingly, in various embodiments, the social-financial platform can be configured to provide real-time or near-real-time messaging to its users for events and activities occurring on the platform. For example, embodiments can be implemented such that the social-financial platform provides a message to a consumer member informing that consumer member of: (a) a rebate amount received by consumer member, which can occur, for example, as a result of a card swipe or other token usage at a Point-of-Sale or other qualifying transaction; and (b) a portion of the rebate that benefited a designated beneficiary or cause of that member. For example, upon a card swipe, a message such as: "You just received a $3 rebate; and, because of you, the American Heart Association just received $2 of those dollars!" can be sent. As another example, the system can be configured to send other messages to the cause, or to other members supporting the cause, such as "Your cause just received $2 from a platform member." These messages can be prepared and sent in real-time (or near real time) as the events transpire, or they can be batched and sent periodically (such as, e.g., hourly, daily, weekly, etc.). In further embodiments, messaging preferences such as the frequency and types of messages (or whether to receive messages at all) can be established by the consumer-member in a user preferences or profile section of the social-financial platform.

Sponsor-Member/Merchant Micro-Site and Portal

Described above are example embodiments of consumer-member user interfaces for the social-financial network. Other merchant information may also be presented to the consumer-member of the social-financial network as well. A sponsor-member microsite (e.g., a merchant) may be presented to consumer-members in accordance with one embodiment of the technology described herein. An example screen is shown in FIG. 16. Although not elements are specifically shown in FIG. 16, the fundamental items shown on the consumer-member microsite may remain intact, including, for example, a search bar, and an active real-time environment on the right hand side. In this case, the main presentation area on the left of the screen includes information about the sponsor-member.

From the consumer-member view of the sponsor-member dashboard, the consumer-member can drill down into the latest news for the sponsor-member, the sponsor-memeber's latest offers, and other information and materials regarding the sponsor-member. By drilling down in the "Latest News" section, a consumer-member may be able to see a listing of recent news items, and may be provided with the ability to post his or her reactions to the news stories in a blog-like fashion. By clicking into the "Latest Offers" section, a user may be able to drill down into additional details for each offer or to link to the sponsor-member's website for shopping. A user may also be provided with a "Store Locator" feature that allows a user to search for store listings or to browse through a listing of brick and mortar stores associated with or owned/operated by the sponsor-member.

In various embodiments, the social-financial network can be configured to allow new sponsor-members to be solicited, and allow them to sign up to provide special offers (e.g., rebates) to the various consumer-members. During the sign up process, the sponsor-member accesses the portal and provides the system with merchant or other sponsor information, establishes a sponsor-member account, and identifies particular offers and other rebates that it would like to offer to consumer-members of the social-financial platform.

In various embodiments, the sponsor-member can be provided the opportunity to have one-on-one communications with one or more consumer-members of the commercial-financial platform to communicate information about the sponsor-member, particular offers to the consumer-member, and to otherwise touch the consumer-member and his or her social community.

Figure 17:
FIG. 17 provides an exemplary merchant portal that is part of a social-financial platform, in accordance with an embodiment of the present disclosure.

Merchants and other sponsor-members can also be provided a portal to the social-financial network platform. FIG. 17 provides an example of a sponsor-member portal screen that can be presented to sponsor-members for their interface with the system. As with the consumer-member pages, the sponsor-member portal may also include an active environment on the right hand side. In this example, the active environment for the sponsor-member portal includes notifications 810, a corporate leader board 820, and a listing of platform member purchases 830. In the central portion of this example sponsor-member portal, information provided to the sponsor-member may include purchase and rebate activity 840, general offers 850, news 860, and events 870. The purchase and rebate activity 840 in this example shows total purchases made by the social-financial platform consumer-members, the rebates paid during the selected time period (e.g., may be adjusted to show tallies for the past day, week, month, year, etc.), and the current balance in the rebate holding account. This information can be used by the merchant to track its performance on the system. In this example, rather than settling with the social-financial network after the fact, the sponsor-member provides funds in advance to fund a sponsor-member rebate account. Accordingly, the sponsor-member can be provided information regarding the balance of its rebate account, and can establish with the social-financial platform a mechanism by which its rebate account is reloaded so that rebate funds do not run out.

The general offer section 850 of this sponsor-member portal page shows the offers that are being made by the sponsor-member at the current time, as well as a listing of past or historic offers. Accordingly, the merchant manager can check the status of offers, decide whether new offers should be created, and view the history of offers as well. The News and Events portions provide additional information about the sponsor-member's activities as they relate to the social-financial network. As with the consumer-member pages, the sponsor-member pages also provide applicable links through which the sponsor-member can drill down into a selected topic to retrieve additional information.

The merchant portal may be used to view and evaluate past performance, view current offers or create new offers, upload, provide details, restrictions or other information on the offers, and select locations at which the offers are available. Merchants can also create news items, set publish start and end times, title news articles, provide a URL, and add a story or other information for the body of the news item. Similarly, under the events tab 870, merchant users can add new events, designate their start and end dates and times, provide a URL for more information on the event, and post event locations.

In various embodiments, users (including sponsors-members, consumer members, and/or beneficiary members) can be provided with transaction history and other historic information about their accounts and participation with various beneficiaries. Users may also be provided with periodic statements that can be provided to the users indicating their historic activity.

Beneficiary-Sponsor and Consumer-Sponsor Partnerships

As the embodiments described above serve to illustrate, the social-financial platform can be configured in such a way as to allow sponsor-member partners to develop brand awareness and customer loyalty by providing special offers and events and other rebates to the consumer-member, without necessarily engaging in conventional, intrusive advertising.

The social-financial platform can be configured according to some embodiments to provide a mechanism by which beneficiaries and sponsor-members can form partnerships to incentivize desired activity. For example, beneficiaries and sponsor members can form partnerships to provide incentives to the sponsor to increase rebates that are driven to the beneficiary and to provide incentives to beneficiary participants to drive business to the sponsor-member. In various configurations, the social-financial platform can allow beneficiary and sponsor-member partnerships to define mutually agreeable conditions to allow the 2 partners to work together to achieve their respective goals. For example, the goal of the beneficiary may be to increase contributions to the beneficiary's cause. The goal of the sponsor-member, on the other hand, maybe to increase sales (e.g. in the case of a merchant sponsor). Accordingly, the beneficiary and sponsor partners and structure a partnership that affords each partner the opportunity to work toward its respective goals. The sponsor-member and the beneficiary can work together to define the parameters by which the partnership can operate. This can be accomplished by an offer to partner made by the beneficiary to the sponsor-member or vice versa. The offers can be configured in a number of different ways to incentivize desired behavior.

For example, the sponsor-member may agree to increase rebates for a particular beneficiary if the beneficiary agrees to promote or advertise the sponsor-member in a particular way. As a further example, the sponsor-member may agree to increase rebates where purchases by consumer-member participants of the beneficiary at the sponsor-member reach a certain level. As another example, the system can be configured to allow the sponsor-member to define thresholds, which if met through sponsor-member contributions, the beneficiary will allow the sponsor-member to advertise to beneficiary members.

Another example can be described in terms of the Little League paradigm set forth above. In this example, merchants or other sponsor-members can make an offer to the Little League team beneficiary manager stating that if X dollars are received from the sponsor-member in a particular period of time, the Little League team will allow the sponsor-member to post a banner or take another form of advertisement at Little League games. Viewing this example from another perspective, in another embodiment, the beneficiary may offer the sponsor-member the opportunity to advertise in its newsletter, post banners, or otherwise provide advertising to its members if the sponsor-member contributions to that cause directly or through its rebates meet or exceed a defined threshold. In this way, the cause may be able to incentivize the sponsor-member to increase its rebate to consumer-members, (or at least consumer-members who are participants with that cause) to increase the opportunity for fundraising.

As another simple example, a church group may offer a local merchant free advertising space in the church group's newsletter if contributions through the system that are attributable to that particular merchant meet or exceed a certain threshold. In an effort to reach this threshold for the benefit of the advertisement, a merchant may offer increased rebates to its customers or other special offers to drive sales and reach the goal. If the threshold is achieved, placement of the ad may ideally drive additional sales to the merchant. There are no limitations on the form that such an advertisement can take, whether electronic or hard copy. In some scenarios, however, the ad may be delivered to members of the church community who are not yet members of the social-financial platform. Accordingly, such an advertisement can benefit both the merchant and the beneficiary by driving increased membership to the platform, which may ultimately deliver increase sales and increased rebate contributions to the church.

In various embodiments, the above scenarios can be provided by the creation of consumer-merchant partnerships. These partnerships can define, as the partners deem appropriate, various offers that will be provided, and rewards for particular levels of participation. FIG. 18 provides an example illustration of a consumer-member view of a consumer-merchant partnership interface. In the example illustrated at FIG. 18, the cause is the Chandler Little League Astros. The merchants contributing to the Little League Astros are listed on the bottom two-thirds of the screen, in which it is shown each merchant, and the amount of rebates paid by each merchant (i.e., sponsor-member). Also shown are partnership status and whether any marketing materials or specials are provided corresponding to each merchant. As illustrated by the first merchant, Happy Dawg Hot Dogs, the consumer can drill into the merchant information to see which locations of that merchant have provided rebates and how much rebate each location has provided. As this example illustrates, two merchants are active partners with the cause. Another merchant, the Pie Factory, was sent a request by the cause to form a partnership. In addition, in a third example, the merchant HillMart offered to form a partnership with the cause. In this example, the beneficiary manager is given the ability to respond to the merchant to accept or decline the offer for partnership.

FIG. 19 shows an example of a sponsor-member view of a beneficiary-merchant partnership page. In this example, 10 different causes are displayed to the sponsor-member. Of these causes, four are involved in active partnerships with the merchant. These are causes 1-3 and 6. In this example, the sponsor-member offered an opportunity to form a partnership to cause 5, while causes 4 and 7 sent requests to the merchant to form a partnership. As illustrated, the sponsor-member is given a Respond button by which the merchant can respond to the cause's request. For causes 8, 9 and 10, the system has suggested to the sponsor-member that the sponsor-member may wish to consider a partnership with these causes. In this case, the system provided buttons labeled Offer Partnership by which the sponsor-member can send an offer to the causes to create a partnership.

The system may generally offer sponsor-members or suggest to sponsor-members that they partner with various causes. In various embodiments, the system can use metrics, rules or other information to determine whether to suggest that a merchant invite a beneficiary to become a partner. For example, the system can use information such as geographic location of a merchant and the cause, similarity in products offered by the merchant and those consumed by the cause, and other factors. For example, the system may suggest to sporting goods merchants in the area to offer a partnership to one or more athletic teams also in the same area.

The system can also generate suggestions for partnership based on usage level, number of beneficiary participants, and type and frequency of beneficiary events; this can be in addition to proximity and category as described above. In various embodiments, the sponsor-member can be asked during sign up or at subsequent points after sign up whether the sponsor-member is interested in beneficiary partnerships and, if so, what types of partnerships.

FIG. 20 provides an example consumer-member view for a cause to initiate a sponsor-member partnership, and FIG. 21 provides an example consumer-member view to respond to a sponsor-member partnership offer. In the example illustrated at FIG. 21, the screen shot offering the merchant the ability to initiate a merchant partnership provides the cause manager with information about the merchant including the amount of rebates paid by the merchant. This example screen gives the cause manager or its delegate the ability to include a note to the merchant, which might include details or suggestions about what the partnership might involve. For example, the cause may 'challenge' the merchant by saying if you double the amount of rebates paid to our cause this month as compared to last month, we will include a whole page advertisement for your business in our newsletter.

As this example serves to illustrate, there are a number of arrangements that can be offered and made between beneficiaries and sponsor-members in this fashion. Interestingly, this type of scenario can create a snowball effect in which increased participation by a merchant results in more advertising for a merchant, driving more participants of that cause to that merchant, further increasing contributions in the form of rebates by that merchant.

At FIG. 21, an example sponsor-member partnership response screen is shown. In this screen, the cause manager or its delegate is shown stats on the sponsor-member offering the partnership, the amount of rebates paid by the partnership and so on. This also gives the cause the ability to accept or decline the sponsor-member's offer and include a note to the merchant. This example also shows a sample note from the merchant to the cause.

FIGS. 22 and 23 show consumer-merchant partnership offer and response screens similar to the consumer view, but from the sponsor-member view. At FIG. 22, a consumer-merchant partnership offer is made by merchant MorBev to the Chandler Little League Astros. This screenshot shows the total sales to members participating in the Chandler Little League Astros and provides an area for the merchant to include a note to the consumer. The merchant view in FIG. 23 shows a sample screen for a merchant response to a partnership request received from a cause. This example shows the cause that sent the request (in this case the Chandler Little League Astros) and the sales by members of that cause. This example also shows a note from the consumer that was included with the request and gives the merchant the ability to accept or decline the request as well as including a note to the consumer. For example, at one level, a consumer-merchant partnership can be set by an individual consumer who chooses to follow a brand through the social-financial platform, i.e., subscribing to a merchant's news feed and notifications of special rebates and offers.

Partnerships are not limited to being established between beneficiary-members and sponsor-members. Indeed, the system can be configured to allow, and even incentivize, partnerships among different and multiple classifications of members. As another example in addition to that of the beneficiary-sponsor partnership, consumer-sponsor partnerships can be created directly between consumer-members and sponsor-members. For example, the system can be configured to allow the members to create an open channel of communication between the consumer and the corporate partner or other sponsor-member. For example, the system can be configured to allow the consumer-member to set up preferences to invite or allow partnership communications between that consumer and one or more sponsor-members. For example, by "liking" a sponsor-member, the consumer may be deemed to have opted into receiving communications from that sponsor-member. As another example, the consumer-member may be given a series of radio buttons or checkboxes or other user interface through which the consumer can opt into or out of one or more forms or categories of communications for one or more merchants, or for a class or category of merchants. In some embodiments, the system can allow the consumer complete control over the what, when, how, and where of partnerships and partnership communications.

The communication that can be enjoyed between sponsor-members and consumer-members can include information such as, for example, communications from the merchant to the consumer on the consumer's newsfeed, conversations feed, alerts, or other channels. This can be established as mutual communications such that the consumer can also communicate with the Corporation or other sponsor-member. Accordingly, a link can be created between the consumer-member and the sponsor-member to allow direct communications.

This too can be illustrated in terms of a simple example. Assume, for instance, that a merchant wants to conduct a study in Simi Valley and would like to have a group of participants in that study who conform to a particular demographic. In various embodiments, the merchant can select study participants from among consumer-members following or partnered with that merchant, and send invitations to participate in the study to those selected consumer-members through the social-financial platform. The invitations can be delivered, for example, on the consumer-members newsfeed, through their conversations screens, as an alert to the member, as in-network messaging, or through other means. As noted above, consumer-members can in some implementations elect to opt in or out of receiving such communications. Likewise, the consumer-member wishing to participate in the study can be given the opportunity to respond to the invitation through similar communication channels through the social-financial platform.

Monolithic Account Structure and Virtual Purse Functionality

As described above, various systems and methods can be implemented to allow rebates to be provided to consumer-members (or other users) based on purchasing and other activities conducted with various sponsor-members. As also described above, rebates can be triggered based on purchases by consumer-members, such as purchases conducted with one or more forms of payment token at a point-of-sale terminal. These payment tokens can include tokens such as commercial credit, debit, and like payment cards issued by commercial or third-party institutions, credit or debit cards issued by or through the social-financial platform, or other tokens that can be used for commercial transactions.

In some embodiments, the rebates are made by transferring the appropriate funds from the sponsor-member to the consumer-member using transfers between their respective accounts. For example, an automated clearing House (ACH) transfer can be implemented to transfer the funds from a designated account or accounts of the sponsor-member (e.g., a merchant bank account) to the merchant's rebate holding account, which is a virtual card account on the platform for each merchant, then to the accounts designated for the appropriate beneficiaries as initiated by a consumer point-of-sale purchase. The ACH process is a well-known computerized clearing and settlement process that allows the electronic exchange of funds between participating banks, credit unions, and other financial institutions.

In various implementations of the social financial platform, accounts can be configured to avoid ACH or other like transfers among accounts. For example, in some embodiments, accounts can be established within, by, or for the social financial platform in a form that allows transfers among accounts internally by the social-financial platform without requiring ACH-type transfers. As a further example, in some implementations, a monolithic account structure can be provided such that funds can be transferred from merchants to consumer-members and their beneficiaries under the direction of the social-financial platform without requiring the logistics or expense of external services. As another example, in some implementations, a monolithic structure can be provided so that rebate funds can be transferred from the merchant holding account (e.g., virtual account) to the consumer-members and their beneficiaries under the direction of the social-financial platform without requiring the logistics or expense of external services.

Figure 24:
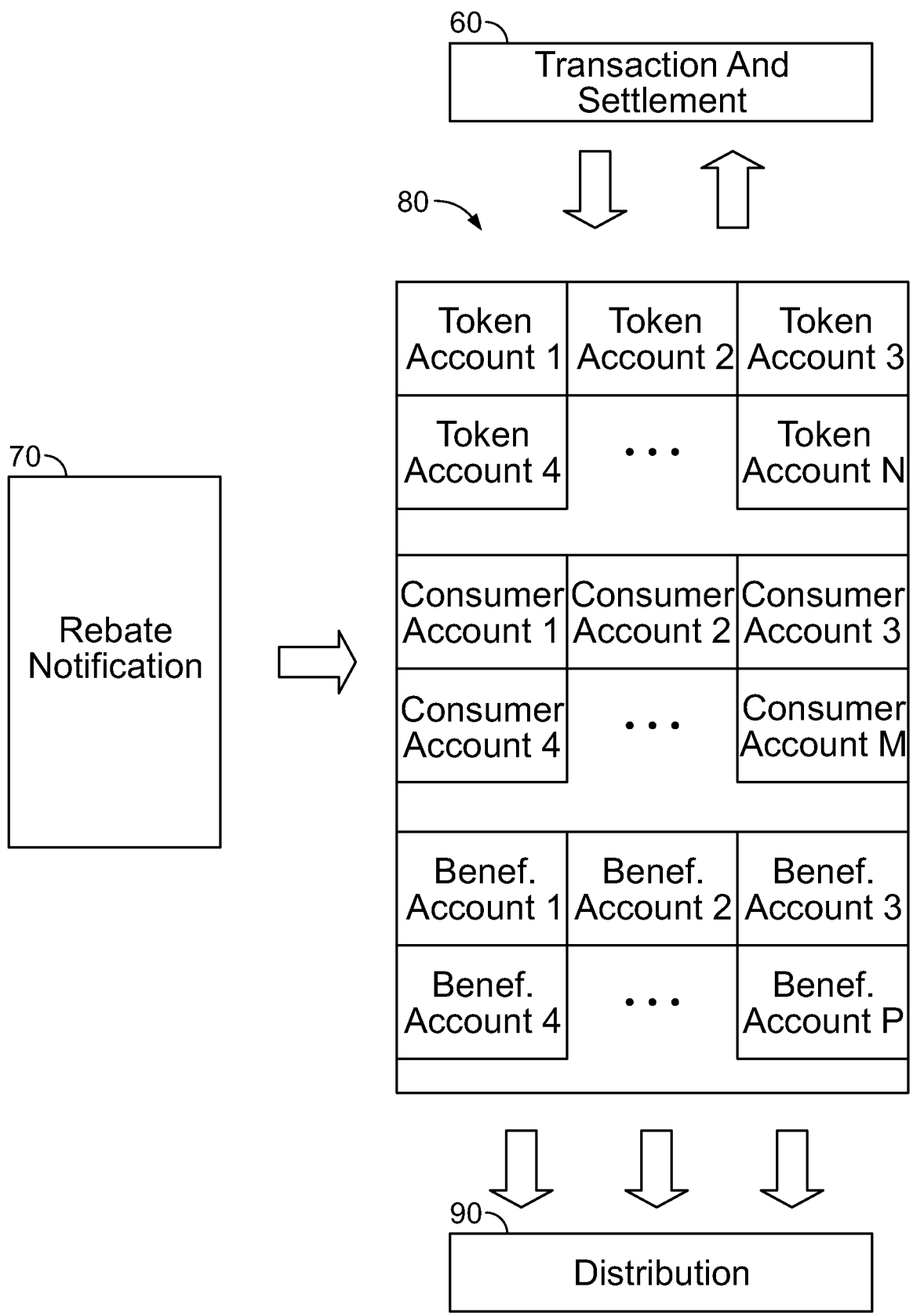
FIG. 24 provides a block diagram representation of a monolithic account structure, in accordance with an embodiment of the present disclosure.

An example of such a structure is illustrated in FIG. 24. In this example, a monolithic account 80 includes a plurality of token accounts, 1 through N, and a plurality of consumer-member accounts 1 through M. The token accounts can include, for example, credit card accounts for various card holders of the issuing bank. These accounts can be used to pay for transactions with various participating merchants, as well as other transactions into which the card holder may enter. The consumer-member accounts can be established, in some embodiments, as virtual accounts for the purpose of receiving rebates from the corresponding token account, and for distributing rebates to the designated beneficiaries. An example of this is described in further detail below. Also shown in this example, the monolithic account 80 may also include a plurality of accounts for the various beneficiaries or causes, illustrated as beneficiary accounts 1 through P.

As illustrated by block 60, the consumer-member may conduct transactions with merchants (or other sponsor-members) participating in the program. As part of the transaction, the token information (e.g., credit card information) along with other transaction information (e.g. merchant ID, store location, transaction amount, and so on) is sent to the issuer of the token for authorization and ultimate settlement. Also, the merchant or the payment network informs the social financial platform of the transaction so that rebate and rebate allocations can be determined.

As shown by block 70, the social financial platform can determine the rebate amount and provide a notification to the consumer that the transaction is subject to the rebate. The social financial platform deducts the rebate amount from the merchant's rebate holding account and transfers the rebate amount from the merchant's rebate holding account to the corresponding consumer-member account. These transactions currently take place through the social financial network's transaction processor. Accordingly, the consumer account is funded as an extension of the transaction process without further intervention required.

At block 90, the funds from the consumer-member rebate can be distributed to his or her designated beneficiaries in accordance with the allocations set up in his or her account in the social-financial platform. In various embodiments, the consumer accounts can be set up like regular bank or credit union accounts allowing payment or disbursement of funds by ACH, account-to-account transfer, and so on. Accordingly, the consumer members can have their accounts funded by rebates automatically, and in some embodiments instantaneously (i.e. without delay associated with bank-to-bank or other external transfers), and at the same time have the ability to draw on those funds via purchases, ACH or other conventional means of disbursement. The registered token can work in conjunction with the consumer account to provide all the financial services of a credit/debit card plus the rebate earning and allocation benefits of the social-financial platform.

In further embodiments, and as shown in the example of FIG. 24, one or more beneficiary accounts can be established on the platform so that "internal" transfers can also be made from the consumer account to the designated beneficiary accounts.

In still further embodiments, one or more sponsor-members can be given the opportunity to create virtual accounts within account structure 80. The various merchants (or other sponsor-members) participating in the program can populate their respective accounts with sufficient funds to cover their rebates. Their accounts can be funded in advance, like a debit account, where the merchants fund their respective accounts with sufficient amounts to cover their projected or anticipated rebate activity for an upcoming period (e.g., for the next month, quarter, or other time period). The accounts may alternatively be set up like credit accounts in which the merchants are billed periodically for their rebate activity. In such embodiments, the settlement process can take place independent of the rebate and rebates calculated and settled by an internal transfer between the sponsor-member and the consumer-member.

Figure 25:
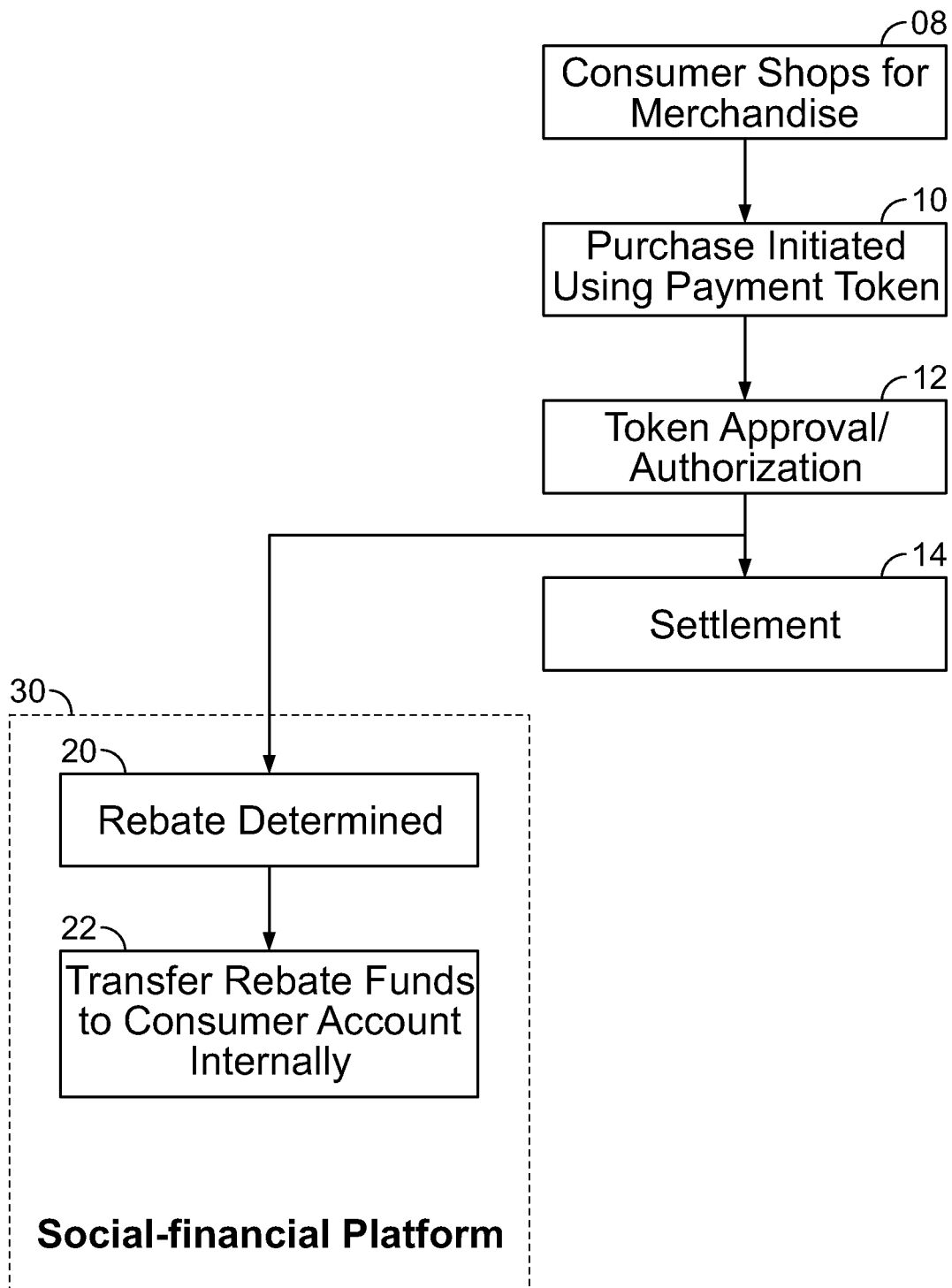
FIG. 25 provides a flow chart representation of an example process for transferring funds within the social-financial platform using the account structure of FIG. 1 or another like monolithic account structure, in accordance with an embodiment of the present disclosure.

FIG. 25 is a diagram illustrating an example process for transferring funds within the social-financial platform using the account structure of FIG. 24 or another like monolithic account structure. As illustrated in FIG. 25, at operations 8 through 14, a consumer shops for merchandise and initiates a sale transaction using a token that is associated with the social-financial platform. As part of this process, the token is verified and the transaction submitted for approval and authorization. If authorized and the sale is completed, the payment network, e.g., Visa, recognizes the token is associated with or linked to the social-financial platform, and informs the social-financial platform of the transaction. At operation 20, the social-financial platform receives the transaction information and determines the amount of the rebate appropriate for the transaction. Rebates can be determined by any of a number of different criteria including those as described above.

Once the rebate is determined, the social-financial platform informs the purchaser and the funds are transferred to the appropriate consumer-member accounts. This is shown at operation 22. Settlement can take place in operation 14. The full amount of the purchase settles to the customer's card account as a debit. The rebate is credited to the consumer's account at authorization. As described above, the transfer can be done internally from one account to another without requiring ACH or other like transfers among disparate institutions. The various accounts, including merchant accounts, consumer accounts, beneficiary accounts and so on can be established and structured to allow transfers to be directed within and by the social-financial platform. The system can be configured such that transfers occur automatically when the sale transaction takes place and the corresponding rebate determination is made. This can allow, in most embodiments, an instantaneous distribution of rebates to the appropriate accounts without the expense or logistics associated with ACH transfers.

To further clarify additional features and advantages of the monolithic account 80, and the systems and methods described, an exemplary embodiment will now be described in greater detail. However, as with all exemplary embodiments, it should be understood that the specific details of the embodiment may differ while still falling within the scope of the present disclosure.

Figure 26:
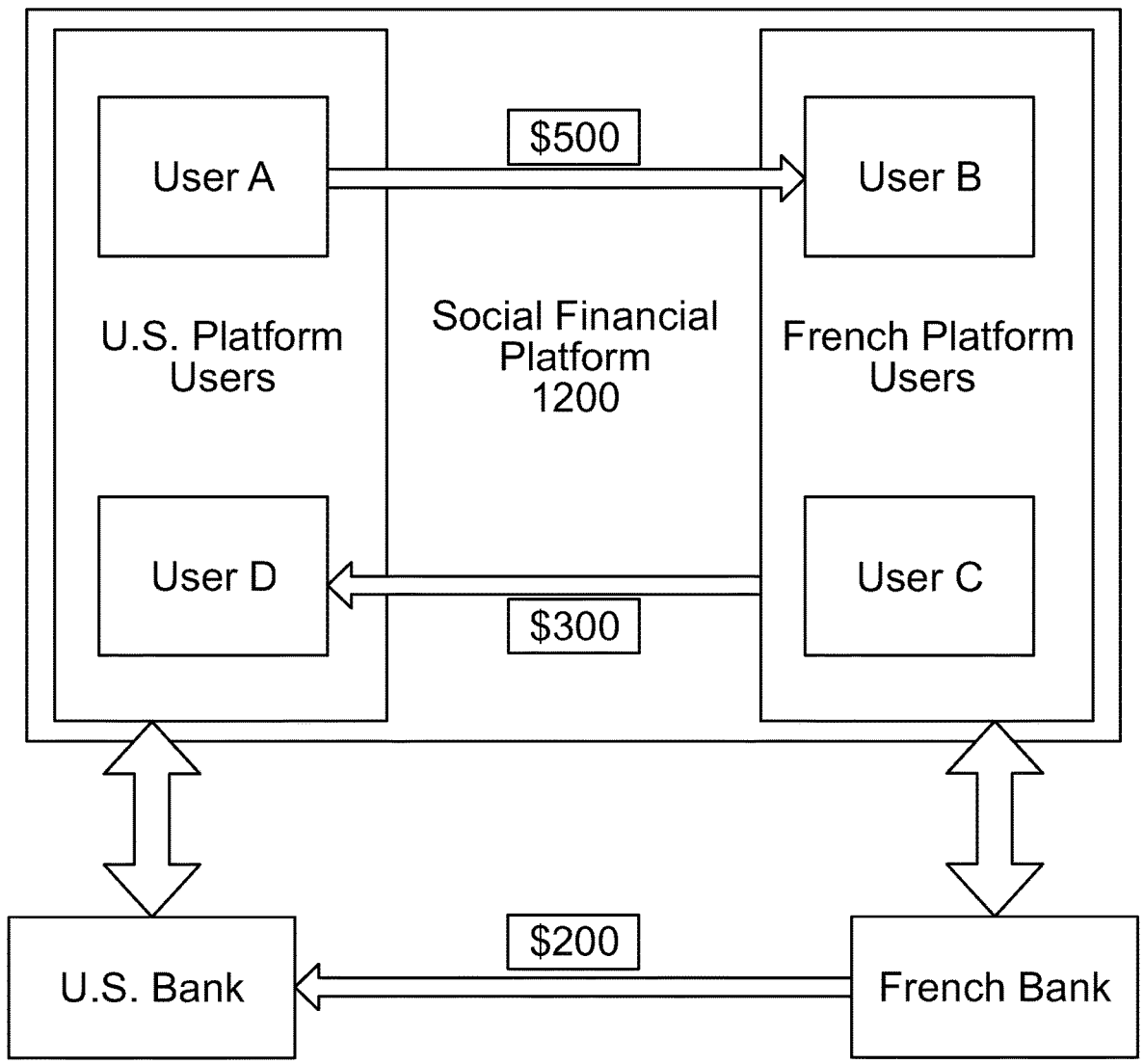
FIG. 26 provides a block diagram representation of an international money transfer system, in accordance with an embodiment of the present disclosure.

As shown in FIG. 24, and described above, the social-financial platform may comprise a monolithic account structure 80 comprising a plurality of users, which may be classified in one or more classes, e.g., consumers, merchants, and beneficiaries. Each user may have a virtual financial account set up within the monolithic account structure representing the amount of money the user has within the network. Any money deposited into the social-financial platform's monolithic account structure by users may be housed in one or more banks internationally under the social-financial platform's bank accounts. For example, FIG. 26 shows one embodiment in which the platform includes users from the United States and users from France. In the depicted embodiment, all U.S. users' funds are housed in one or more accounts in one or more U.S. banks, while all French users' funds are housed in one or more accounts in one or more French banks. The social-financial platform, or an external transaction processor, may keep track of the virtual accounts (i.e., essentially keeping track of how much of the money housed in the platform's bank account belongs to each user). In certain embodiments, this may be accomplished by a database in which user account information, identifying individual users, is associated with virtual balance information indicating the amount of money in that user's virtual account. As money is transferred into our out of each user's virtual account, the database is updated to increase or decrease the virtual balance information as necessary.

In the embodiment shown in FIG. 23, merchant accounts are not expressly shown as part of the monolithic account structure 80. In some embodiments, merchants may not be required to deposit funds into the monolithic account structure 80. In these embodiments, as will be described in greater detail below, merchants may still offer rebates through the social-financial platform without pre-funding virtual financial accounts (while still maintaining social accounts on the platform). The social financial platform, using its own financial reserves in the monolithic account structure 80, may provide instant rebates. By keeping track of the rebate amounts owed by each merchant, the platform may then settle with merchants on a periodic basis and use the received payments to replenish the platform's financial reserves that were used to issue instant rebates. In other embodiments, merchants may also pre-fund their own virtual financial accounts, and deposit funds into the monolithic account structure 80.

Figure 27:
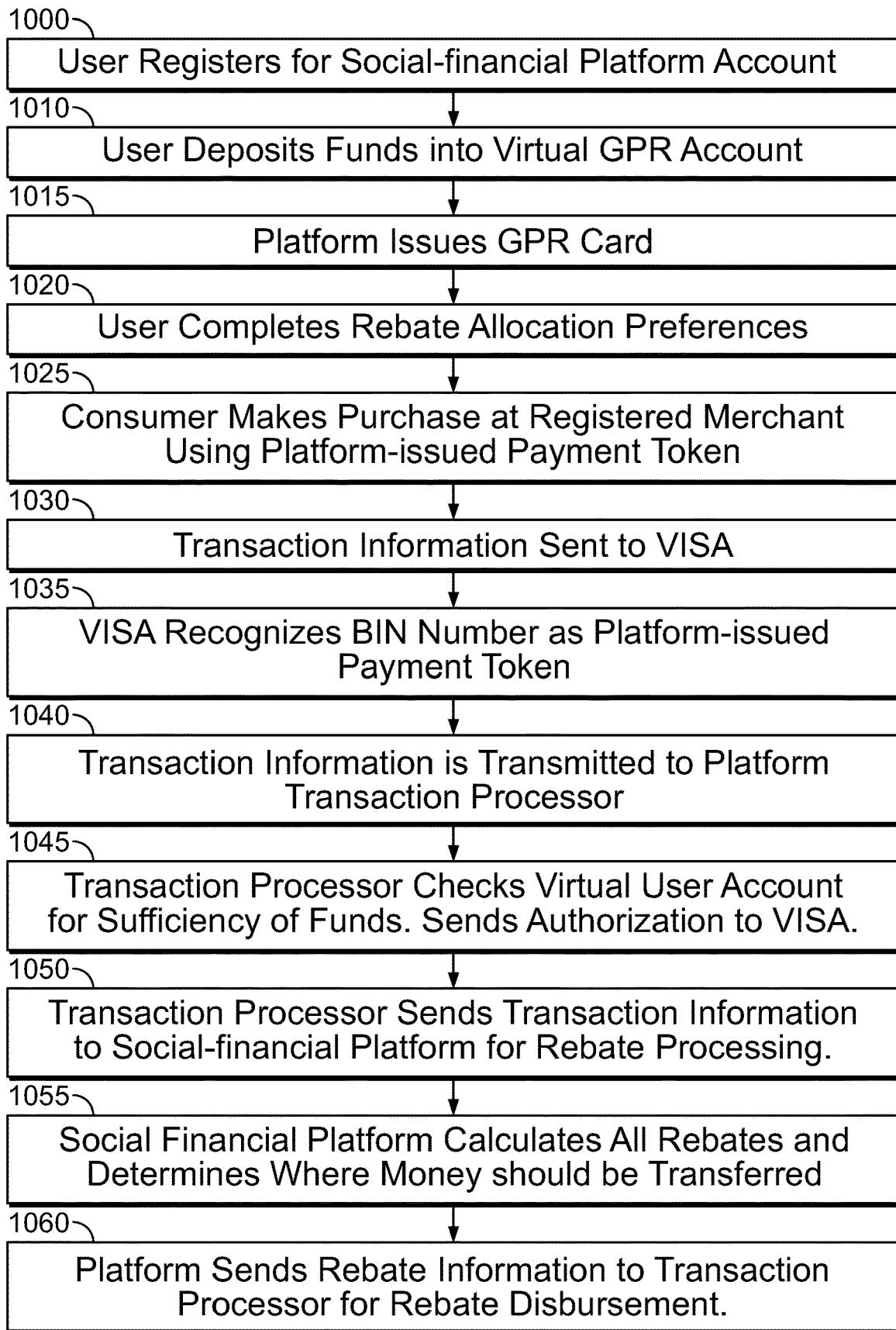
FIG. 27 provides a flow chart representation of an example rebate transaction using a platform-provided payment token, in accordance with an embodiment of the present disclosure.
Figure 28:
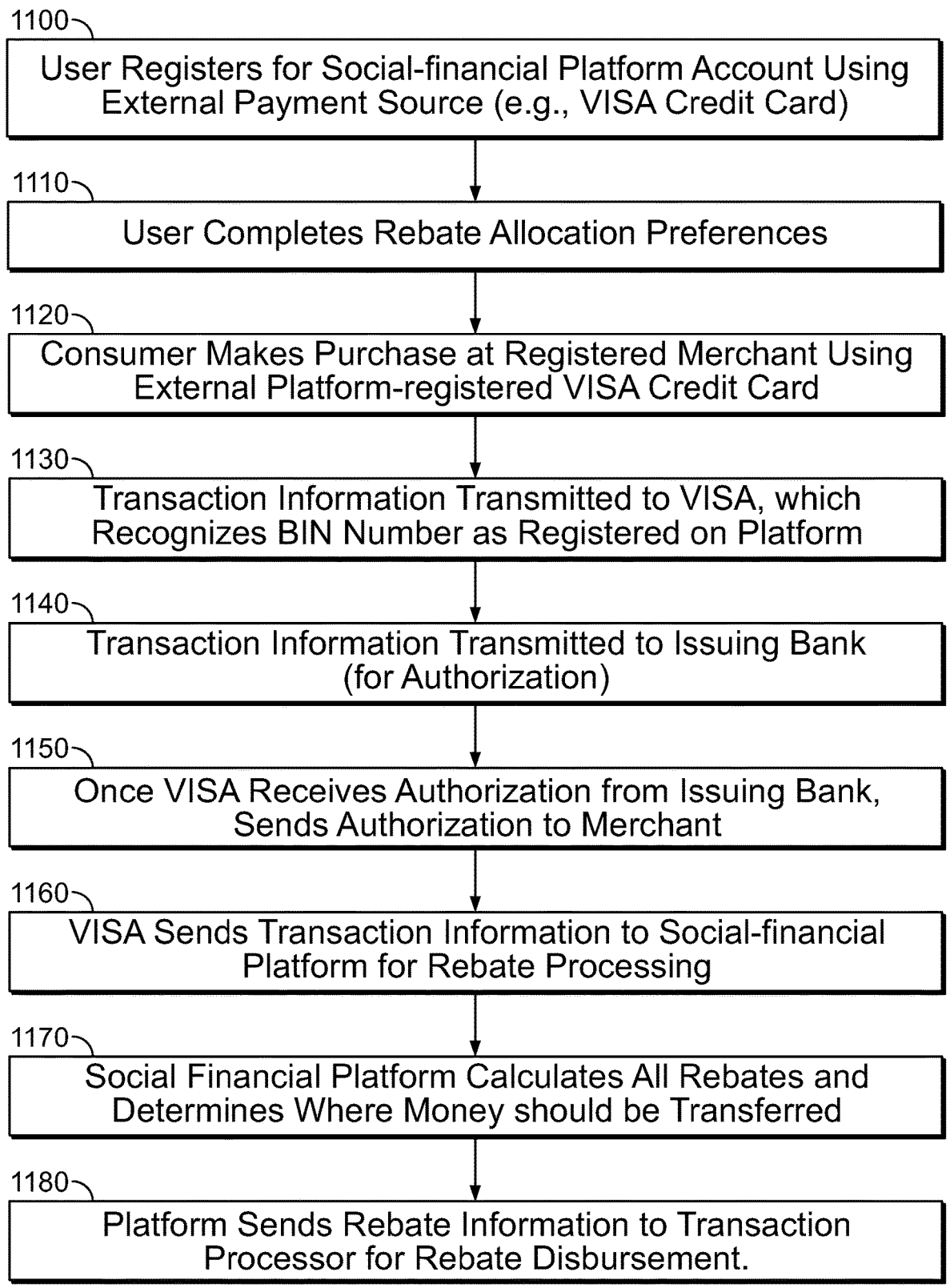
FIG. 28 provides a flow chart representation of an example rebate transaction using an external payment token, in accordance with an embodiment of the present disclosure.

FIGS. 27 and 28 provide flow charts of exemplary embodiments of purchase transactions using the currently disclosed methods and systems. In FIG. 27, a platform-issued GPR card (e.g., a debit card) is used. In FIG. 28, an external funding source, such as a credit card not issued by the platform, but linked to the platform by the user, is used for the purchase. Referring to FIG. 27, in a first step 1000, a consumer registers for the social financial platform. A consumer may sign up for the social-financial platform by registering for a general purpose reloadable (GPR) account with the social-financial platform and depositing money into the GPR account (step 1010). The social financial platform may offer various funding options including check deposit, Direct Deposit of Payroll, ACH, and other methods, across the spectrum of consumer timeliness and institutional risk, including, for example, offering early or immediate availability of unsettled ACH funds where the social financial platform covers the risk of insufficient funds. The social-financial platform may issue a GPR card/debit card or other payment token for consumers to use in their transactions (step 1015), which then deducts funds from a consumer's platform virtual GPR account. FIG. 27 illustrates such a situation, in which a consumer is using his or her platform-issued GPR card to make a purchase.

As described in greater detail above, once a user has registered for the social-financial platform, a user may then sign into the social-financial platform to determine how to allocate rebates from merchants (step 1020).

Next, at step 1025, a user makes a purchase using the platform-issued payment token at a merchant who is registered on the social-financial platform and is offering a rebate. At this point, the payment and rebate processing begins. For ease of explanation, it will be assumed that the platform-issued GPR payment tokens are one or more VISA debit cards, tied to each user's virtual platform account, and that the social-financial platform uses a transaction processor that keeps track of each virtual user account and transfers funds to/from/between those virtual accounts. However, it should be understood from this disclosure that these third-party transaction and financial processors may be integrated into the social-financial platform, or equivalent institutions may be substituted, and different types of payment tokens may initiate different transaction processing steps or deviate slightly from the flow chart shown in FIG. 27.

In this embodiment, a user makes a purchase at a registered merchant using the user's platform-issued payment token. In this example, the platform-issued payment token is a VISA debit card and the purchase is initiated by swiping the VISA debit card through a card reader at the merchant (or possibly making an online purchase using the debit card on the merchant's website). The card reader extracts payment information from the debit card (e.g., the debit card number, security codes, etc.) and transmits the payment information along with other transaction information to VISA for authorization and further processing (step 1030). Typically, card networks (e.g., VISA and MasterCard) will have a database of "issuing banks" (i.e., financial institutions that issue credit cards), and a 4 to 6 digit number called a bank identification number (or "BIN") used to identify each issuing bank. These 4 to 6 digit numbers will typically make up the first 4 to 6 numbers of a credit or debit card. In step 1035, VISA extracts the BIN and determines that the card used for payment is a card issued by the social-financial platform, and knows to transmit the transaction information to the platform's transaction processor. The transaction information is then transmitted to the transaction processor in step 1040. The transaction information transmission may be part of a payment authorization transmission, or it may be a separate, independent transmission.

In alternative embodiments, transaction information may be transmitted to the social-financial platform in a variety of ways. For example, if the Point of Sale system is directly connected to the social-financial platform, then the transaction information may be transmitted directly from the PoS system (e.g., the cash register or card reader) to the platform, rather than being routed through VISA. Alternatively, if such direct communication is not possible, then information may be transmitted through a third-party processor, such as VISA. In another embodiment, the platform may establish virtual accounts for merchants with whom there is a consumer partner sponsorship relationship. In this instance, merchant partners may accept payments for services from consumers directly through the monolithic account structure without incurring payment card interchange fees.

The amount and type of transaction information provided to the social-financial platform can vary depending on the implementation. Preferably, sufficient information is provided to the social-financial platform such that the platform can determine whether the transaction qualifies for a rebate, and if so, the amount of that rebate. In particular embodiments, the transaction information may comprise one or more of: account identifying information (e.g., user ID's and passwords, user account numbers, user-identifying information for different services/providers/processors, address, phone number, social security number, etc.), merchant-identifying information (e.g., merchant name, merchant number, account number), item information (e.g., price, SKU information), transaction information (date, time, payment method, promotion code, payment amount, currency, transaction type, etc.). Further, different information may be provided for different types of transactions (e.g., a purchase or sale at a merchant will require one set of information, while a simple transfer of money from one user to another will require different information). Some of this information may not currently be transmitted to VISA or MasterCard in a typical transaction authorization request. However, in one embodiment, transaction information may be transmitted to the payment network (e.g., VISA or MasterCard) using a customizable field in the transaction communication between the PoS system and the payment network.

The phrase "transaction information" is used generally in this disclosure, and may be used to discuss information transferred between different parties. However, it should be understood that the "transaction information" may change forms in one way or another when it is transmitted from one entity to another (e.g., information may be removed or substituted or added at any given step). However, it should be apparent to one of skill in the art what transaction information is necessary at each step to carry out the functions described herein.

Returning to the method disclosed in FIG. 27, transaction information is transmitted to a third-party transaction processor in step 1040. The transaction processor's role, in the present example, is to keep track of how much money is contained in each user's card or virtual account, and to update this balance information with each transaction. In this embodiment, all funds contained within the platform's monolithic account structure are housed in one or more bank accounts belonging to the social-financial platform. From the viewpoint of the banks housing these funds, the funds simply belong to the platform, and are not demarcated as belonging to one platform user or another. The transaction processor stores user information and user balance information in one or more databases so that the platform can keep track of how much money each user has stored in the platform's monolithic account.

The transaction processor, having received the transaction information, takes two steps. One of those steps, step 1045, is to check whether the user has sufficient funds in their virtual platform account. This is essentially an authorization check, i.e., seeing whether the transaction is authorized. The authorization check can be performed by extracting user information and purchase amount information from the transaction information, looking up the identified user's card or virtual account balance, and determining whether there are sufficient funds in the user's account to pay for the transaction. If the transaction is authorized, the transaction processor transmits an authorization to VISA, which then proceeds to inform the merchant that the transaction was authorized and may proceed. Once the transaction is authorized, the transaction processor transmits transaction information to the platform for rebate processing (step 1050) (again, this transaction information may be the same or a modified version of the transaction information received by the transaction processor).

Once the social-financial platform receives the transaction information, the platform determines whether a rebate applies, the rebate amount, and how the rebate should be disbursed (step 1055). Again, this determination may vary based on the implementation. The platform may extract the merchant information from the transaction information received from the transaction processor, look up the merchant's account on the platform using the merchant information, and see what rebates the merchant is offering. The rebate may be a blanket rebate on all purchases (e.g., 10% rebate on transaction amount). Alternatively, the rebate may be defined more specifically. For example, a certain cause or group may get a higher percentage; or consumers may get a higher percentage at certain times of the day or days of the week; or a special rebate may apply for a particular duration. If a rebate applies, the platform can then determine the appropriate rebate amount, and then look at the consumer's rebate allocation preferences to see how the calculated rebate amount should be distributed.

It should be readily understood from the present disclosure that, using information available to the platform (e.g., merchant account info, consumer account info, manufacturer account info, product info, transaction info, group/cause info, location and date/time info, etc.), a wide range of customization of rebates is possible. For example, rebates may be offered on specific products, and SKU information may be used to determine whether the consumer purchased those specific products. Rebates may be offered to specific consumers (e.g., anyone living in a particular zip code who has the Red Cross as a listed beneficiary). Rebates may even be tailored to particular events (e.g., extra 25% off for all new graduates for purchases made within one week of graduation) or locations. All of this information may be processed via the social-financial network.

Once the platform determines the amount of the rebate that should be paid out based on the transaction, and where money should be transferred, the platform transmits this information to the transaction processor to trigger the rebate payment (step 1060). Rebate payments are made to appropriate beneficiaries according to the distribution preferences set by the user. Distribution of funds may be instantaneous, as the transfer of funds is carried out virtually (e.g., funds are transferred from one virtual account to another), and all of the actual monetary funds are still contained within the monolithic account structure. Distribution of funds may be carried out by the platform, by a third party processor, or, as in this example, by the platform sending instructions to the third party processor to disburse the rebate. In the present example, as explained above, the transaction processor keeps track of user balance information. The platform, after calculating rebate amounts, may send instructions to the transaction processor to update user accounts based on the calculated rebates. This may be done by automated application programming interface (API) calls.

For example, if the platform determines that Beneficiary Account 1 should receive $1.50 in rebates, Beneficiary Account 2 should receive $1.00 in rebates, and Consumer Account 3 should receive $0.50 in rebates, the platform can send instructions to the transaction processor to increase Beneficiary Account 1's balance by $1.50, to increase Beneficiary Account 2's balance by $1.00, and increase Consumer Account 3's balance by $0.50.

The platform may also send instructions with corresponding deductions from other virtual accounts paying out the rebates. As mentioned above, rebates from the merchant to the consumers/beneficiaries may be paid out in several ways. In a first embodiment, the merchant may load its virtual platform account with funds, which are used to carry out the rebates. In this embodiment, the information transmitted to the transaction processor may indicate that the merchant's account should be deducted X dollars, and each beneficiary's account should increase by Y dollars. Alternatively, the platform may pay the rebates (e.g., via a reserve of funds within the platform's bank accounts), and then collect payment from the merchants on a periodic basis. In this embodiment, the platform may keep track of all rebates paid by the platform on a merchant's behalf, and then, at the end of the settlement period, send a bill to the merchant for the amount owed by the merchant to the platform. In the second embodiment, even if payment from the merchants to the platform requires an ACH delay/fee, consumers and beneficiaries are shielded from those effects and are given rebates instantaneously for little to no fee.

In the above example, if the rebates are being paid from a merchant's virtual account, then instructions may be sent to the transaction processor to decrease the merchant's virtual account balance by $3.00 (to cover the rebate amounts of $1.50, $1.00, and $0.50). Alternatively, if the rebates are being paid by the platform's reserves (to be settled with the merchant later), the instructions to the transaction processor may instruct the transaction processor to deduct the platform's reserve balance by $3.00. The platform records the transaction and makes note that $3.00 in rebates have been paid on the particular merchant's behalf, so that the merchant may be billed later. In addition, the platform distributes the rebate allocations to the purchaser's designated beneficiaries as well as depositing the agreed-upon rebate commission into the virtual revenue account on the platform. Since these transfers are being made digitally/electronically, rebate disbursements do not require any ACH transactions and avoid the delays and fees associated therewith.

Currently, small, instantaneous donations on individual transactions are impractical. This is because each donation/rebate, requires a transfer of money from a merchant to the beneficiary. Presently, this requires an ACH transfer. As discussed previously, this would require payment of a fee and a processing delay. However, the monolithic account structure and processing steps described herein allow for instant virtual transfer of funds from one account to another, no matter how small the amount, for many individual transactions.

Alternatively, or in addition to their platform-issued GPR payment tokens, consumers may also have the option of registering an external payment source, such as a credit card, an external debit card, or checking account, with the social-financial platform. This is the scenario demonstrated in FIG. 28, in which a user is conducting a payment transaction with an independently issued (i.e., not issued by the platform) VISA credit card. As such, FIG. 28 is very similar to FIG. 27, but rather than using a platform-issued payment token (e.g., a VISA debit card tied to the user's virtual GPR account), the user has registered an external payment source to the platform, and is using that payment source.

Once a user has linked a payment token to the social-financial platform, the user may then begin using that token with merchants to receive rebates via the social-financial platform. It should be noted that, while this example describes the use of a physical card that is swiped, it should be understood that for all embodiments disclosed, any payment method is possible, including payment via near-field communications, Bluetooth, an image of a card on a mobile device, manual entry of card/account information, etc.

For example, consider a scenario in which the user has registered a VISA card with the social-financial platform. In step 1120, the user uses the registered VISA card at a member merchant. At step 1130, the card reader at the merchant transmits a transaction authorization request to VISA to determine whether or not the transaction is authorized. VISA may maintain a database of all credit and debit cards that are registered on the social-financial platform, so that when a registered card is used, VISA knows to transmit the transaction information to the social-financial platform for processing of rebates. Visa also maintains a list of merchants offering rebates in the social financial platform, so that Visa can know which transactions to route to the social financial platform. Currently, credit card processors such as VISA or MasterCard maintain databases in which card BINs are associated with particular issuing banks (i.e., the financial institution actually providing the line of credit on the card), so that transaction information can be routed to the issuing bank to determine whether or not a transaction should be authorized.

In this particular embodiment, the actual payment transaction in which the merchant is paid for the items and the platform rebate transaction may occur independently. In step 1140, VISA transmits transaction information to the issuing bank for authorization. If the transaction is authorized by the issuing bank, VISA transmits the authorization to the merchant in step 1150 so that the transaction may proceed. In this scenario, a user may be able to use a reward-bearing credit card to make the purchase and receive those credit card rewards from the user's issuing bank, while also receiving a rebate via the social-financial platform.

In step 1160, having received authorization for the transaction from the issuing bank, VISA transmits transaction information to the social-financial platform for rebate processing, at which point the processing is the same as in FIG. 27. It should be noted that the transaction information transmitted to the issuing bank for authorization may be different than the transaction information transmitted to the social-financial platform for rebate processing. It is possible that the authorization request will require less information than rebate processing will, and so the information transmitted to the social-financial platform may contain more information than the authorization request sent to the issuing bank.

Monolithic Account Structure and Virtual Purses: Trans-National Functionality

The disclosed systems and methods may also be implemented to minimize, or even eliminate, international money transfer delays and fees. Current international money transfer schemes require users to pay fees for wire transfers between banks in different countries, and also require additional fees if consumers wish to have the money transferred more quickly or avoid delays. In the presently disclosed monolithic account structure, users can transfer funds from one virtual account to another with no delays or fees. Mechanisms are provided for members to withdraw those funds and use them outside of the social-financial platform.

Current international regulations state that banks may only issue GPR cards within a particular country or region. To address this issue, the social-financial platform may partner with or open accounts in banks in different countries. By integrating banks in different countries into the platform, those banks can distribute GPR cards to citizens of their country. In this way, money can move between virtual accounts on the platform without any delay or fees, and then people can use the money in their virtual accounts using their platform-issued GPR card, which is tied to their virtual account. Additionally, or in alternative, users may be able to withdraw the funds from their virtual platform account to an external account (e.g., a credit card or a checking account) for external use.

In this implementation, the monolithic account structure may store funds in different accounts in different banks in different countries. For consumers, this is of little to no import, as the social-financial platform can treat all funds within the platform without discrimination, and distribute those funds among users instantly and with little to no fees. This process may be carried out by the international banks transferring funds to each other periodically based on the amount of funds that have been transferred between users of different countries. However, the platform will need to ensure that it maintains sufficient reserves in each of its different international banks to sufficiently cover potential losses in those individual countries.

For example, consider the example system diagram shown in FIG. 26. In FIG. 26, the platform includes two users from the U.S., and two users from France. All money deposited or stored in the platform by U.S. users are housed in one or more U.S. banks. Similarly, all money deposited or stored in the platform by French users are housed in one or more French banks. User A in the U.S. may transfer $500 to User B in France. In the same settlement period, User C in France may transfer $300 to User D in the U.S. These transfers can be made nearly instantaneously and with little to no fees because the money being transferred from one user to another is contained within the platform's monolithic account structure. All that is required is digitally transferring funds earmarked for one user to another user's virtual account. In order to ensure that each national account has sufficient funds to account for all users in a particular country, money may periodically be transferred from one national account to another as required. In this example, at the end of the settlement period, a net sum of $200 has been transferred from U.S. platform users to French platform users. The $200 net difference may be transferred from the platform's U.S. bank to the platform's French bank to account for the net transfer of funds. Using this rudimentary example, it should be readily appreciated that, by aggregating transactions over a period of time, the international wire transfer fees required to transfer funds from the platform's account in one country to its account in a different country are minimized, and, potentially, negated. For example, if 10,000 international transfers are made between the U.S. and France in a month, and a single wire transfer is required at the end of the month to settle any difference, then the single wire transfer fee (e.g., $1) is essentially meaningless. In this way, users of the social-financial platform may transfer money internationally instantly and with little to no fees.

Linked-Card Structure and Functionality

Figure 29:
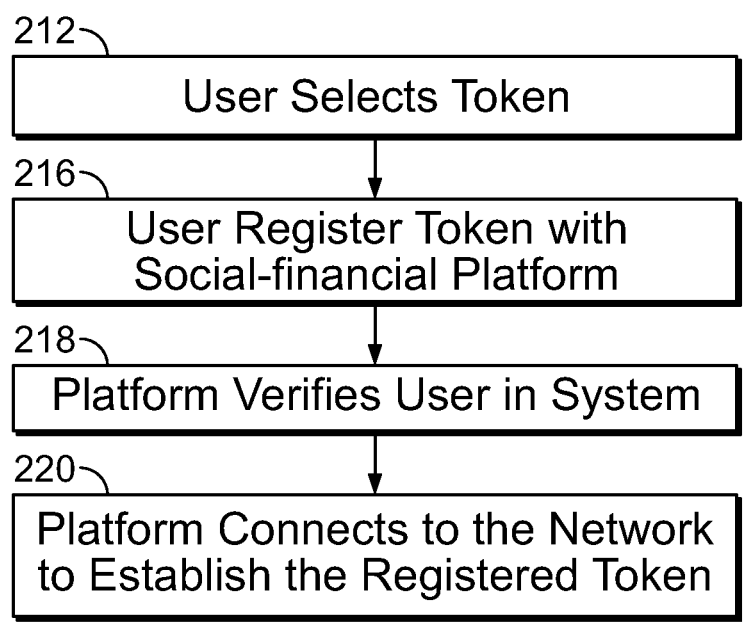
FIG. 29 provides a flow chart representation of an example process for linking an external payment token to a social-financial platform, in accordance with an embodiment of the present disclosure.
Figure 30:
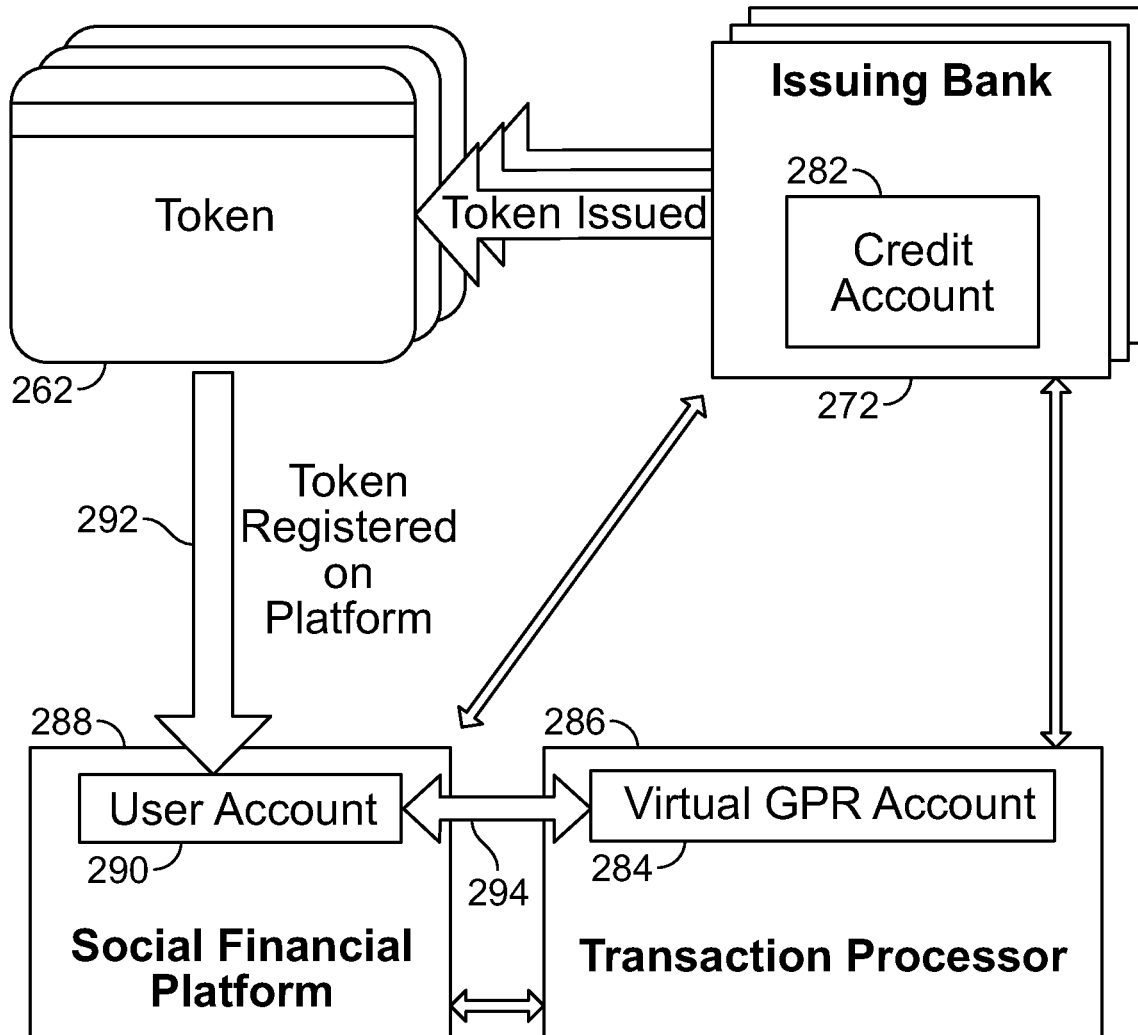
FIG. 30 provides a block diagram representation of linking an external payment token to a social-financial platform, in accordance with an embodiment of the present disclosure.

In other embodiments of the systems and methods disclosed herein, techniques can be used for linking payment tokens such as credit cards, for example, to the social financial platform to allow a more streamlined rebate credit process. For example, various embodiments can be implemented in which the user (e.g., the consumer-member) can register his or her payment token with the social financial platform so that it is linked to the platform for rebate identification and crediting. FIGS. 29 and 30 are diagrams illustrating an example process for such linking in accordance with one embodiment of the technology disclosed herein. Referring now to FIGS. 29 and 30, at operation 212 the user can be given the option to select a payment token 262 that he or she wishes to have linked with the social-financial platform. For example, the user can identify one or more of his or her credit cards for linking. In the case of credit cards, these are generally issued by an institution that is typically referred to as an issuer, issuing bank, or bank of record (although other terms may be used). In this document, the issuing institution will be referred to as the issuer or issuing bank, although it is possible that institutions other than banks will issue payment cards. As shown in FIG. 30, the token holder has a credit account 282 at the issuing bank 272 in the case where the token is a credit card.

At operation 216, the user registers the selected token 262 with the social financial platform 288 (also block 292 in FIG. 30). Accordingly, user interfaces can be established to allow the user to select the option of registering his or her credit card (or other token) such that that card can be linked to (i.e. associated with) the social-financial platform. The system can be configured to request that the user enter, at the registration stage, the token identification (e.g., credit card number) and other fields such as the name associated with the token, the expiration date, the security code, or other appropriate token identification information.

At operation 218, the social-financial platform verifies the user as part of the system. This can be done via a user login before the user registers his or her card or as part of the card registration process. Once the user identification and token information are complete, the token 262 can be linked to the user's account 290. As such, future purchases or other transactions completed with the token 262 can trigger rebates based on the linkage between the token 262, and the user's account 290 on the social-financial platform 288. By way of further example, when the user completes a purchase with the linked token 262, that transaction is flagged as being associated with the social-financial platform 288, and transaction information is sent to the social-financial platform 288. This enables the social-financial platform to determine any rebates for which the transaction is qualified, and to trigger a credit of such rebates to the user. Accordingly, embodiments such as this can be used to allow third-party tokens from a variety of issuers to be used in conjunction with the social-financial platform.

At operation 220, as part of the token registration process, the social-financial platform connects to the applicable payment processing network (e.g., Visa, MasterCard, etc.) to establish the registered token. Accordingly, for future transactions with the token, the network can forward the transaction information to the social-financial platform.

For each registered token 262, the social-financial platform 288 can create a virtual account 284 associated with the user account 290 and/or the token 262 (block 294 in FIG. 30). The virtual account 284 is stored in the transaction processor 286, which may be a part of the social financial platform 288 or performed by a third party transaction processor. The virtual account 284 is identified as being an account of the token holder and can be used for purposes such as receiving rebates as a result of qualifying transactions. In some embodiments, the virtual account 284 can be established as a general-purpose reloadable (GPR) prepaid card account. With these accounts established, when future transactions are completed, the rebate can be issued directly to the virtual account 284 as instructed by the social-financial platform.

As this example illustrates, tokens can be linked to the platform such that instead of distributing the rebate to the credit card account, the rebate can be distributed directly to the user's virtual account 284. Likewise, instead of requiring the merchants or other sponsor-members to distribute rebates based on qualifying transactions, the rebate can be managed by the social-financial platform. Additionally, the social financial platform can credit the consumer member's virtual account with the rebate so that the merchant does not need to do anything further for the rebate to occur. This example also illustrates that rebates can be transferred from the merchant's virtual account on the platform to the consumer-member's virtual account 284 without requiring ACH or other like transaction. Furthermore, this can allow rebates to be distributed almost instantaneously and without further processing.

As illustrated at FIG. 30, the system can be configured to allow linking to a plurality of tokens issued by a number of different issuing banks to provide flexibility for the system. This allows participation by a number of different tokens from a number of different issuing banks.

Figure 31:
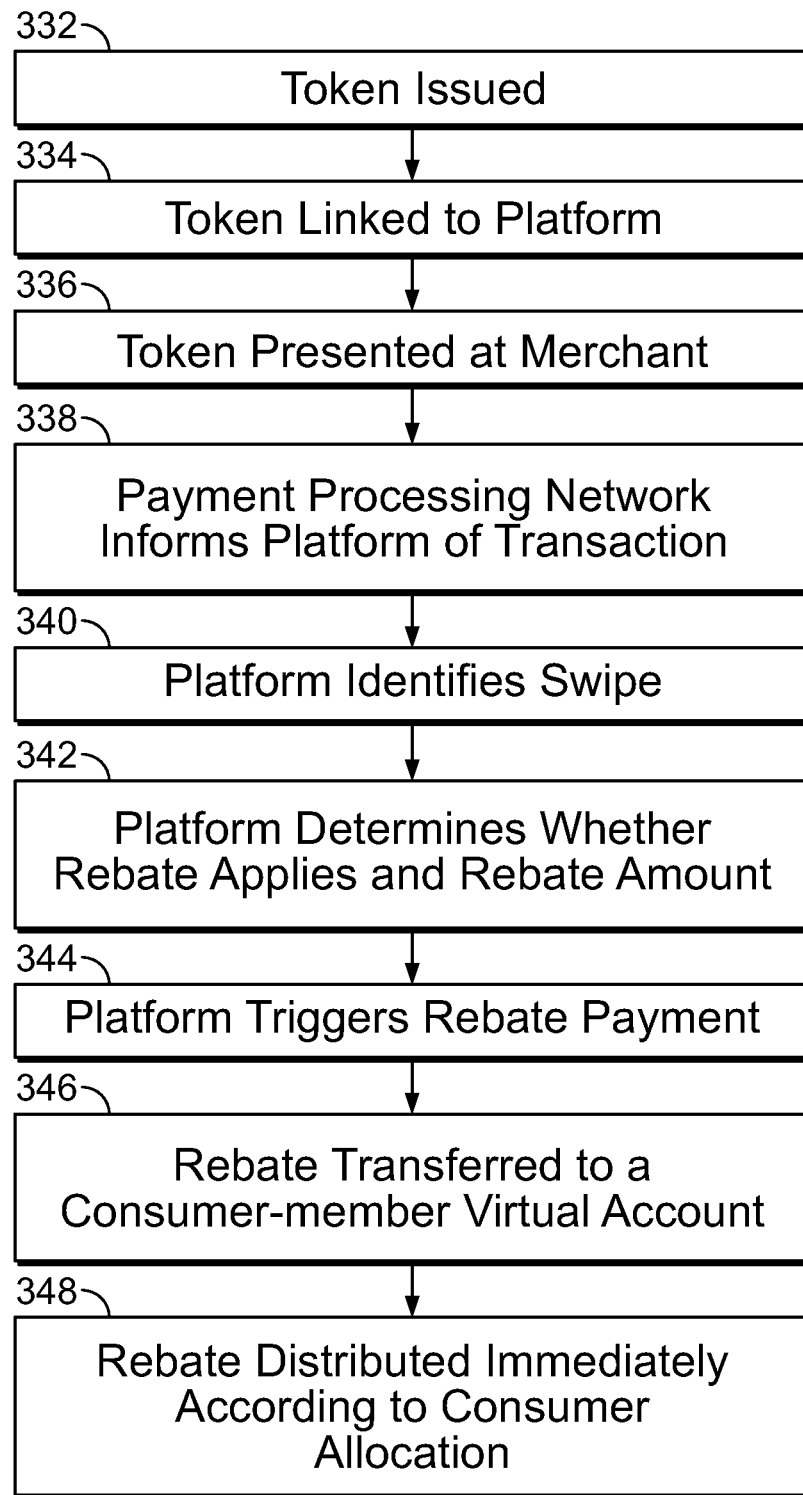
FIG. 31 provides another flow chart representation of an example process for linking an external payment token to a social-financial platform, in accordance with an embodiment of the present disclosure.

FIG. 31 is a diagram illustrating another example of token linking in accordance with various embodiments. Referring now to FIG. 31, at operation 332 the issuing bank issues a token to the consumer-member. At operation 334, the consumer-member links the token to the social-financial platform. This can be accomplished, for example, as described above with reference to FIGS. 29 and 30. When the consumer-member makes a purchase, he or she presents the token at the sponsor-member (e.g. at a merchant) as payment for the transaction. This can take the form of a credit card swipe, for example. This is illustrated at operation 336.

Because the payment processing network knows that the token is linked to the social-financial platform, at operation 338, the payment processing network sends the transaction information to the social-financial platform. At operation 340, the social-financial platform identifies the token based on this information. The social-financial platform determines whether the transaction qualifies for a rebate based on rebate criteria set forth by the sponsor-member and, if so, determines the rebate amount. This is illustrated by operation 342. If the transaction qualifies for a rebate, at operation 344, the social-financial platform triggers the rebate and any allocations to the consumer-member accounts and/or non-profit cause accounts domiciled on the social financial platform. Particularly, in various embodiments, the social-financial platform sends a message or other information to the consumer-member and the member's causes and/or member connections, if applicable, informing the consumer-members of the rebate and the rebate amount associated with the transaction. For example, this messaging can be conducted as described above under the Messaging and Invitations section of this document. At operation 346, the social-financial platform distributes the rebate and any allocations to the consumer-members' GPR cards or virtual accounts, and/or to the virtual accounts of any nonprofit organizations that were the beneficiaries of the rebate allocations.

At operation 348, the rebate is distributed from the sponsor member's virtual account to the beneficiaries designated by the consumer-member's allocations. For example, where the beneficiary is set up as a GPR card or purse, these payments can be made to the beneficiaries in the form of debit card credits. Accordingly, the social-financial platform can be configured to provide payment information (accounts, allocations, and so on) to the transaction processor such that payments to the beneficiaries can be made in the appropriate amounts. These can be done instantaneously, on a periodic basis (e.g. daily, weekly, monthly, quarterly, and so on) or when certain dollar thresholds are met for the account. Rebate allocations designated for nonprofit organizations are distributed through traditional disbursement mechanisms such as ACH.

As this example illustrates, third-party-issued credit cards and other tokens can be identified and linked to the social-financial platform and used as part of the rebate process. This example also illustrates that credit card accounts and GPR accounts can be bridged to allow a more efficient and nearly instantaneous transfer of funds for rebate allocations.

Rebate Parameters: Functionality and Analytics

The amount and type of transaction information provided to the social-financial platform for the various transactions can vary depending on the implementation. Preferably, sufficient information is provided to the social-financial platform such that the platform can determine whether the transaction qualifies for a rebate, and if so, the amount of that rebate. Whether the transaction qualifies for rebate and the amount of the rebate can be determined based on rebate parameters or rules set up by the sponsor-member in the social-financial platform. As discussed above, the transaction information received by the platform for various transactions can include, for example, a merchant identification, a store location, time and date of transaction, a token number or indication of the token identification, a transaction amount, consumer identification, and so on.

In further embodiments, information can also include information to determine whether the transaction also qualifies for other affiliate or loyalty programs or is otherwise part of another like system. This can be used to avoid double dipping in which the merchant might otherwise be required to pay multiple rebates. In various embodiments, the system can also include raw data of the POS screenshot and SKU information on the products purchased.

In yet further embodiments, consumer demographic information can be supplied as analytic data to sponsor-members or other interested parties. While in some embodiments, complete information can be provided, in other embodiments only non-identifying analytic data is provided. This can include, for example, information such as the consumer's sex, race, religion and age; information regarding the purchase location purchase goods; and so on. This demographic information can be useful for marketing or other purposes.

In yet another embodiment, discounts for goods or services can be provided in the form of rebates for goods or services. Consider, for example, the case of tickets for an amusement Park, a show, the theater, or other event. Such tickets may often be offered at various price points depending on the avenue of sale for the tickets. For example these tickets may be offered at full retail for regular purchase, or they may be available at a discount through various distributors or merchants (e.g., through coupons available at grocery stores and other retailers). Furthermore, the event holder tickets may wish to offer the tickets at an extra discount (i.e., beyond the discounted price) to certain groups such as, for example, church groups, schools or classrooms, and so on. In some embodiments, this extra discount provided can be offered in the form of a rebate off of the normally discounted purchase price. That is, a consumer-member (or member group such as, for example, a church group) can be offered to purchase the tickets at the regularly discounted price, but to also receive a rebate off of that discounted price to make the purchase more attractive. The rebates can be managed through the social-financial platform as described in the various embodiments discussed above.

In still further embodiments, information regarding how rebates are allocated to various beneficiaries can also be shared with sponsor-members. For example, information regarding how much a given sponsor-member's rebates went to various 501(c)(3) or other charitable organizations can be useful for tax purposes, PR purposes, recordkeeping or otherwise. For example, the system can be configured to provide to the sponsor-member a rollup of the aggregate dollars provided to each beneficiary as a result of that sponsor-member's rebates. In some embodiments, this information can be disassociated with the user such that the sponsor-member can determine where its rebates were allocated, but not necessarily by whom. In other embodiments, full information can be shared with sponsor-member. This can be set, in some configurations, based on a user opt in of this feature.

Additional Charitable Donation Functionality and Analytics

Figure 32:
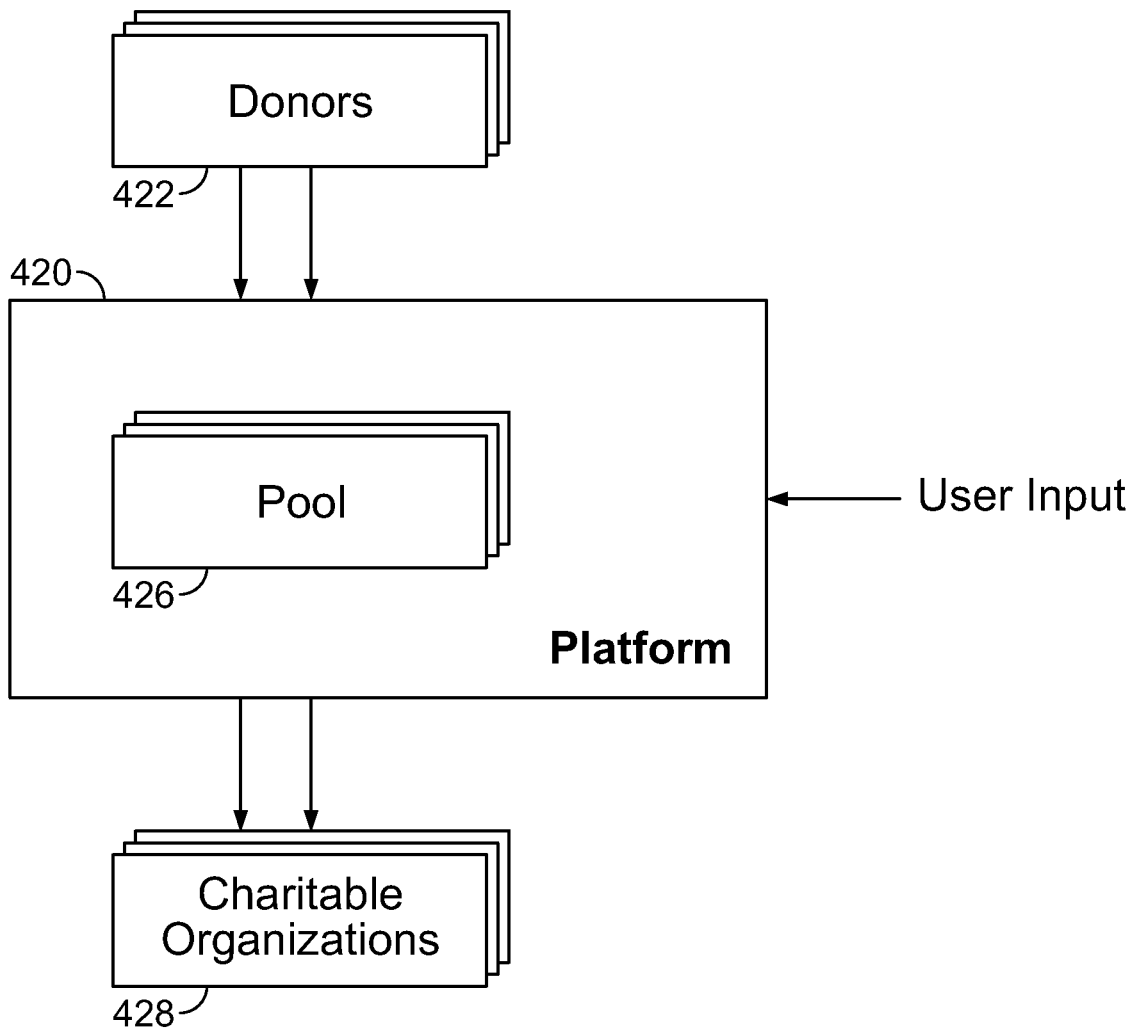
FIG. 32 illustrates an example architecture for managing payment allocations, in accordance with an embodiment of the present disclosure.

Systems and methods can be implemented to provide charitable donation functionality for merchants, corporations, or other businesses who may wish to make charitable contributions to organizations whether within or outside of the rebate process. For example, in some embodiments, a charitable donation portion of the social-financial platform can be established to track and manage charitable donations (or other payment allocations) beyond or in addition to those provided through the rebate processes described herein. FIG. 32 is a diagram illustrating an example architecture for managing payment allocations in accordance with one embodiment of the systems and methods disclosed herein. In the example illustrated in FIG. 32, the social-financial platform 420 includes a module for managing such payment allocations. In one embodiment, the payment allocations can be payments for charitable contributions to a variety of charitable entities or organizations. However, in other embodiments, other payment allocations in addition to or instead of charitable donations can be managed as well. However, for clarity of description, this aspect of the platform is described in the context of an example application of charitable donations. In this example, a plurality of donors 422 are configured to communicate with the social-financial platform 420. These donors 422 can include, for example, individuals, businesses, corporations or other corporate entities, charitable giving groups, and so on.

Also shown in the example of FIG. 32 are a plurality of recipients, which, in this example, are charitable organizations 428. These charitable organizations 420 can include, for example, entities such as 501(c) organizations. The social financial platform 420 can further include one or more charitable pools 426 that can be used to collect funds from donors and from which such funds can be distributed to charitable organizations 428. Finally, this example illustrates that various system users such as, for example, consumer members or other users can provide input that the social financial platform uses in determining funds allocations from donors 422 to charitable organizations 428.

Accordingly, an architecture such as that illustrated in the example of FIG. 32 provides a system by which a plurality of donors can provide contributions that are distributed to charitable organizations (or other entities) according to one or more allocation schemes. In some embodiments, other system users such as, for example, consumer-members can be given the opportunity to provide input to the social financial platform 420 drive the allocations among the various recipients. For example, in some embodiments, the system users can be given the opportunity to vote or otherwise provide input on how the funds should be allocated among the various recipients. Member votes can be solicited and counted in a variety of ways depending on system goals. For example, in some embodiments, consumers who shop at a particular retailer may be given the opportunity to vote on which of a plurality of charities should be allocated donations from that retailer. In other embodiments, the system can be configured to allow user voting regardless of whether the users given the voting privilege have patronized the donors business. Such an embodiment can be particularly useful in implementation where the donor is not a retailer, but is instead a private individual or a philanthropic organization.

Consider, for example, a situation in which a donor wishes to provide a fund that is ultimately to be allocated to a plurality of recipient organizations in accordance with an allocation scheme. Consider further that for philanthropic, marketing, or other reasons, the donor wishes to provide members of the public (or certain members of the public meeting established criteria) with the opportunity to vote on the allocation. In some embodiments, the members can be given the opportunity to vote on a plurality of pre-determined organizations. In another embodiment, the voting may be opened and not limited to a pre-identified list of organizations. In such a situation, the system such as that illustrated in FIG. 32 can be used to collect the donations from one or more donors 422 in charitable pool 426, determine an allocation based on user inputs, and make a distribution according to the allocation to the various charitable organizations 428.

Consider another example in which the merchant is running a promotion that offers to provide a donation (which can be in place of or in addition to a rebate) to a group of charitable organizations for certain purchases made by its customers who are also participants in the social-financial platform. For example, the merchant could agree to donate a certain amount of money for certain types of purchases, for purchases at or exceeding a particular threshold, for purchases made within a particular time period, for purchases of certain qualified products, and so on. In such a scenario, the promotion could be advertised through conventional advertising means or through the social-financial platform. The members can take advantage of the promotion by making purchases from the donor/retailer whether in person or online. The consumer can then be given the opportunity to vote on the organizations to receive the donation. This voting can be done at the time of sale, or can be done after the fact. For example, for online sales, as part of or at the end of the transaction, the user can be directed to a voting screen that allows the user to make the selection (e.g., after his or her purchase is complete). For in-store transactions, for example, the user can be allowed to vote on the POS terminal, or the user can be given a QR code, a website and ID code, or other information to allow the user to go online and make the selection. In yet another embodiment, a message or other alert can be sent to the user by the social-financial platform allowing the user to do the voting from his/her smartphone, or when he or she logs onto his or her account at the social-financial platform.

The voting can be organized in a number of ways as the above examples illustrate. As a further example, member votes may be weighted by the amount of purchases made by the members. For example, members may be given a number of votes based on the amount of the purchases (which may be an individual purchase, or aggregated purchases for one or more retailers). As another example, a member vote may be weighted heavier for a member who made greater purchases than a corresponding vote for a member who made fewer purchases. Likewise, certain purchases may yield greater voting weights, such as purchases on clearance items or other merchandise the retailer may desire to move, for example.

Figure 33:
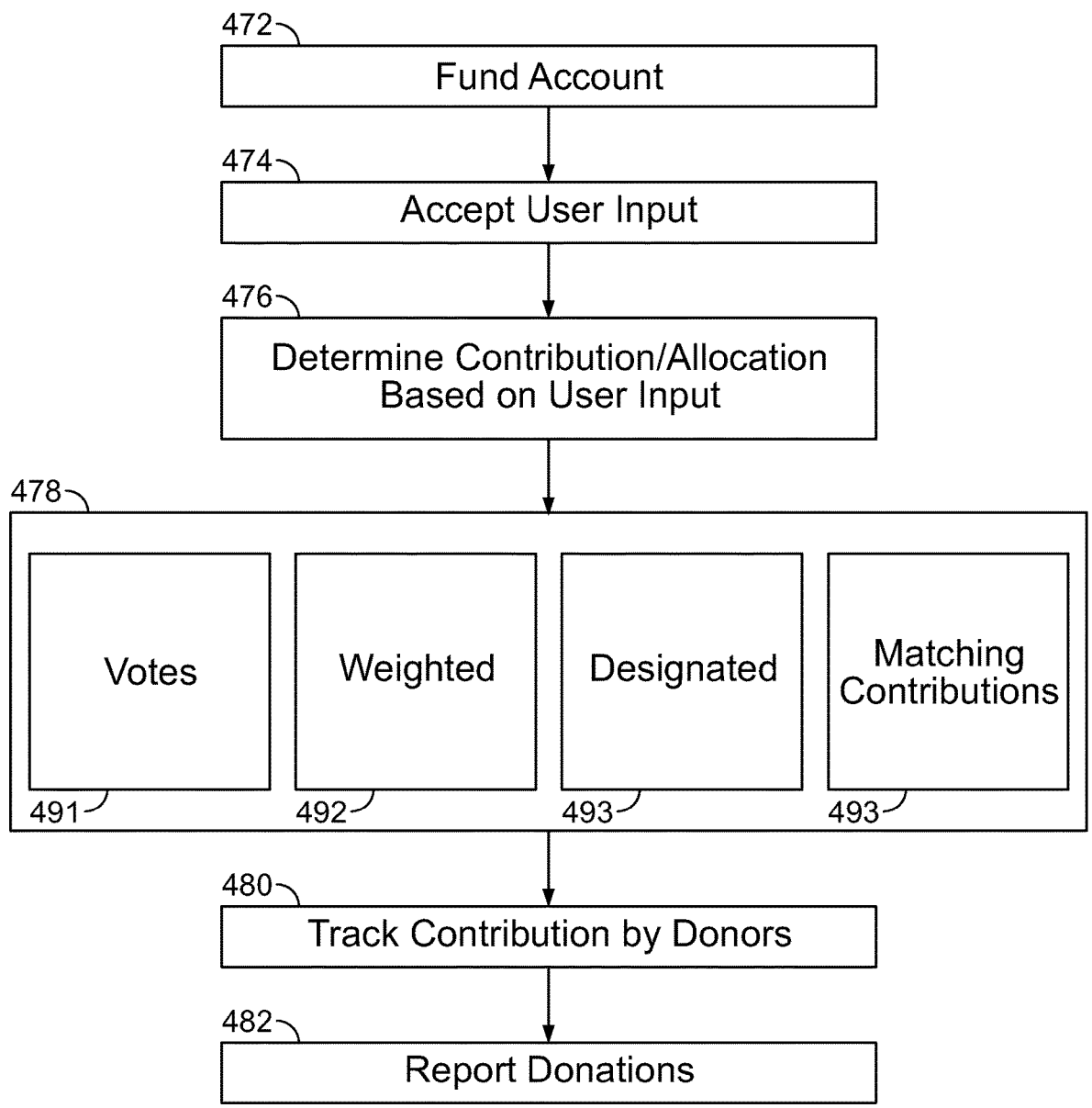
FIG. 33 illustrates an example process for allocating funds from a pool in the social-financial platform, in accordance with an embodiment of the present disclosure

FIG. 33 is a diagram illustrating an example process for allocating funds from a pool in the social-financial platform in accordance with one embodiment of the systems and methods disclosed herein. At operation 472 one or more donors fund the account. In the context of the example of FIG. 32, at this step, one or more donors 422 provides funds to one or more charitable pools 426. The various pools can be funded by various funding mechanism such as, for example, ACH transfers, wire transfers and the like. Additionally, the pools may be virtual pools created by the system while the funds remain at the donor until allocation. As noted above, the donors can include corporate sponsors, individuals, philanthropic entities, other organizations, and so on. These donors can work together to aggregate their resources in one or more pools, or they can create individual pools for their own purposes.

At operation 474, the social-financial platform accepts user input, which can, for example, be in the form of votes. As noted above, users can be given the opportunity to vote for one or more charitable organizations whom they believe should receive allocations from the pool. At operation 476, the social-financial platform determines an allocation based on this user input. As noted above, the votes can be tallied in a number of different ways, depending on goals or donor wishes.

At operation 478, the funds are allocated and distributed to the recipients (e.g., charitable organizations 428) by the system. As the example of FIG. 33 illustrates, the allocation can be accomplished in a number of different ways. For example, the allocation can be according to user votes 491, weighted based on user purchases 492, designated by the donors 493, or distributed as matching contributions corresponding to member allocations. As these examples serve to illustrate, there are a number of techniques the social-financial platform can use to allocate funds among the various recipients. Additionally, as shown at 494, the system can be configured to allow the donor to make matching contributions to match those contributions of the users whether on a one-to-one, two-to-one, or other proportional basis.

At operation 480, the social-financial platform tracks the contributions made by the donors. At operation 482, the social-financial platform can provide statements to the donors giving them a full accounting of how much was allocated to which organizations, on which dates, and so on. Additionally, the details of the organizations, including information needed for tax purposes (e.g., Tax ID #s), can be provided with these reports so that the donors can track their contributions for tax, recordkeeping, reporting, and other purposes. Information on the donations can also be provided to users of the system, including the users who voted on the allocations. Accordingly, the results of the voting process, for example, can be reported to the users, or advertised through the system.

Credit Functionality

Still further embodiments can be implemented to extend credit to consumer-members who conduct transactions without using a credit card or other credit token. Particularly, in some embodiments, the system can be implemented to extend credit to consumer-members who make purchases with a general-purpose reloadable (GPR) or other prepaid debit card. Consider, for example, a scenario in which a user enters into a point-of-sale transaction with a debit card, but does not have sufficient funds on the debit card to complete the transaction. In this scenario, embodiments of the social-financial platform (or other financial platform) can be configured to complete the transaction on behalf of the consumer-member, effectively lending the consumer-member the funds needed to complete the transaction. The system can be further configured to settle the loan with the consumer-member by receiving payment from the consumer-member for the loan. Such payment can be effected, for example, by the consumer-member making a payment to the social-financial platform. In another embodiment, such payment can be effected, by the social-financial platform retrieving the funds from the consumer-member's bank account such as, for example, by an ACH transaction. The loan, in various embodiments, can be reported to the various credit reporting agencies as can the loan payoff. Accordingly, the consumer-member not only receives the benefits of credit where he or she ran out of funds on his or her debit card, but can also build a good credit history through the credit reporting agencies in the process.

Figure 34:
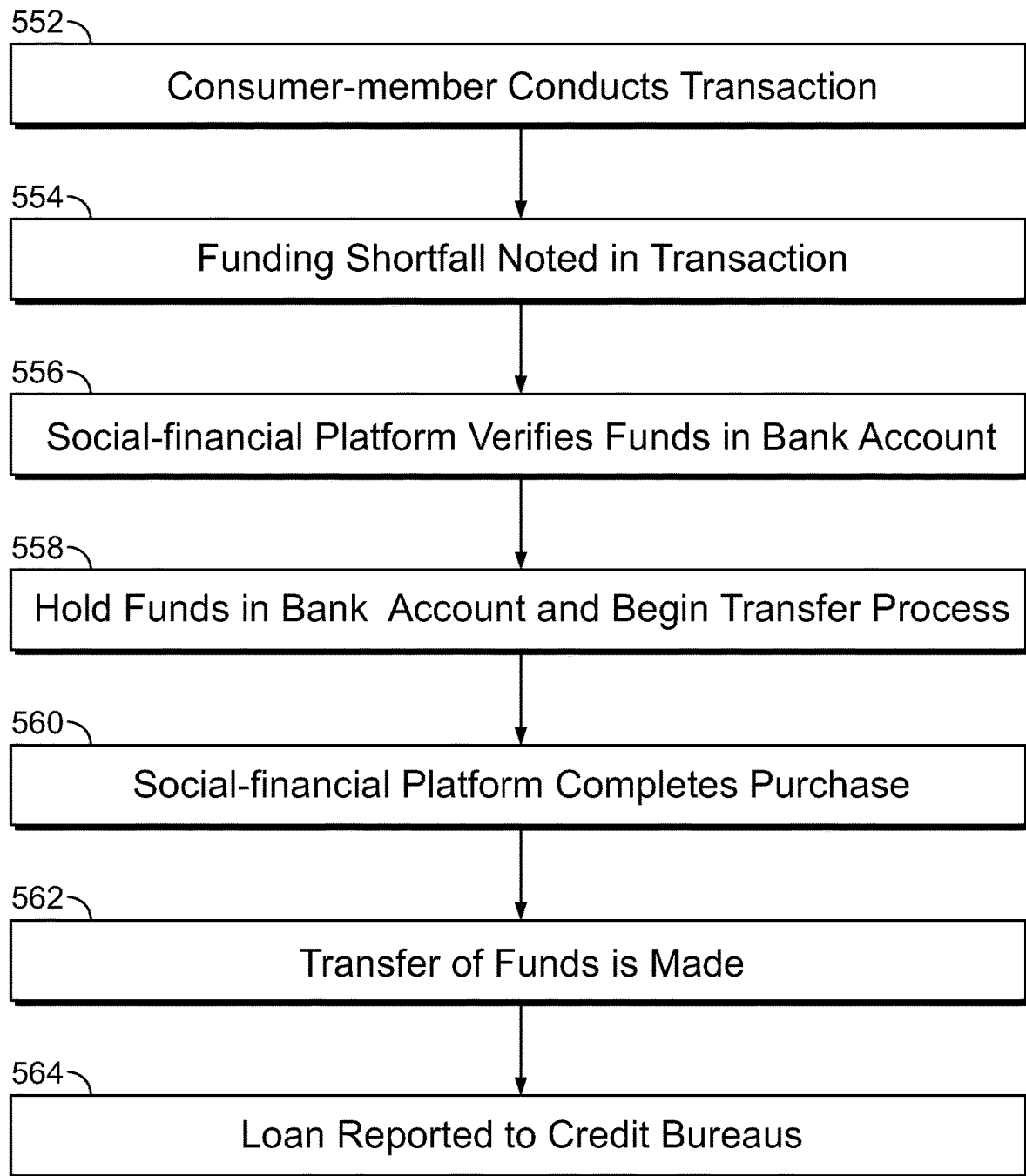
FIG. 34 illustrates an example process for extending credit to consumer-members, in accordance with an embodiment of the present disclosure.

Having generally described a system and method for extending credit to consumer-members using tokens such as debit tokens, a few more specific embodiments are now described. FIG. 34 is a diagram illustrating an example process for extending credit to consumer-members in accordance with one embodiment of the technology described herein. In operation 552, the consumer conducts transactions with participating merchants. Particularly, the user conducts transactions with a payment token registered with or issued by the social-financial platform. In some embodiments, these transactions can be using a debit tokens such as, for example, a GPR debit card. In various embodiments, the system can be configured to track the consumer-members usage of the system to build a usage history. Usage history and payment history may be used in some embodiments to place the consumer-member in a usage tier, to allow the consumer-member to build credit loyalty with the platform, or other like purposes.

Consider an example scenario in which the consumer-member conducts a purchase transaction using a debit token such as a debit card, but the debit card is not loaded with sufficient funds to cover the given transaction. This is illustrated at operation 554. This can occur, for example, when the consumer forgets to reload his or her GPR debit card, or otherwise makes a purchase exceeding the amount of funds available on the card at that time. When this occurs, the social-financial platform can be configured to fund the transaction in the form of a loan to the consumer-member so that the transaction can be completed. In some embodiments, the social-financial platform establishes an account funded sufficiently to cover transactions from consumer-members or eligible to take advantage of this program. In such embodiments, the funds to cover the transaction are withdrawn from this account and transferred to the benefit of the merchant. The social-financial platform then seeks reimbursement from the consumer-member to repay the loan that was made by the system to cover the transaction.

In some embodiments, loan repayment can be accomplished as set forth at operations 556, 558 and 560 in FIG. 34. Referring now to these operations, at operation 526 the social-financial platform accesses a bank account of the consumer-member and verifies that sufficient funds exist in the account to cover the transaction, or at least the shortfall in the transaction. Accordingly, in various embodiments, the consumer-member gives the social-financial platform appropriate permissions to access his or her bank account so that this verification can take place. If there are sufficient funds in the account to cover the transaction (or the shortfall), the social-financial platform places a hold on those funds in the account and initiates a transfer (e.g., an ACH transfer) from the bank account to the social-financial platform account. This is illustrated at operation 558. Then, at operation 560, once the funds are verified and marked, and the social-financial platform completes the purchase on behalf of the consumer-member. The ACH transfer is completed to transfer the loan funds from the consumer-member bank account to the social-financial platform account. This is illustrated at operation 562. This transfer can take time to complete, and generally is not expected to be completed at the time the transaction is funded. Indeed, transfers such as ACH transfers can take up to several business days before the transfer is processed and completed. Accordingly, the social-financial platform is making a short-term loan to the consumer-member to cover the transaction. In various embodiments, interest or other fees can be charged for the loan, or the loan option can be offered as a free benefit to consumer-members to encourage participation in the platform. This can also be used as a benefit to encourage members to use the debit tokens issued by the social-financial platform or its affiliates.

Once the loan is paid off, the social-financial platform can report the loan and its payment to the credit reporting agencies. This is illustrated at operation 564. Accordingly, consumer-members can use the short-term loan process to build a credit history with the reporting agencies and potentially improve their credit scores. This can be a benefit, for example, to young consumers who are just establishing a credit history and would like to show credit worthiness. This can also be a benefit to consumers in general who would like to improve their credit ratings. Because, in some embodiments (such as in the example described above), the funds can be marked in the consumer-member's bank account before the transaction is funded, the loan can be guaranteed, and can therefore be a relatively safe loan for the social-financial platform to make.

In other embodiments, as alluded to above, a loan process can be implemented that does not rely on the marking of funds in the consumer-member bank account, but instead relies on the consumer-member to repay the loan himself or herself. In some embodiments, tiers of membership can be established allowing the consumer-member to build a history with the social-financial platform and the social-financial platform can use these tiers in extending credit to consumer-members. For example, as a user builds history with the social-financial platform, that consumer-member may be rewarded with the option to participate in the above-described debit-overdraw protection system. Additionally, the consumer-member may be rewarded with greater credit limits, longer terms for payback, and so on. Still further, as consumer-members build a credit-worthiness history with the system, the members can be transitioned from the debit card to a credit card when they have established a certain level of credit worthiness.

In various embodiments, messaging can be implemented to inform the consumer when credit is extended. For example, when the user makes a transaction that is insufficiently funded by the debit card, the system can be configured to send a message to the purchaser that there are insufficient funds. The user can be given the option to agree to participate in the loan program or to cancel the transaction. For example, this message can be sent to the user's smart phone or other portable communication device such that user can receive the message and make a determination in real time as the transaction is being completed. In other embodiments, the message can be sent to the point-of-sale terminal allowing the user to make the selection on the terminal itself. In other embodiments, the user can be given the opportunity to opt-in in advance such that the loan occurs automatically in the event of a shortfall on the debit card. Either the consumer-member or the social-financial platform can be given the option to set credit limits with the system. For example, a consumer-member may determine that he or she wishes to opt in to the system, but the only authorize loans up to a certain dollar limit. Likewise, the social-financial platform may be configured to extend credit only up to a certain limit, and this limit can be determined based on the status (or tier) of the consumer-member in the system.

When the loan is made and the transaction is completed with the help of a loan, a message is sent to the consumer-member informing that person that a loan has been made. Again, this message can be sent directly to the point-of-sale terminal for the benefit of the consumer-member, or it can be sent through the social-financial platform such as, for example, to the consumer-member's mobile device. The message can also provide additional details to the borrower including, for example, the amount of the loan, the date and details of the transaction, the account from which repayment of the loan will be made, and so on. Likewise, when the funds are transferred to pay off the loan, messaging can be used to inform the consumer-member of this event.

In the event the consumer-member later changes his or her mind and returns the purchased items for a refund, crediting for the return can be handled in a number of different ways. For example, in one embodiment, the original transaction is flagged as a loan transaction and when the merchant attempts to return the funds to the debit card, the amount borrowed can be returned directly to the account of the social-financial platform, and the amount debited from the card itself can be returned to the debit card. In another embodiment, and in situations where the loan has already been paid off, the funds can be returned directly to the debit card. In further embodiments, where a loan is involved in the transaction, that transaction can be flagged such that the return of funds can only be made to the debit card, and cannot be made in cash. This can be added as a measure to protect the social-financial platform from consumer-members using the loan system simply as a vehicle for obtaining cash.

Still further embodiments of the systems and methods disclosed herein can be configured to incentivize consumer-members to choose credit or debit options at a point-of-sale terminal. For example, in some embodiments, the system may be configured to provide an alert to the consumer-member that he or she may not receive a rebate if the user selects a debit and not credit on the point-of-sale terminal.

Integrative Fundraising Functionality

Embodiments of the social-financial platform can be used in a variety of applications including in the classroom. As a further example, embodiments can be implemented to provide an API-Linked plug-in or application platform connectivity for classroom applications. The system can be configured with a plug-in for classroom tools such as Edmodo and Moodie to add, some or all of the functionality of the social-financial platform to these existing classroom tools, or to allow this functionality to be accessed by these tools. This can allow students, teachers, parents and other users of such tools to create causes, fund causes, and otherwise utilize the features of the social-financial platform through these existing classroom tools. For example, a class or school organization can create causes such as, for example, classroom field trips, a classroom philanthropic projects, fundraising drives for sports or band equipment, and so on. The cause can be created and managed by the classroom or its designees, and messaging about the cause can go to other classroom tool users, or otherwise be proliferated through the social-financial platform. The plug-in can be configured to provide functionality with the classroom application as well as a direct link to the functionality of the social-financial platform.

Geo-Functionality, Mobile Functionality, and other Functions

In addition to the features and functionality described above, embodiments of the social-financial network systems and methods can also be implemented such that the social-financial network can be configured to include location-based functionality and enhanced social or contacts functionality.

Figure 35:
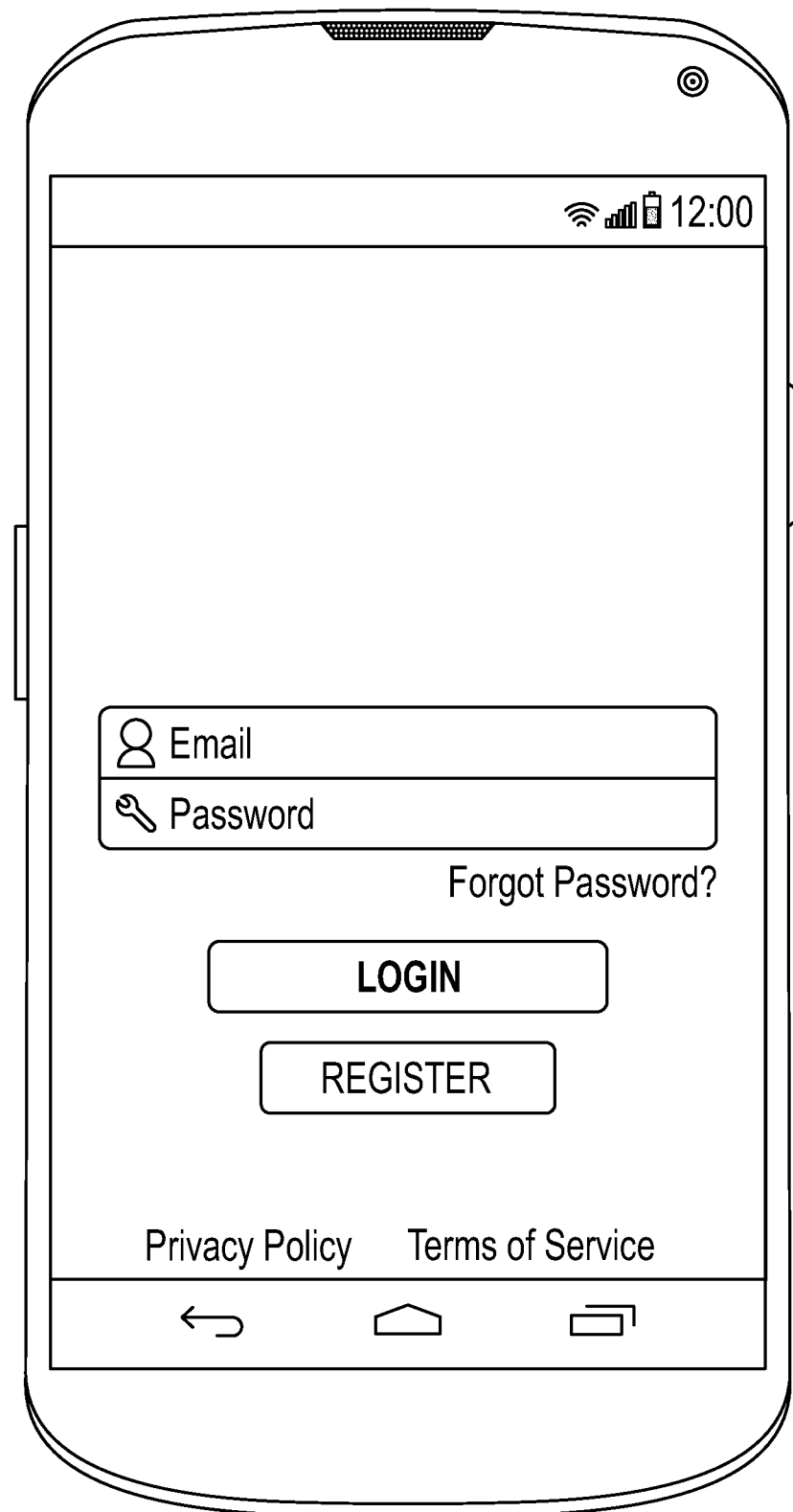
FIG. 35 provides a screenshot of a mobile application login page, in accordance with an embodiment of the present disclosure.

FIG. 35 illustrates an example login screen for a mobile user interface of the social-financial network. The user is given the opportunity to enter an e-mail address or username, and a password to login. For unregistered users, a register button can also be provided to allow new users to register and create an account with the system. This example screen also includes links for Password Recovery, as well as links for applicable Privacy Policies and Terms of Service. When the user clicks the Register button to create a new account, the user can be redirected to a Registration Form. Here the user can register in various embodiments using the mobile interface.

Once logged into the mobile platform, the user can be given a series of options to navigate through the various features and functionality provided by the social-financial network. For example, the user can be given a menu with selections allowing the user to enter social aspects of social-financial network; access account information pages of the network; search for nearby participating sponsors; access functions of the social-financial network; access cause-related aspects of the social-financial network; and others.

Figure 36:
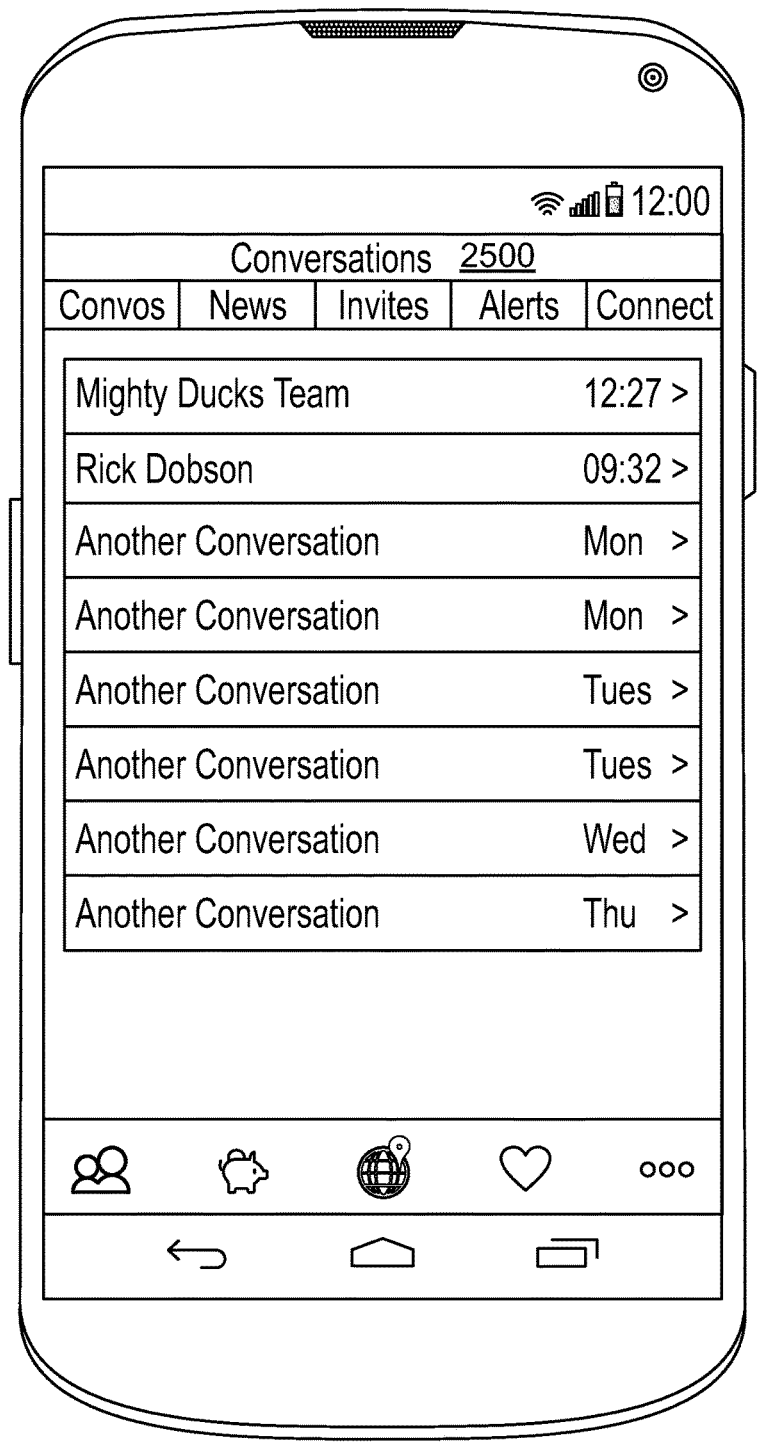
FIG. 36 provides a screenshot of a mobile conversations screen, in accordance with an embodiment of the present disclosure.

Upon entry into the social-related area of the network, the user may be presented with a first screen. Although any of a plurality of other example user interface screens can be used as the landing page for the social area of the mobile platform, in this example, the landing screen lands the user on a Conversations page 2500 shown in FIG. 36. In this example, the user can see a scrollable, sortable listing of various Conversations in his or her network along with an indication from the last entry for each conversation. As this screen also illustrates, the screens provided to the user can have a number of menus or other selections to allow the user to navigate through the network. For example, as illustrated at the bottom of the landing screen, the user is given menu choices for Social (the people icon), Account Balances (piggy bank icon), a Nearby function (globe icon), Causes (heart icon), and More features (ellipses icon). The user can use these buttons to navigate to other aspects of the social-financial network.

Similarly, toward the top of the screen, a menu bar is provided to allow the user to navigate within the social aspect of the network. This example menu bar provides selections for Conversations, News, Invitations, Alerts, and Connections. As noted above, in this example, the landing page is the Conversations Page. However, the landing page could also be selected as the News Page, Invitations Page, Alerts Page, and Connections Page. As illustrated in various embodiments, selecting a Conversation on the conversation page brings the user to details on that conversation which, in this example, shows the conversation thread (using text bubbles in this example).

Figure 37:
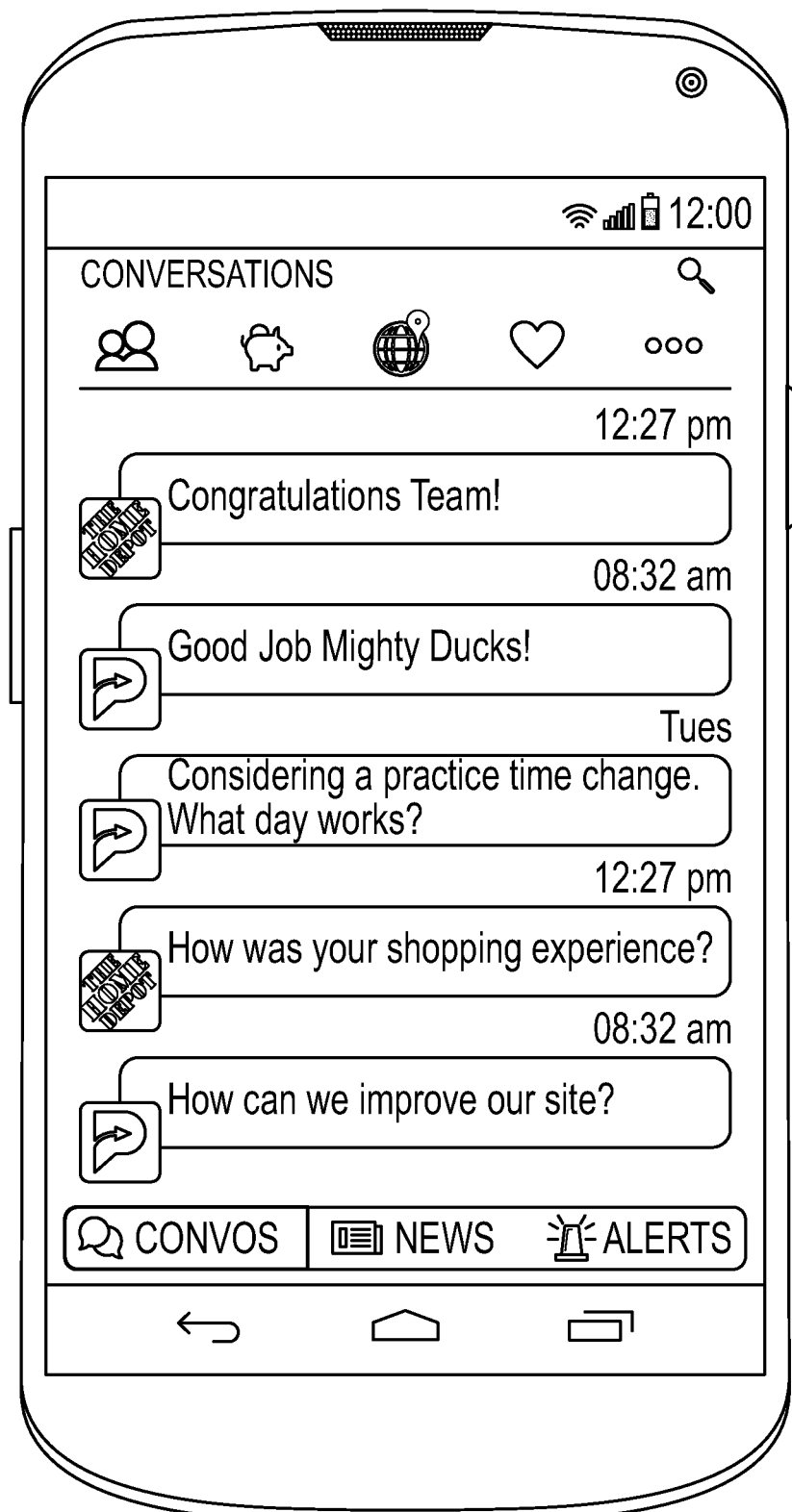
FIG. 37 provides a screenshot of an alternative mobile conversations screen, in accordance with an embodiment of the present disclosure.

FIG. 37 is a diagram illustrating another example implementation of a Conversations landing page. In this example, menu selections toward the top of the screen allow the user to select Social aspects of the network (the people icon) account or Financial aspects of the social-financial network (the piggy-bank icon), "Nearby functions" (the globe icon), Connections aspects of the social-financial network (the heart icon), and additional aspects (the ellipses icon). Also in this example are navigation buttons at the bottom of the screen that allow the user to navigate within the social area from Conversations, to News, to Alerts, and so on.

Returning now to FIG. 36, The Invitations Page as illustrated in this example, can be used to show causes to which the user has been invited, or invitations to join causes sent by the user to his or her connections. In the case of received invitations, selecting an invitation brings the user to a detailed screen about that cause, which, as shown, can be configured to identify the cause, give the user the opportunity to accept or decline the invitation, and provide a description of the cause. Additional options can also be provided.

The alerts page provides alerts and messages to the user. In the event of news alerts, these can be linked as news items.

Finally, the Connections page provides a user with a listing of his or her connections and provides the ability for the user to scroll through the list. The user can select the connection and from that, choose to start a conversation with that connection invite the connection to join the cause, or see other information about the connection. In the illustrated example, the user presses the "Invite to Cause" button, which brings up the next screen providing a list of causes from which the user may select for the invitation. Additionally, a link to create a new cause can also be provided at this time.

Figure 38:
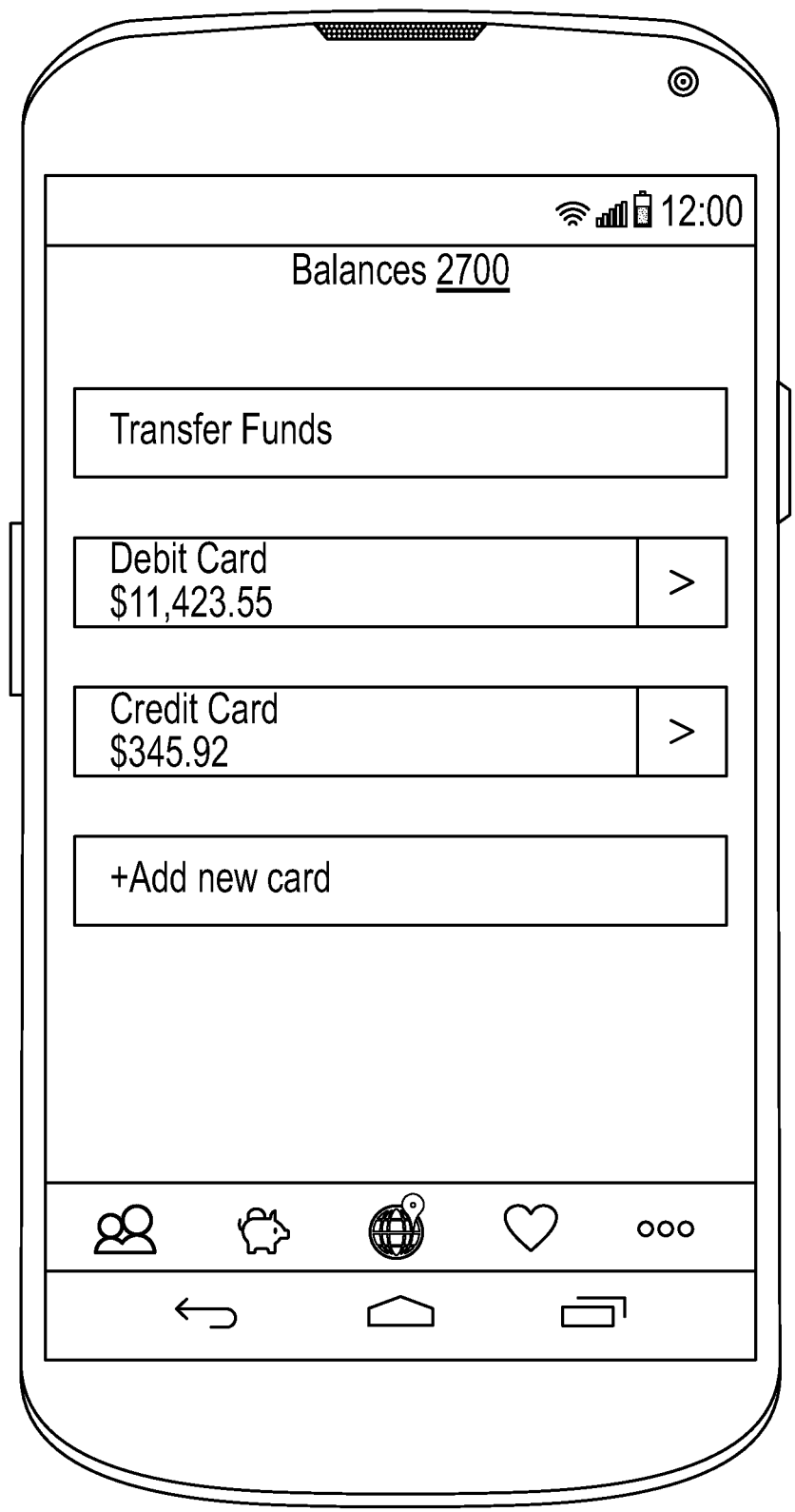
FIG. 38 provides a screenshot of a mobile financial balances screen, in accordance with an embodiment of the present disclosure.
Figure 39:
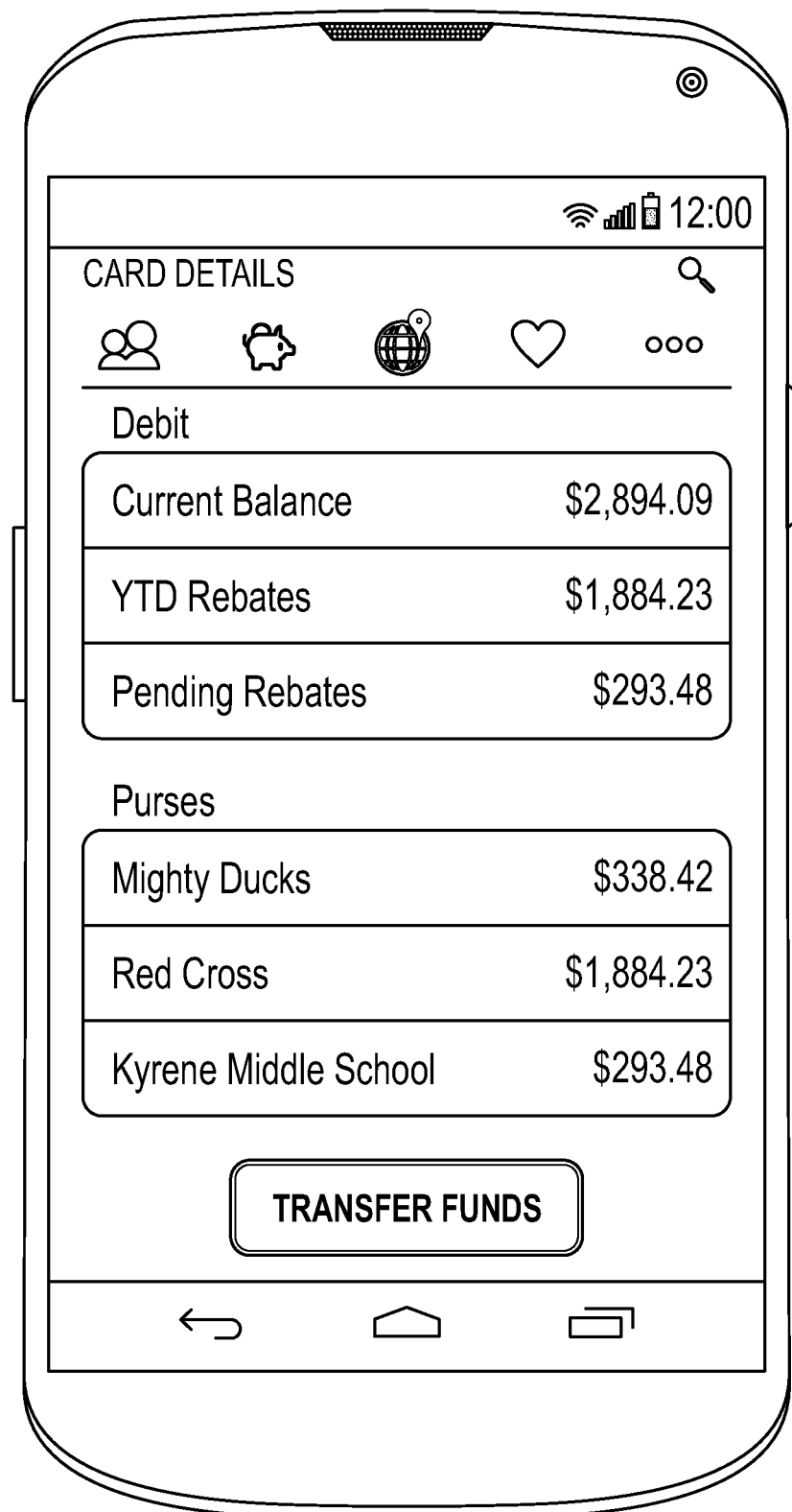
FIG. 39 provides a screenshot of a mobile financial account details screen, in accordance with an embodiment of the present disclosure.
Figure 40:
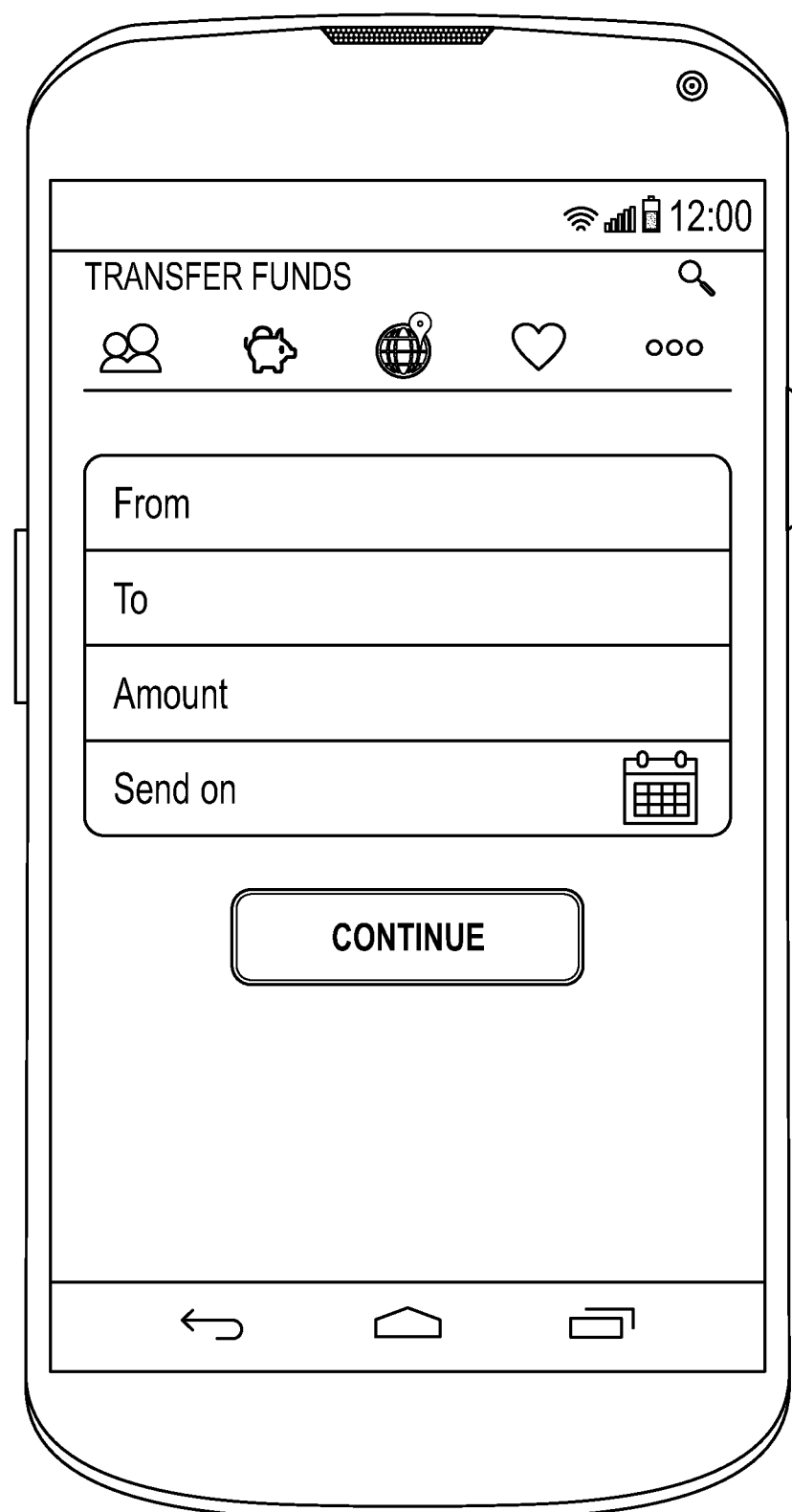
FIG. 40 provides a screenshot of a mobile funds transfer screen, in accordance with an embodiment of the present disclosure.
Figure 41:
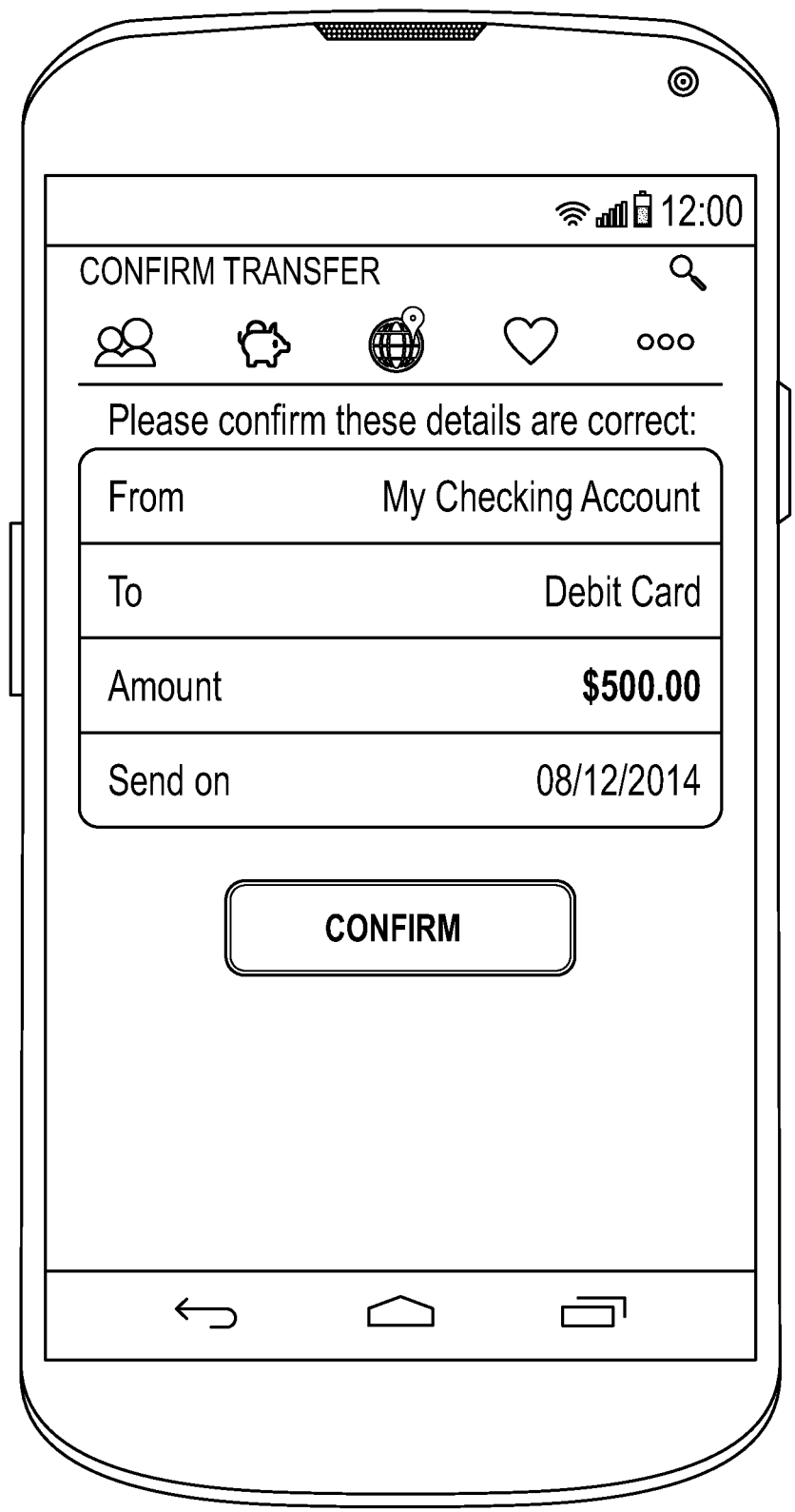
FIG. 41 provides a screenshot of a mobile fund transfer confirmation screen, in accordance with an embodiment of the present disclosure.

FIG. 38 is a diagram illustrating an example user interface for balance checking and other account information. In this example, the Balances page 2700 provides overall account balances to the user for his or her various accounts. This example shows two accounts: a debit card and a credit card. The user can select the accounts to show more information, add a new card or account to the system, or choose to transfer funds into or out of an account. FIG. 39 provides an example screenshot of an account details screen, in which a user has selected the debit card account on the Balances page 2700 to drill into the details page shown in FIG. 39. FIG. 40 provides an example user interface for funds transfer. As seen in this example, the user can select the accounts from which and to which the funds should be transferred, enter the amount to be transferred, and specify a date on which the transfer should occur. A calendar link can be provided to allow the user to see a calendar and to select a date from the calendar. FIG. 41 provides an example of a funds transfer confirmation screen.

The example illustrated in FIG. 41 shows the "From" account as the user's checking account, the "To" account as the user's platform debit card account, the amount to be transferred as $500, and the transfer date specified as Aug. 12, 2014. As this example illustrates, the user's bank account (e.g. checking or savings account etc.) can be linked to the social-financial network to allow transfers into and out of his or her bank accounts. Additionally, these accounts can be linked to the network to allow the user's bank accounts to be used for donations or to receive credit. Finally, sheet 464 is another example of information screen used to confirm to the user that the requested transfer was successfully completed.

As noted above, one of the functions that can be provided in the social-financial network (like the other functions, mobile or otherwise) is a "Nearby" function that can be used to provide information to the user about participating sponsors within a given geographical region. Particularly, in various embodiments, the region can be selected as a specified radius around the user's current position. The user's current position can be determined, for example, using mobile-network location determination, GPS location determination, manual entry of location, map selection, and so on. The "Nearby" function can be used to allow the user to identify participating sponsors in the user's vicinity, obtain more information about those participating sponsors, and determine whether and what type of offers they are currently making to network users.

Figure 42:
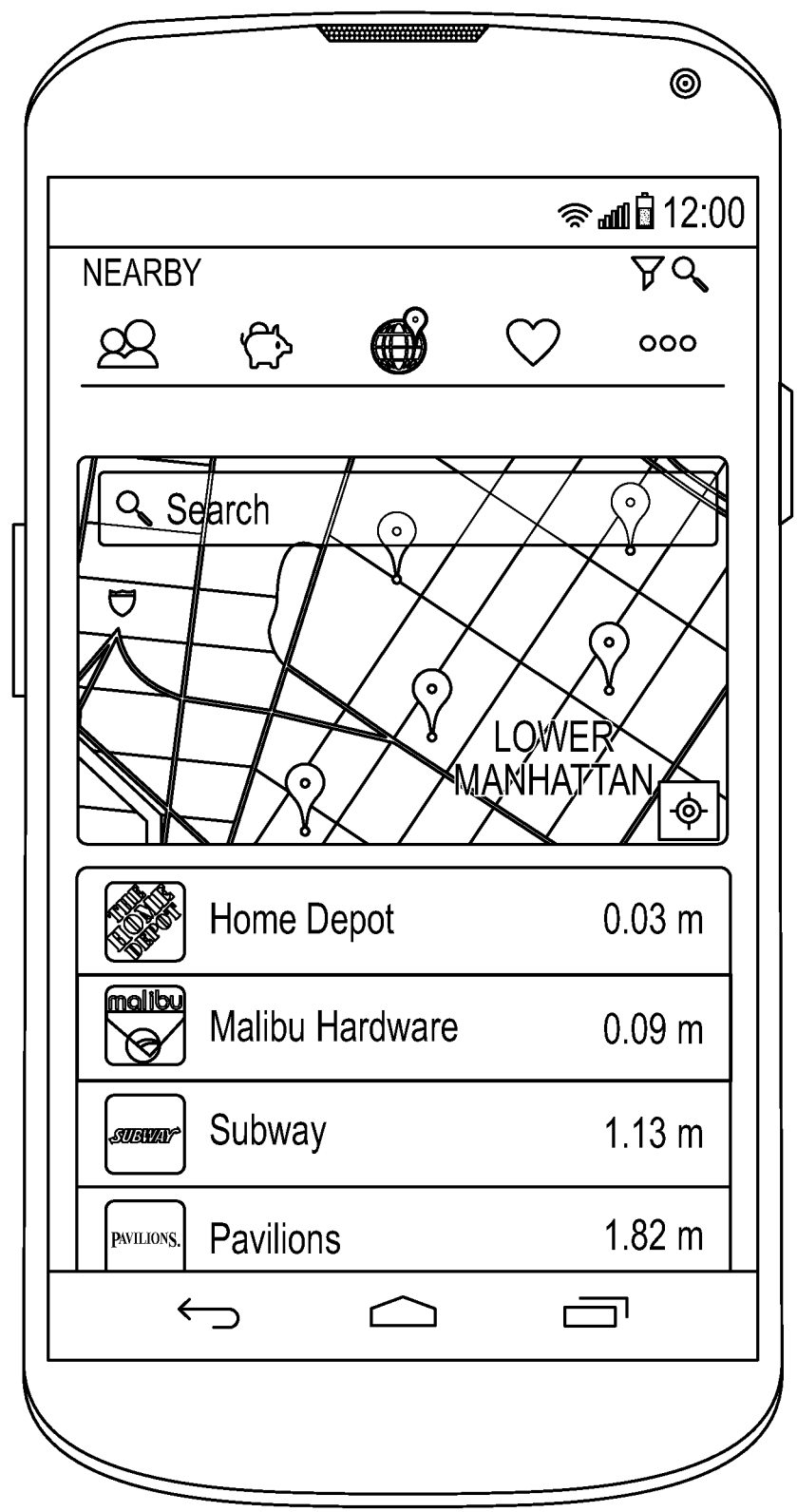
FIG. 42 provides a screenshot of a mobile nearby function screen, in accordance with an embodiment of the present disclosure.

FIG. 42 is an example user interface that can be provided for these functions. As shown in FIG. 42, the screen provides a listing of participating sponsors in the user's vicinity, and shows a map with their locations pinpointed thereon. If user clicks the map, the map can be expanded to full screen mode as illustrated in the screen to the left of the landing page. As this example illustrates, thumbtacks or other icons can be included to identify the locations of these participating sponsors. User can be given the ability to scroll North, South, East or West through the map as well as to zoom into or out of the map.

Figure 43:
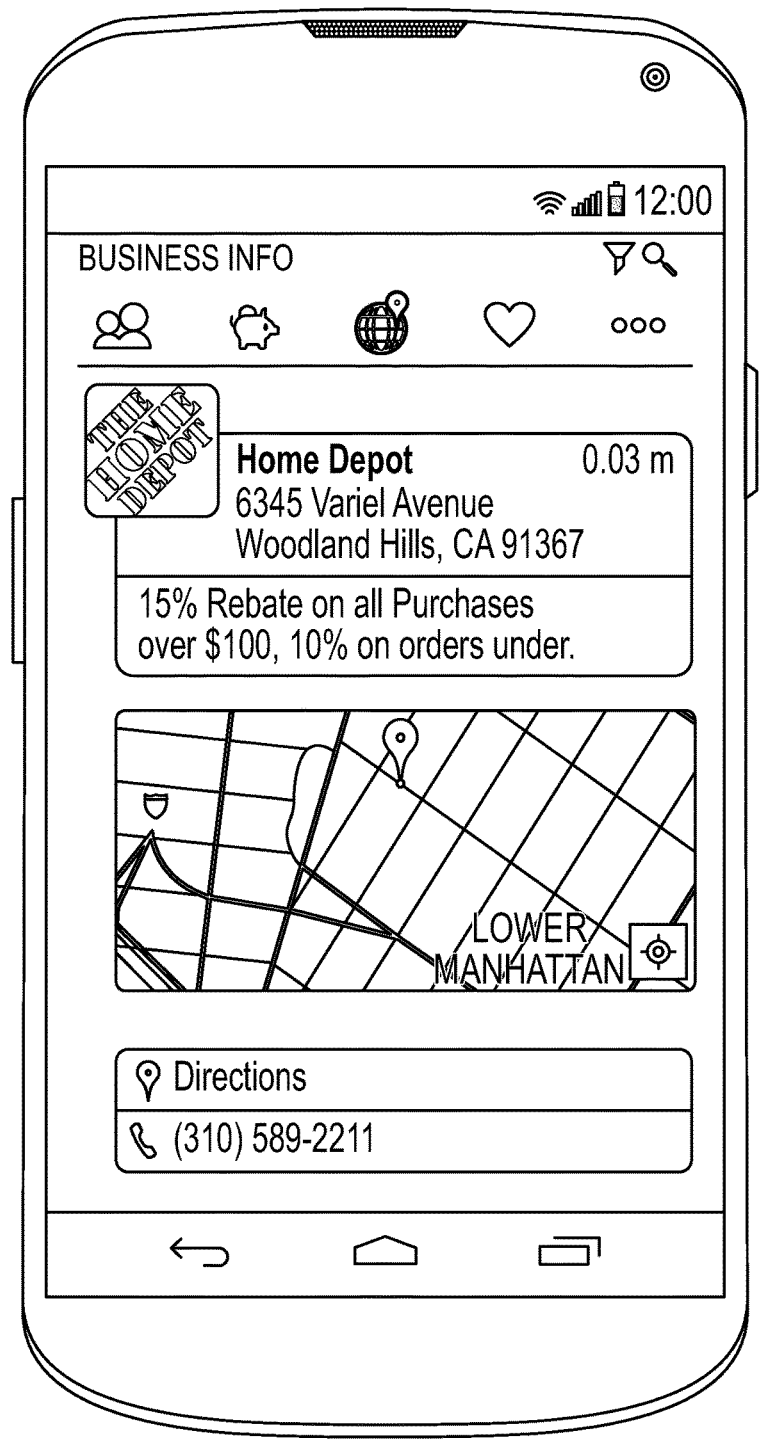
FIG. 43 provides a screenshot of a mobile nearby merchant screen, in accordance with an embodiment of the present disclosure.

The user can select a listed participating sponsor to obtain more information about that sponsor. In the illustrated example shown in FIG. 43, the user selected Home Depot, and the detailed information shows the selected sponsor, its address, its current offer (15% rebate in this example) and the distance from the user to that participating Home Depot. It is noted that the screen does not constitute an offer by Home Depot to provide a rebate of any kind. This example is provided for illustration purposes only. The screen also shows selections allowing the user to get directions and open a navigation application to navigate to the selected business, call the business, or obtain more information. For example, the system can be configured to call or link to available navigation apps such as, for example, Google Maps, Waze, and so on.

By selecting the filter icon on the top right of the screen, a user may filter search results. In various embodiments, without filtering, the list at the landing page (FIG. 42) is generally an unfiltered list that can be sorted by category, name, distance, and so on. In some embodiments, the system can be configured to provide the user with the opportunity to customize his or her landing page list to show, for example, favorite merchants, a pre-filtered merchant list, and so on. In some embodiments, the system can be configured to allow the participating sponsors to tailor the rebates or contributions for the user based on the Nearby functions. For example, in an effort to entice the user to visit a particular retail location that comes up on the search, that retailer can provide an additional incentive to the user. Additionally, that retailer can be given the ability to provide the user with a time limit on that additional incentive to entice the user to visit the merchant in a timely fashion.

Be selecting the magnifying glass icon on the top right of the screen, the user may be taken to a search screen that can be used by the user to search for particular participating sponsors by typing in a name and/or location. Search results can be provided on the screen, and a keyboard can also be provided to allow entry of search strings.

Figure 44:
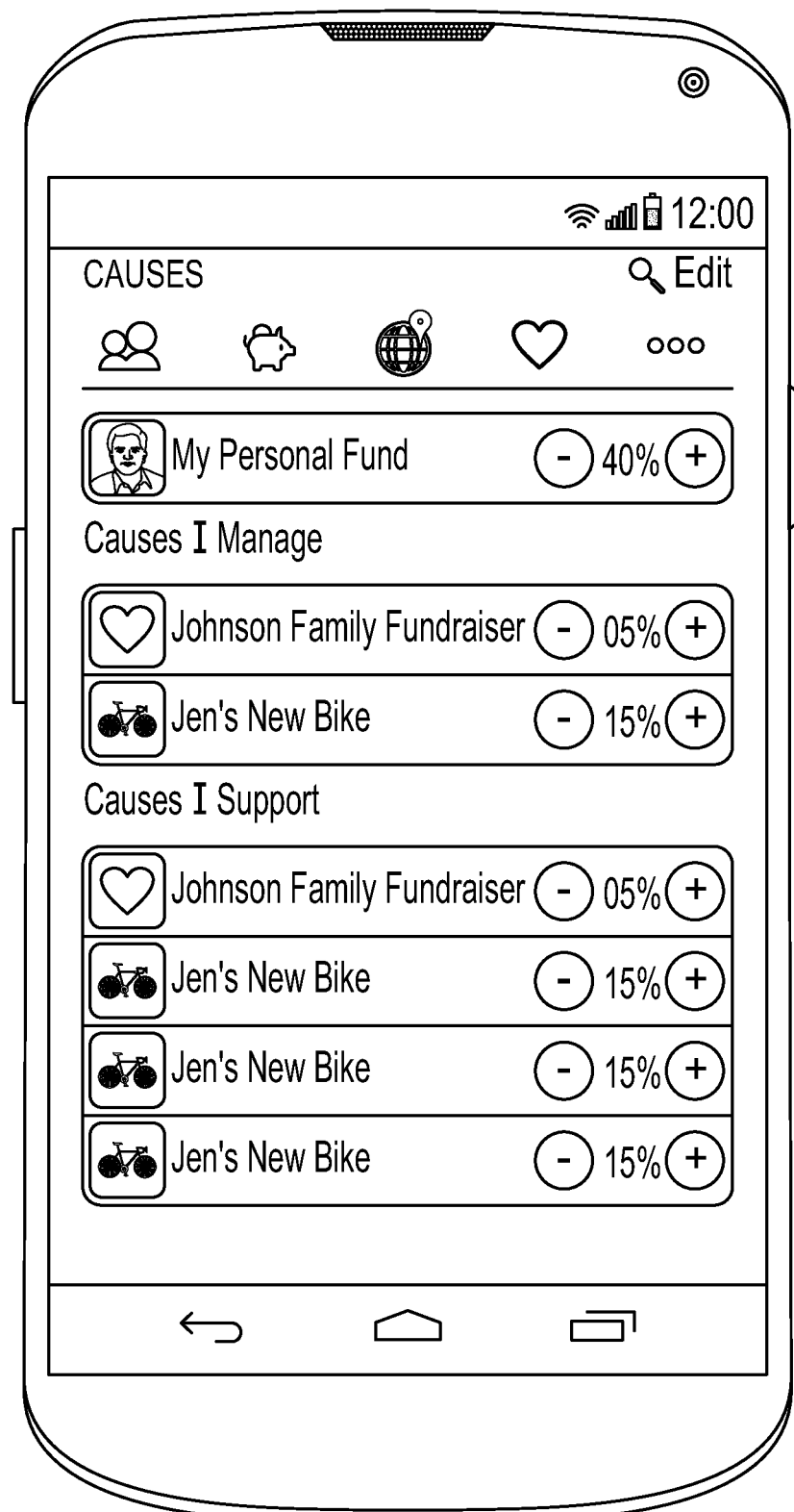
FIG. 44 provides a screenshot of a mobile causes function screen, in accordance with an embodiment of the present disclosure.

FIG. 44 illustrates an example screenshot for the causes section of the social-financial network. In this example, the screen shows the user interface allowing the user to access his or her personal fund, one or more causes the user is managing, and causes in which the user is participating. Buttons can be provided to allow the user to adjust the percentages. Additionally, the user can select the cause to allow the allocation amounts to be edited as seen in the screen to the above left of the landing screen.

Figure 45:
FIG. 45 provides a screenshot of a mobile cause information screen, in accordance with an embodiment of the present disclosure.

In this example, when the user selects a cause from the first screen, the user is brought to a cause information screen showing additional information about the selected cause. In the example shown in FIG. 45, information about the Mighty Ducks Team is provided along with links to allow the user to view or participate in Conversations about the team, News Items, Participants, and so on. The screen includes a description of the cause along with an identification of the manager, the date the cause was created, information about those participating in the cause, the goals of cause, the amount collected by the cause, and so on.

Figure 46:
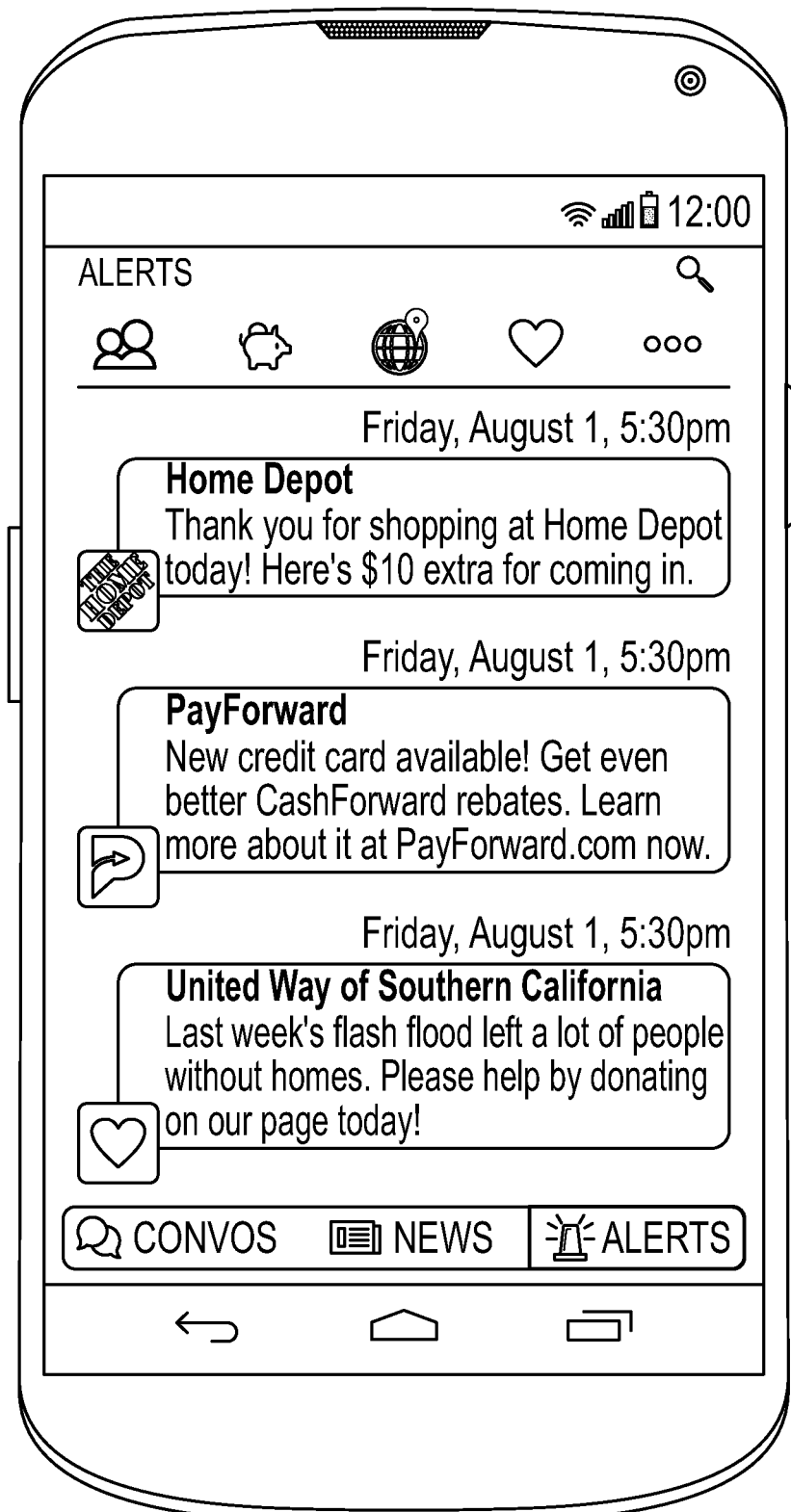
FIG. 46 provides a screenshot of a mobile alerts screen, in accordance with an embodiment of the present disclosure.

Finally, FIG. 46 provides an example screen for alerts that can be provided to the user. As this example illustrates, information from the participating sponsors can be provided to the user by the alerts section of the user interface.

Although the systems and methods described herein are illustrated in terms of a mobile computing platform, one of ordinary skill in the art will understand after reading this description that these may be implemented with a user interface and application provided in non-mobile computing platforms as well.

Definitions, Terms, and Reservation of Rights

Figure 47:
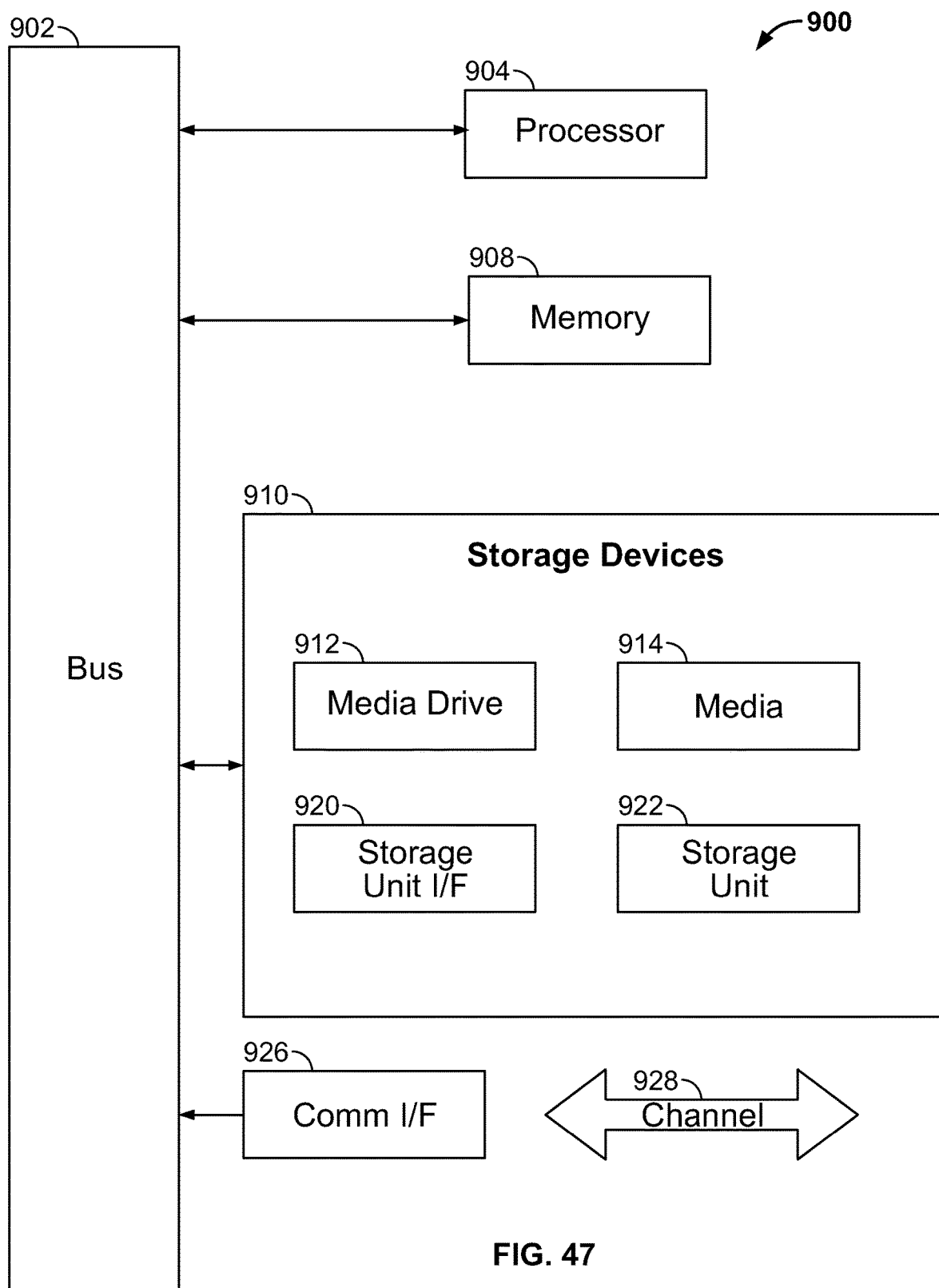
FIG. 47 illustrates a sample computing module that may be used to implement certain features and embodiments of the present disclosure.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Where components or modules of the technology are implemented in whole or in part using software, in one embodiment, these software elements can be implemented to operate with a computing or processing module capable of carrying out the functionality described with respect thereto. One such example computing module is shown in FIG. 47. Various embodiments are described in terms of this example-computing module 900. After reading this description, it will become apparent to a person skilled in the relevant art how to implement the technology using other computing modules or architectures.

Referring now to FIG. 47, computing module 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure has been presented with reference only to the presently preferred embodiments, those of ordinary skill in the art will appreciate that various modifications can be made without departing from this disclosure. As such, the disclosure is defined only by the following claims and recited limitations.

What is claimed is:

1. A social-financial platform system comprising:
a monolithic account structure, wherein:
the monolithic account structure is managed by the social-financial platform system,
the monolithic account structure comprises a first virtual user financial account within the monolithic account structure, the first virtual user financial account being associated with a consumer-member user, and
the monolithic account structure provides an ability to create one or more additional virtual user financial accounts within the monolithic account structure, the one or more additional virtual user financial accounts being associated with the consumer-member user; and
a second virtual user financial account, wherein the second virtual user financial account is either:
a particular one of the one or more additional virtual user financial accounts within the monolithic account structure, or
a virtual user financial account managed by the social-financial platform system that is outside the monolithic account structure;
wherein the social-financial platform system is configured to:
receive an enrollment request that includes an account number of an external payment source of the consumer-member user,
generate the monolithic account structure associated with the account number of the external payment source of the consumer-member user, wherein:
the monolithic account structure corresponds with a set of rules to distribute a rebate value to the first virtual user financial account within the monolithic account structure, and
the set of rules defines a percentage or a set amount of the rebate value to be distributed from the first virtual user financial account within the monolithic account structure to the second virtual user financial account,
receive transaction information associated with a payment transaction, correlate the transaction information associated with the payment transaction with a rebate offer provided by a sponsor-member user to determine the rebate value, based on the correlation, automatically distribute the rebate value to the first virtual user financial account within the monolithic account structure according to the set of rules, wherein:

the distribution of the rebate value transfers funds within the social-financial platform system to the monolithic account structure without a disbursement from the social-financial platform system to an external funding destination, based on the set of rules, automatically distribute the percentage or the set amount of the rebate value to the second virtual user financial account, wherein the distribution of the percentage or the set amount of the rebate value transfers funds from the first virtual user financial account to the second virtual user financial account without the disbursement from the social-financial platform system to the external funding destination, and at a later time, initiate a funds distribution of either the first virtual user financial account or the particular one of the one or more additional virtual user financial accounts within the monolithic account structure to the account number of the external payment source of the consumer-member user, wherein the funds distribution transfers funds outside the social-financial platform system using the disbursement from the social-financial platform system to the external payment source.

2. The social-financial platform system of claim 1, wherein the second virtual user financial account is the particular one of the one or more additional virtual user financial accounts within the monolithic account structure.

3. The social-financial platform system of claim 1, wherein the second virtual user financial account is the virtual user financial account managed by the social-financial platform system that is outside the monolithic account structure.

4. The social-financial platform system of claim 1, wherein:
the social-financial platform system further comprises a rebate processor; and
the rebate processor is configured to determine the rebate value based on the payment transaction and the rebate offer.

5. The social-financial platform system of claim 1, wherein:
the social-financial platform system further comprises a rebate processor; and
the rebate processor is configured to determine a record of rebate values paid out of the social-financial platform system for settlement at a second later time.

6. The social-financial platform system of claim 1, wherein the transaction information comprises SKU-level information.

7. The social-financial platform system of claim 1, wherein the account number of the external payment source corresponds to a credit or debit account.

8. A computer-implemented method comprising:
receiving, by a social-financial platform system, an enrollment request that includes an account number of an external payment source of a consumer-member user;
generating, by the social-financial platform system, a monolithic account structure associated with the account number of the external payment source of the consumer-member user, wherein:

the monolithic account structure is managed by the social-financial platform system, the monolithic account structure comprises a first virtual user financial account within the monolithic account structure, the first virtual user financial account being associated with the consumer-member user, the monolithic account structure provides an ability to create one or more additional virtual user financial accounts within the monolithic account structure, the one or more additional virtual user financial accounts being associated with the consumer-member user, the monolithic account structure corresponds with a set of rules to distribute a rebate value to the first virtual user financial account within the monolithic account structure, the set of rules defines a percentage or a set amount of the rebate value to be distributed from the first virtual user financial account within the monolithic account structure to a second virtual user financial account, and the second virtual user financial account, wherein the second virtual user financial account is either: a particular one of the one or more additional virtual user financial accounts within the monolithic account structure, or a virtual user financial account managed by the social-financial platform system that is outside the monolithic account structure;

receiving, by the social-financial platform system, transaction information associated with a payment transaction;

correlating, by the social-financial platform system, the transaction information associated with the payment transaction with a rebate offer provided by a sponsor-member user to determine the rebate value;

based on the correlation, automatically distributing, by the social-financial platform system, the rebate value to the first virtual user financial account within the monolithic account structure according to the set of rules, wherein:

the distribution of the rebate value transfers funds within the social-financial platform system to the monolithic account structure without a disbursement from the social-financial platform system to an external funding destination;

based on the set of rules, automatically distributing, by the social-financial platform system, the percentage or the set amount of the rebate value to the second virtual user financial account, wherein the distribution of the percentage or the set amount of the rebate value transfers funds from the first virtual user financial account to the second virtual user financial account without the disbursement from the social-financial platform system to the external funding destination; and at a later time, initiating, by the social-financial platform system, a funds distribution of either the first virtual user financial account or the particular one of the one or more additional virtual user financial accounts within the monolithic account structure to the account number of the external payment source of the consumer-member user, wherein the funds distribution transfers funds outside the social-financial platform system using the disbursement from the social-financial platform system to the external payment source.

9. The computer-implemented method of claim 8, wherein the second virtual user financial account is the particular one of the one or more additional virtual user financial accounts within the monolithic account structure.

10. The computer-implemented method of claim 8, wherein the second virtual user financial account is the virtual user financial account managed by the social-financial platform system that is outside the monolithic account structure.

11. The computer-implemented method of claim 8, wherein:
the social-financial platform system further comprises a rebate processor; and
the rebate processor is configured to determine the rebate value based on the payment transaction and the rebate offer.

12. The computer-implemented method of claim 8, wherein:
the social-financial platform system further comprises a rebate processor; and
the rebate processor is configured to determine a record of rebate values paid out of the social-financial platform system for settlement at a second later time.

13. The computer-implemented method of claim 8, wherein the transaction information comprises SKU-level information.

14. The computer-implemented method of claim 8, wherein the account number of the external payment source corresponds to a credit or debit account.

15. A non-transitory computer-readable medium comprising an instruction set configured to cause a social-financial platform system to perform steps of:
receive an enrollment request that includes an account number of an external payment source of a consumer-member user;
generate a monolithic account structure associated with the account number of the external payment source of the consumer-member user, wherein:
the monolithic account structure is managed by the social-financial platform system,
the monolithic account structure comprises a first virtual user financial account within the monolithic account structure, the first virtual user financial account being associated with the consumer-member user,
the monolithic account structure provides an ability to create one or more additional virtual user financial accounts within the monolithic account structure, the one or more additional virtual user financial accounts being associated with the consumer-member user,
the monolithic account structure corresponds with a set of rules to distribute a rebate value to the first virtual user financial account within the monolithic account structure,
the set of rules defines a percentage or a set amount of the rebate value to be distributed from the first virtual user financial account within the monolithic account structure to a second virtual user financial account, and
the second virtual user financial account, wherein the second virtual user financial account is either: a particular one of the one or more additional virtual user financial accounts within the monolithic account structure, or a virtual user financial account managed by the social-financial platform system that is outside the monolithic account structure;
receive transaction information associated with a payment transaction;
correlate the transaction information associated with the payment transaction with a rebate offer provided by a sponsor-member user to determine the rebate value;
based on the correlation, automatically distribute the rebate value to the first virtual user financial account within the monolithic account structure according to the set of rules, wherein:
the distribution of the rebate value transfers funds within the social-financial platform system to the monolithic account structure without a disbursement from the social-financial platform system to an external funding destination;
based on the set of rules, automatically distribute the percentage or the set amount of the rebate value to the second virtual user financial account, wherein the distribution of the percentage or the set amount of the rebate value transfers funds from the first virtual user financial account to the second virtual user financial account without the disbursement from the social-financial platform system to the external funding destination; and
at a later time, initiate a funds distribution of either the first virtual user financial account or the particular one of the one or more additional virtual user financial accounts within the monolithic account structure to the account number of the external payment source of the consumer-member user, wherein the funds distribution transfers funds outside the social-financial platform system using the disbursement from the social-financial platform system to the external payment source.

16. The non-transitory computer-readable medium of claim 15, wherein the second virtual user financial account is the particular one of the one or more additional virtual user financial accounts within the monolithic account structure.

17. The non-transitory computer-readable medium of claim 15, wherein the second virtual user financial account is the virtual user financial account managed by the social-financial platform system that is outside the monolithic account structure.

18. The non-transitory computer-readable medium of claim 15, wherein:
the social-financial platform system further comprises a rebate processor; and
the rebate processor is configured to determine the rebate value based on the payment transaction and the rebate offer.

19. The non-transitory computer-readable medium of claim 15, wherein:
the social-financial platform system further comprises a rebate processor; and
the rebate processor is configured to determine a record of rebate values paid out of the social-financial platform system for settlement at a second later time.

20. The non-transitory computer-readable medium of claim 15, wherein the transaction information comprises SKU-level information.

* * * * *